(12) United States Patent
Blumrich et al.

(10) Patent No.: US 7,761,687 B2
(45) Date of Patent: Jul. 20, 2010

(54) ULTRASCALABLE PETAFLOP PARALLEL SUPERCOMPUTER

(75) Inventors: Matthias A. Blumrich, Ridgefield, CT (US); Dong Chen, Croton On Hudson, NY (US); George Chiu, Cross River, NY (US); Thomas M. Cipolla, Katonah, NY (US); Paul W. Coteus, Yorktown Heights, NY (US); Alan G. Gara, Mount Kisco, NY (US); Mark E. Giampapa, Irvington, NY (US); Shawn Hall, Pleasantville, NY (US); Rudolf A. Haring, Cortlandt Manor, NY (US); Philip Heidelberger, Cortlandt Manor, NY (US); Gerard V. Kopcsay, Yorktown Heights, NY (US); Martin Ohmacht, Yorktown Heights, NY (US); Valentina Salapura, Chappaqua, NY (US); Krishnan Sugavanam, Mahopac, NY (US); Todd Takken, Brewster, NY (US)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 11/768,905

(22) Filed: Jun. 26, 2007

(65) Prior Publication Data
US 2009/0006808 A1 Jan. 1, 2009

(51) Int. Cl.
*G06F 15/173* (2006.01)
(52) U.S. Cl. .................................................. 712/11
(58) Field of Classification Search ............... None

| | | | | |
|---|---|---|---|---|
| 5,353,412 | A * | 10/1994 | Douglas et al. | 709/243 |
| 6,466,227 | B1 * | 10/2002 | Pfister et al. | 345/619 |
| 7,539,845 | B1 * | 5/2009 | Wentzlaff et al. | 712/10 |
| 2003/0105799 | A1 * | 6/2003 | Khan et al. | 709/201 |
| 2004/0019730 | A1 * | 1/2004 | Walker et al. | 710/306 |
| 2004/0103218 | A1 * | 5/2004 | Blumrich et al. | 709/249 |
| 2005/0053057 | A1 * | 3/2005 | Deneroff et al. | 370/360 |

OTHER PUBLICATIONS

Pande,P.. etal., Performance Evaluation and Design Trade-Offs for Network-On-Chip Interconnect Architectures, 2005, IEEE, pp. 1025-1040.*

* cited by examiner

*Primary Examiner*—Eric Coleman
(74) *Attorney, Agent, or Firm*—Scully, Scott, Murphy & Presser, P.C.; Daniel P. Morris, Esq.

(57) ABSTRACT

A massively parallel supercomputer of petaOPS-scale includes node architectures based upon System-On-a-Chip technology, where each processing node comprises a single Application Specific Integrated Circuit (ASIC) having up to four processing elements. The ASIC nodes are interconnected by multiple independent networks that optimally maximize the throughput of packet communications between nodes with minimal latency. The multiple networks may include three high-speed networks for parallel algorithm message passing including a Torus, collective network, and a Global Asynchronous network that provides global barrier and notification functions. These multiple independent networks may be collaboratively or independently utilized according to the needs or phases of an algorithm for optimizing algorithm processing performance. The use of a DMA engine is provided to facilitate message passing among the nodes without the expenditure of processing resources at the node.

44 Claims, 23 Drawing Sheets

RECEPTION COUNTER

| BASE ADDRESS 135(1) |
| BYTE COUNT 135(2) |
| MAX ADDRESS 135(3) |

INJECTION COUNTER

| BASE ADDRESS 131(1) |
| BYTE COUNT 131(2) |

FIFO METADATA

| START ADDRESS 133(1) |
| END ADDRESS 133(2) |
| HEAD POINTER 133(3) |
| TAIL POINTER 133(4) |

FIG. 1B-1

DMA PUT/GET HARDWARE HEADER FORMAT 144

| 4 BYTES PUT OFFSET 144(1) |
|---|
| 1 BYTE RDMA COUNTER ID 144(2) |
| 1 BYTE, NUMBER OF VALID BYTES IN PAYLOAD 144(3) |
| 1 BIT IN 1 BYTE, REMOTE GET FLAG 144(4) |
| 1 BYTE, INJECTION DMA FIFO ID 144(5) |

FIFO PACKET SOFTWARE HEADER FORMAT 143

| 4 BYTE PUT OFFSET 143(1) |
|---|
| 4 BYTE SOFTWARE HEADER 143(2) |

TORUS NETWORK HARDWARE HEADER FORMAT 141

| 1 BYTE MARKER 141(1) |
|---|
| 10 BIT ROUTING INFO 141(2) |
| 3 BIT PACKET SIZE 141(3) |
| 2 BIT TARGET NODE PROCESSOR ID 141(4) |
| 1 BIT DMA FLAG 141(5) |
| 3 BYTE TARGET (X,Y,Z) COORDINATES 141(6) |
| 2 BYTE RESERVED 141(7) |

INJECTION MESSAGE DESCRIPTOR FORMAT 139

| 16 BYTE CONTROL 139(1) | LOCAL TRANSFER FLAG (1 BIT IN 4 BYTES) 139(11) |
| --- | --- |
| | INJECTION COUNTER ID (1 BYTE IN 4 BYTES) 139(12) |
| | SEND MESSAGE ADDRESS OFFSET (4 BYTES) 139(13) |
| | MESSAGE LENGTH IN BYTES (4 BYTES) 139(14) |
| 16 BYTE NETWORK PACKET HEADER 139(2) | TORUS NETWORK HARDWARE HEADER (8 BYTES) 139(21) |
| | SOFTWARE HEADER FOR MEMORY FIFO PACKETS, OR HARDWARE HEADER FOR DMA PUT AND GET PACKETS (8 BYTES) 139(22) |

FIG. 1B-2

Injection FIFO Metadata 140

| |
|---|
| start address (RW) 140a |
| end address (RW) 140b |
| producer address (RW) 140c |
| consumer address (RW) 140d |
| is_empty bit (R) 140e |
| is_full bit (R) 140f |
| was_threshold_crossed bit (R) 140g |
| clear_threshold_crossed bit (W) 140h |
| is_active bit (R) 140i |
| activate bit (W) 140j |
| deactivate bit (W) 140k |
| enable bit (SRW) 140l |
| priority bit (SRW) 140m |
| threshold value (SRW) 140n |
| service_quantum value (SRW) 140o |
| network_resources bitmask (SRW) 140p |
| threshold_interrupt bit (SRW) 140q |

FIG. 1C-2

ULTRASCALABLE PETAFLOP PARALLEL SUPERCOMPUTER

STATEMENT REGARDING FEDERALLY SPONSORED RESEARCH OF DEVELOPMENT

The U.S. Government has a paid-up license in this invention and the right in limited circumstances to require the patent owner to license others on reasonable terms as provided for by the terms of Contract No. B554331 awarded by the Department of Energy.

CROSS-REFERENCE TO RELATED APPLICATIONS

The present invention is related to the following commonly-owned, co-pending United States Patent Applications filed on even date herewith, the entire contents and disclosure of each of which is expressly incorporated by reference herein as if fully set forth herein. U.S. patent application Ser. No. 11/768,777, for "A SHARED PERFORMANCE MONITOR IN A MULTIPROCESSOR SYSTEM"; U.S. patent application Ser. No. 11/768,645, for "OPTIMIZED COLLECTIVES USING A DMA ON A PARALLEL COMPUTER"; U.S. patent application Ser. No. 11,768,781, for "DMA SHARED BYTE COUNTERS IN A PARALLEL COMPUTER"; U.S. patent application Ser. No. 11/768,784, for "MULTIPLE NODE REMOTE MESSAGING"; U.S. patent application Ser. No. 11/768,697, for "A METHOD AND APPARATUS OF PREFETCHING STREAMS OF VARYING PREFETCH DEPTH"; U.S. patent application Ser. No. 11/768,532, for "PROGRAMMABLE PARTITIONING FOR HIGH-PERFORMANCE COHERENCE DOMAINS IN A MULTIPROCESSOR SYSTEM"; U.S. patent application Ser. No. 11/768,857, for "METHOD AND APPARATUS FOR SINGLE-STEPPING COHERENCE EVENTS IN A MULTIPROCESSOR SYSTEM UNDER SOFTWARE CONTROL"; U.S. patent application Ser. No. 11/768,547, for "INSERTION OF COHERENCE EVENTS INTO A MULTIPROCESSOR COHERENCE PROTOCOL"; U.S. patent application Ser. No. 11/768,791, for "METHOD AND APPARATUS TO DEBUG AN INTEGRATED CIRCUIT CHIP VIA A SYNCHRONOUS CLOCK STOP AND SCAN"; U.S. patent application Ser. No. 11/768795, for "DMA ENGINE FOR REPEATING COMMUNICATION PATTERNS"; U.S. patent application Ser. No. 11/768,799, for "METHOD AND APPARATUS FOR A CHOOSE-TWO MULTI-QUEUE ARBITER"; U.S. patent application Ser. No. 11/768,800, for "METHOD AND APPARATUS FOR EFFICIENTLY TRACKING ENTRIES RELATIVE TO A TIMESTAMP"; U.S. patent application Ser. No. 11/768,572, for "BAD DATA PACKET CAPTURE DEVICE; U.S. patent application Ser. No. 11/768,593, for EXTENDED WRITE COMBINING USING A WRITE CONTINUATION HINT FLAG"; U.S. patent application Ser. No. 11/768,805, for "A SYSTEM AND METHOD FOR PROGRAMMABLE BANK SELECTION FOR BANKED MEMORY SUBSYSTEMS"; U.S. patent application Ser. No. 11/768,810, for "SDRAM DDR DATA EYE MONITOR METHOD AND APPARATUS"; U.S. patent application Ser. No. 11/768,812, for "A CONFIGURABLE MEMORY SYSTEM AND METHOD FOR PROVIDING ATOMIC COUNTING OPERATIONS IN A MEMORY DEVICE"; U.S. patent application Ser. No. 11/768,559, for "ERROR CORRECTING CODE WITH CHIP KILL CAPABILITY AND POWER SAVING ENHANCEMENT"; U.S. patent application Ser. No. 11/768,552, for "STATIC POWER REDUCTION FOR MIDPOINT-TERMINATED BUSSES"; U.S. patent application No. 11/768,527, for "COMBINED GROUP ECC PROTECTION AND SUBGROUP PARITY PROTECTION"; U.S. patent application publication No. Ser. No. 11/768,669, for "A MECHANISM TO SUPPORT GENERIC COLLECTIVE COMMUNICATION ACROSS A VARIETY OF PROGRAMMING MODELS": U.S. patent application No. 11/768,813, for "MESSAGE PASSING WITH A LIMITED NUMBER OF DMA BYTE COUNTERS"; U.S. patent application Ser. No. 11/768,619, for "ASYNCHRONOUS BROADCAST FOR ORDERED DELIVERY BETWEEN COMPUTE NODES IN A PARALLEL COMPUTING SYSTEM WHERE PACKET HEADER SPACE IS LIMITED"; U.S. patent application Ser. No. 11/768,682, for "HARDWARE PACKET PACING USING A DMA IN A PARALLEL COMPUTER"; and U.S. patent application Ser. No. 11/768,752, for "POWER THROTTLING OF COLLECTIONS OF COMPUTING ELEMENTS".

BACKGROUND OF THE INVENTION

1. Field of the Invention

The present invention generally relates to computer systems and architectures, and more particularly, to an ultrascalable, low power, and massively parallel supercomputer.

2. Description of the Prior Art

Massively parallel computing structures (also referred to as "ultra-scale or "supercomputers") interconnect large numbers of compute nodes, generally, in the form of very regular structures, such as mesh, lattices, or torus configurations. The conventional approach for the most cost/effective ultrascalable computers has been to use standard processors configured in uni-processors or symmetric multiprocessor (SMP) configurations, wherein the SMPs are interconnected with a network to support message passing communications. Today, these supercomputing machines exhibit computing performance achieving hundreds of teraflops (see IBM Journal of Research and Development, Special Double Issue on Blue Gene, Vol. 49, Numbers 2/3, March/May 2005 incorporated by reference as if fully set forth herein). However, there are two long standing problems in the computer industry with the current cluster of SMPs approach to building ultra-scale computers: (1) the increasing distance, measured in clock cycles, between the processors and the memory (the memory wall problem) and (2) the high power density of parallel computers built of mainstream uni-processors or symmetric multi-processors (SMPs').

In the first problem, the distance to memory problem (as measured by both latency and bandwidth metrics) is a key issue facing computer architects, as it addresses the problem of microprocessors increasing in performance at a rate far beyond the rate at which memory speeds increase and communication bandwidth increases per year. While memory hierarchy (caches) and latency hiding techniques provide exemplary solutions, these methods necessitate the applications programmer to utilize very regular program and memory reference patterns to attain good efficiency (i.e. minimizing instruction pipeline bubbles and maximizing memory locality). This technique is thus not suited for modern applications techniques (e.g., using complicated data structures for unstructured meshes and object oriented programming).

In the second problem, high power density relates to the high cost of facility requirements (power, cooling and floor space) for such tera-scale computers.

It would be highly desirable to provide an ultra-scale supercomputing architecture that will reduce latency to memory, as measured in processor cycles, by at least an order of magnitude, and optimize massively parallel computing at petaOPS-scale at decreased cost, power, and footprint.

It would be further highly desirable to provide an ultra-scale supercomputing architecture that exploits technological advances in VLSI that enables a computing model where many processors can be integrated into a single ASIC.

It would be highly desirable to provide an ultra-scale supercomputing architecture that comprises a unique interconnection of processing nodes for optimally achieving various levels of scalability.

It would be highly desirable to provide an ultra-scale supercomputing architecture that comprises a unique interconnection of processing nodes for efficiently and reliably computing global reductions, distribute data, synchronize, and share limited resources.

SUMMARY OF THE INVENTION

The present invention is directed to a novel ultrascalable massively parallel supercomputer capable of achieving 1 or multi petaflops with up to 458,752 cores, or 114,688 nodes is disclosed. It is based upon System-On-a-Chip technology, where each processing node comprises a single Application Specific Integrated Circuit (ASIC). The ASIC nodes are interconnected by multiple independent networks that optimally maximize packet communications throughput and minimize latency. The multiple networks may include three high-speed networks for parallel algorithm message passing including a Torus with DMA (direct memory access), a collective network, and a Global Asynchronous network that provides global barrier and notification functions. These multiple independent networks may be collaboratively or independently utilized according to the needs or phases of an algorithm for optimizing algorithm processing performance.

It is thus an object of the present invention to provide a new class of massively-parallel, distributed-memory scalable computer architectures for achieving peta-OPS scale computing and beyond, at decreased cost, power and footprint.

It is another object of the present invention to provide a new class of massively-parallel, distributed-memory scalable computer architectures for achieving peta-OPS scale computing and beyond that allows for a maximum packaging density of processing nodes from an interconnect point of view.

It is an object of the present invention to provide an ultra-scale supercomputing architecture that exploits technological advances in VLSI that enables a computing model where many processors can be integrated into a single ASIC. Preferably, simple processing cores are utilized that have been optimized for minimum power consumption and capable of achieving superior price/performance to those obtainable current architectures, while having system attributes of reliability, availability, and serviceability expected of large servers. Particularly, each computing node comprises a system-on-chip ASIC utilizing four or more processors integrated into one die, with each having full access to all system resources. Many processors on a single die enables adaptive partitioning of the processors to functions such as compute or messaging I/O on an application by application basis, and preferably, enable adaptive partitioning of functions in accordance with various algorithmic phases within an application, or if I/O or other processors are under utilized, then can participate in computation or communication.

It is yet another object of the present invention to provide an ultra-scale supercomputing architecture that incorporates a plurality of network interconnect paradigms. Preferably, these paradigms include a three dimensional torus with DMA, collective network and global asynchronous signal networks. The architecture allows parallel processing message-passing algorithms to exploit these interconnects individually or simultaneously, resulting in performance levels unobtainable with a single paradigm of interconnect. Additional synergies derive the simultaneous use of the multiple processing elements within each node, which can simultaneously access any or all of these interconnects, employing each of them at peak capacity.

It is yet a further object of the present invention to provide a new class of massively-parallel, distributed-memory scalable computer architectures having low latency global communication functionality including the ability for any node to broadcast to all other nodes at high bandwidth and low latency and perform global reduction operations. Such global communication functionality is beneficial for classes of applications involving global 'or' or global 'and' operations, in addition to simple arithmetic functions such as a global addition or maximum, and collective operations.

It is an additional object of the present invention to provide, in an ultra-scale scalable computer architecture, key synergies that allow new and novel techniques and algorithms to be executed in the massively parallel processing arts.

It is still another object of the present invention to provide a single physical network arranged as a graph interconnect for making both global, collective operations and filesystem I/O wherein the both types of communications are carried in order to share the cost of the network. Preferably, the collective network additionally separates I/O operations and collective traffic from the Torus network, and provides a means to attach an arbitrary number of I/O nodes to the application. Because these I/O nodes are physically and logically outside of the Torus, the application can perform I/O and external interactions without unbalancing the performance of the Torus nodes. This leads to significantly enhanced scalability, because the Torus nodes all give predictable and repeatable performance, while the I/O nodes assume the burden of all the asynchronous and unpredictable external interactions.

Moreover, these techniques also provide for partitioning of the massively parallel supercomputer into a flexibly configurable number of smaller, independent parallel computers, each of which retain all of the features of the larger machine. Given the tremendous scale of this supercomputer, these partitioning techniques also provide the ability to transparently remove, or map around, any failed racks or parts of racks referred to herein as "midplanes," so they can be serviced without interfering with the remaining components of the system.

It is still another object of the present invention to add serviceability such as Ethernet addressing via physical location, and JTAG interfacing to Ethernet.

Thus, according to one aspect of the invention, there is provided a scalable, massively parallel supercomputer comprising: a plurality of processing nodes interconnected in n-dimensions by multiple independent networks, each node including one or more processing elements for performing computation or communication activity as required when performing parallel algorithm operations; and, the multiple independent networks comprising networks for enabling point-to-point and collective communications among the nodes of independent partitioned subsets thereof, wherein combinations of said multiple independent networks interconnecting said nodes are collaboratively or independently utilized according to bandwidth and latency requirements of a parallel algorithm for optimizing parallel algorithm processing performance.

In one example embodiment, the node architecture is based upon System-On-a-Chip (SOC) Technology wherein the basic building block is a complete processing "node" comprising a single Application Specific Integrated Circuit (ASIC). When aggregated, each of these processing nodes is termed a 'Cell', allowing one to define this new class of massively parallel machine constructed from a plurality of identical cells as a "Cellular" computer. Each node preferably comprises a plurality (e.g., four or more) of processing elements each of which includes a central processing unit (CPU), a plurality of floating point processors, and a plurality of network interfaces.

The SOC ASIC design of the nodes permits optimal balance of computational performance, packaging density, low cost, and power and cooling requirements. In conjunction with novel packaging technologies, it further enables scalability to unprecedented levels. The system-on-a-chip level integration allows for low latency to all levels of memory including a local main store associated with each node, thereby overcoming a performance bottleneck increasingly affecting traditional supercomputer systems. Within each Node, each of multiple processing elements may be used individually or simultaneously to work on any combination of computation or communication as required by the particular algorithm being solved or executed at any point in time.

Further to this embodiment, at least four modes of operation are supported. In the virtual node mode, each of the processing cores will perform its own MPI (message passing interface) task independently. Each core uses a quarter of the memory (L3 and DRAM) of the node, while coherence among the four MPI within the node and across the nodes is maintained by MPI. In the SMP (Symmetric Multi Processor) 1-core mode, one core performs a single MPI task, using the entire memory capacity of the node. In the SMP 4-core mode, one MPI task with 4 threads is running, using the whole node memory capacity. The fourth mode is called the dual mode. In this hybrid dual mode case, two SMP MPI tasks are running, with each SMP using 2 cores running a thread each. Finally, one can also support modes such as a 1,3 split, and 1, or 2 or 3 cores idling. Thus a node can trade off amount of memory versus parallelism, a feature unique to this supercomputer.

Because of the torus' DMA feature, internode communications can overlap with computations running concurrently on the nodes. Also complex forms of messaging protocols, particular arithmetic functions, often called "reduction functions", are required to be invoked on message data as it arrives. One core, may be implemented to perform these functions without distracting computations on other cores. Additionally, because of the computational power of the I/O Processor, the application is able to define arbitrarily complex reduction functions, supporting new algorithmic development that overlaps computational power with communication activities. For particular classes of parallel algorithms, or parts of parallel calculations, this architecture may apply the power of some or all cores to work in collaboration on communication activities.

This architecture allows the multiple networks to be utilized simultaneously, independently, or in collaboration. Because of the system-on-a-chip level integration, in collaboration with operating system software designed to take advantage of this architecture, alternating between such modes of operation can occur with minimal overheads. In cases where the computation is awaiting message arrival, this may happen automatically.

To connect nodes, multiple network paradigms are implemented to interconnect nodes for use individually or simultaneously and include three high-speed networks for parallel algorithm message passing. Additional networks are provided for external connectivity and are used for Input/Output, System Management and Configuration, and Debug and Monitoring services for the supercomputer nodes. The high-speed networks preferably include n-dimensional Torus, collective network, and Global Signal configurations. The use of each of these networks may switch back and forth based on algorithmic needs or phases of algorithms. For example, parts of calculations may be performed with the Torus, or part on the collective network which facilitates the development of new parallel algorithms that simultaneously employ multiple networks in novel ways.

With respect to the Torus network, it is preferably of 3-dimensional design supporting cuboidal or rectangular communication and partitioning. A 3-Dimensional design allows a direct mapping of computational simulations of many physical phenomena to the Torus network. However, higher dimensionality, 4, 5 or 6-dimensional Toroids, which allow shorter and lower latency paths at the expense of more chip-to-chip connections and significantly higher cabling costs have been implemented in the past. Lower dimensions give longer latency and fewer chip-to-chip communications. Additionally implemented is a Minimal-Path Adaptive-Routed using Virtual Cut-Through (VCT) packet. This packet based switching network protocol provides sustained high-bandwidth by automatically routing around any points of network congestion. It additionally provides for deterministic path routing for parallel calculations that benefit from it, or high-priority messages.

Additionally, the torus provides for automatic multi-cast using "Class Routing" techniques where a single packet injected into the network can be deposited at multiple destinations. The network is deadlock free by employing two dynamic Virtual Circuits plus two escape "Bubble" circuits for deadlock avoidance. While Torus networks have been used before, as described in herein incorporated, commonly-owned, co-pending U.S. Patent Publication No. US04/0078482 (U.S. application Ser. No. 10/469,001) entitled "Optimized Scalable Network Switch," novel arbitration policies are used to achieve low latency and high throughput in massively scalable systems. A Point-to-Point token-based flow-control most effectively utilizes network buffering while distributing traffic away from hot spots. Guaranteed reliable delivery of packets is further enabled in the torus by employing separate CRC Error Detection on the headers, and full packet CRC error detection for automatic retransmission of corrupted network packets.

With respect to the collective network, one primary functionality is to support global broadcast (down-tree) and global reduce (up-tree) operations. Additional functionality is provided to support programmable point-to-point or sub-tree messaging used for Input/output, program load, system management, parallel job monitoring and debug. This functionality enables input/output nodes to be isolated from the Torus network so as not to interfere with computation. That is, all nodes in the Torus may operate at the full computational rate, while I/O nodes offload asynchronous external interactions. This ensures scalability and repeatability of the parallel computation since all nodes performing the computation operate at the full and consistent rate. Preferably, the collective network supports the execution of mathematical functions implementing reduction messaging operations. Preferably, the collective network additionally supports multiple independent virtual channels, allowing multiple independent collective operations to proceed simultaneously. The design is configurable and the ratio of computation nodes to I/O nodes is flexible depending on requirements of the parallel calculations. Alternate packaging strategies allow any ratio, including a machine comprised of all input/output nodes, as would be ideal for extremely data-intensive computations.

A third network includes a Global Signal Network that supports communications of multiple asynchronous "signals" to provide global logical "AND" or "OR" functionality. This functionality is specifically provided to support global barrier operations ("AND"), for indicating to all nodes that, for example, all nodes in the partition have arrived at a specific point in the computation or phase of the parallel algorithm; and, global notification ("OR") functionality, for indicating to all nodes that, for example, one or any node in the partition has arrived at a particular state or condition. Use of this network type enables technology for novel parallel algorithms, coordination, and system management.

Further independent networks include an external Network (such as a 10 Gigabit Ethernet) that provides attachment of input/output nodes to external server and host computers; and a Control Network (a combination of 1 Gb Ethernet and a IEEE 1149.1 Joint Test Access Group (JTAG) network) that provides complete low-level debug, diagnostic and configuration capabilities for all nodes in the entire machine, and which is under control of a remote independent host machine, called the "Service Node". Preferably, use of the Control Network operates with or without the cooperation of any software executing on the nodes of the parallel machine. Nodes may be debugged or inspected transparently to any software they may be executing. The Control Network provides the ability to address all nodes simultaneously or any subset of nodes in the machine. This level of diagnostics and debug is an enabling technology for massive levels of scalability for both the hardware and software.

Novel packaging technologies are employed for the supercomputing system that enables unprecedented levels of scalability, permitting multiple networks and multiple processor configurations. In one embodiment, there is provided multinode "Node Cards" including a plurality of Compute Nodes, plus optionally one or two I/O Node where the external I/O Network is enabled. In this way, the ratio of computation to external input/output may be flexibly selected by populating "midplane" units with the desired number of I/O nodes. The packaging technology permits sub-network partitionability, enabling simultaneous work on multiple independent problems. Thus, smaller development, test and debug partitions may be generated that do not interfere with other partitions.

Connections between midplanes and racks are selected to be operable based on partitioning. Segmentation creates isolated partitions; each maintaining the full capabilities of all interconnects, providing predictable and repeatable performance. This enables fine-grained application performance tuning and load balancing that remains valid on any partition of the same size and shape. In the case where extremely subtle errors or problems are encountered, this partitioning architecture allows precise repeatability of a large scale parallel application. Partitionability, as enabled by the present invention, provides the ability to segment so that a network configuration may be devised to avoid, or map around, non-working racks or midplanes in the supercomputing machine so that they may be serviced while the remaining components continue operation.

Advantageously, the novel packaging and system management methods and apparatuses of the present invention support the aggregation of the computing nodes to unprecedented levels of scalability, supporting the computation of "Grand Challenge" problems in parallel computing, and addressing a large class of problems including those where the high performance computational kernel involves finite difference equations, dense or sparse equation solution or transforms, and that can be naturally mapped onto a multidimensional grid. Classes of problems for which the present invention is particularly well-suited are encountered in the field of molecular dynamics (classical and quantum) for life sciences and material sciences, computational fluid dynamics, astrophysics, Quantum Chromodynamics, pointer chasing, and others.

BRIEF DESCRIPTION OF THE DRAWINGS

The objects, features and advantages of the present invention will become apparent to one skilled in the art, in view of the following detailed description taken in combination with the attached drawings, in which:

FIG. 1A-1 is schematic diagram highlighting the functional structure of a parallel computer system of the invention, comprising multiple nodes connected together by a network, and including a novel DMA engine implemented in the present invention;

FIG. 1A-2 is schematic representation of injection counters and reception counters utilized in the parallel computer system of the invention (FIG. 1A); and FIG. 1A-3 depicts functional operation of a shared counter (3A) as utilized by multiple messages.

FIG. 1B-1 is a detailed view of additional functionality provided by the novel DMA engine 116 of FIG. 1A-1;

FIG. 1B-2 is a more detailed view of the several features of the novel DMA highlighted in FIG. 1B-1;

FIG. 1B-3 depicts one embodiment of a DMA-based message passing method of the invention for implementing third-party sends; and FIG. 1B-4 depicts one embodiment of an alternative DMA-based remote message passing method of the invention.

FIG. 1C-1 is a schematic diagram illustrating one embodiment of the novel DMA engine for repeating communication patterns, included in the FIG. 1 parallel computer system;

FIG. 1C-2 is a schematic diagram illustrating for a single Injection FIFO the Injection FIFO Metadata of the DMA engine for repeating communication patterns of the invention.

FIG. 1D-1 illustrates a general structure of DMA byte counters in one embodiment of the present disclosure.

FIG. 1D-2 illustrates a reception buffer for a broadcast split into multiple colors in one embodiment of the present disclosure.

FIG. 1D-3 is a flow diagram illustrating a method for a long broadcast in one embodiment of the present disclosure.

FIG. 1D-4 shows a receive buffer for a short reduction with slots allocated for each processor in one embodiment of the present disclosure.

FIG. 2 depicts an example Node architecture for the massively parallel supercomputer of the present invention detailing L2, L3, and 10 Gb Ethernet Connections according to one embodiment of the present invention;

FIG. 3 depicts a high level schematic diagram illustrating application of a write-invalidate cache coherence protocol for providing coherency of four cores and the torus DMA;

FIG. 4 depicts a high level schematic diagram illustrating a collective network application implemented in the massively parallel supercomputer of the present invention;

DETAILED DESCRIPTION OF THE PREFERRED EMBODIMENTS

The Massively Parallel Supercomputer architecture of the invention (alternately referred to herein as the "supercomputer") is in the form of a three-dimensional torus interconnected and designed to deliver processing power on the order of a petaflops (a quadrillion floating-point operations per second) for a wide range of applications. In an exemplary embodiment described herein, the Massively Parallel Supercomputer architecture comprises 72K processing nodes organized as a 72×32×32 with each compute node being connected to six (6) neighboring nodes via 6 bi-directional torus links as depicted in the three-dimensional torus sub-cube portion shown in FIG. 5. It is understood however, that other architectures comprising more processing nodes in different torus configurations (i.e., different number of racks) is also used.

As will be described in greater detail herein, each node comprises a single ASIC and a plurality of SDRAM-DDR2 memory chips. The nodes are interconnected through at least six (6) networks, the highest aggregate bandwidth of which is a nearest neighbor link that maps the nodes into a physical 3-dimensional torus. In the described embodiment, the interconnect structure comprises a torus with preferably no asymmetries as the nodes communicate with the same bandwidth and nearly the same latency to nodes that are physically close as to those which are physically located on neighboring racks. This facilitates simpler programming models. The ASIC that powers the nodes is based on system-on-a-chip (s-o-c) technology and incorporates all of the functionality needed by the system. It additionally includes 8 MB or more of extremely high bandwidth embedded DRAM. The nodes themselves are physically small allowing for a very high density of processing and optimizing cost/performance In the described embodiment, system packaging comprises 512 processing nodes on a doubled-sided board or "midplane". Each node includes 4 cores for handling computation and message passing operations. In addition, associated with a prescribed plurality of processing nodes is a dedicated node that comprises a quad-processor with external memory, for handling of I/O communications to and from the compute nodes. Each I/O node has an operating system (Linux based) that can handle basic tasks and all the functions' necessary for high performance real time code. For compiling, diagnostics, and analysis a host machine is required. The I/O nodes contain a software layer above the layer on the compute nodes for handling host communications. The choice of host will depend on the class of applications and their bandwidth and performance requirements.

Node Overview

Figure 1:
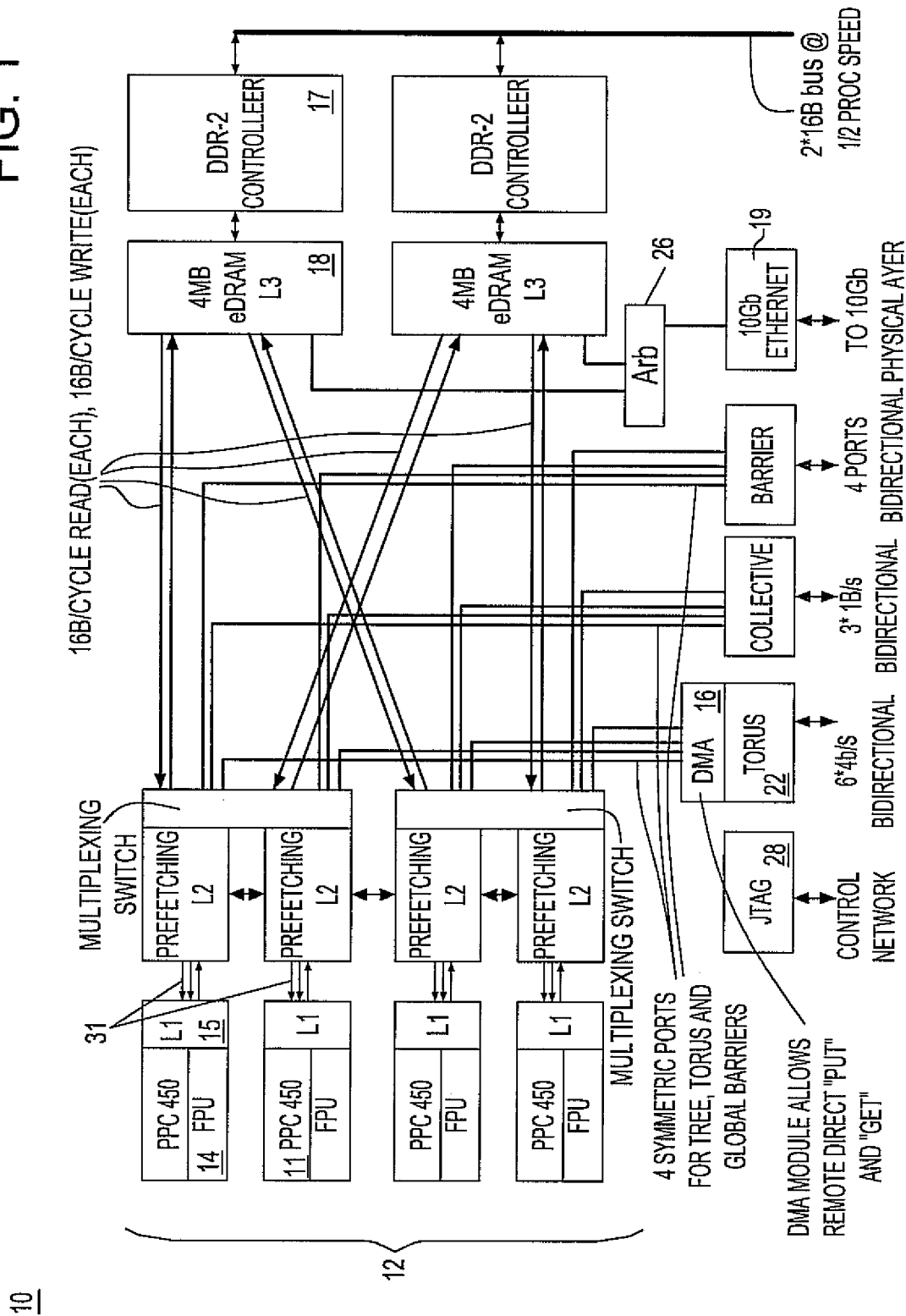
FIG. 1 depicts a node ASIC 10 for the massively parallel supercomputer of the present invention.

FIG. 1 is a block diagram illustrating a single computing node ASIC 10 according to the principles of the invention. Each node preferably is based on the chip process that integrates all the functions of a computer into a single compute ASIC, enabling dramatic reduction of node size and power consumption. In a supercomputer, this can be further leveraged to increase node density thereby decreasing the overall cost/performance for the machine. As shown in FIG. 1, the ASIC of this design, which may function as both a compute node and an I/O node in the system, include four processing cores 11, each having a "double" floating point unit 14, that includes two coupled standard floating point units. This arrangement gives a peak performance of four floating point operations per processor core per clock cycle. The processor core is a PowerPC450 embedded core available from IBM microelectronics, although future versions of this core may be used as technology improves. A description of the functionality of the core may be found at http://www.ibm.com/chips/power/powerpc/. The "Double" FPU unit increases the data bandwidth by increasing the datapath from 64 bits to 128 bits to allow for quadword Floating Point loads and stores (i.e., data moving). Additionally, this unit has been architected to allow two floating point multiply-add instructions to be dispatched and executed in one cycle. The dual floating point pipelines allow for newly architected (single instruction, multiple data) instructions for complex number arithmetic. As an example shown in Table 1, consider a code fragment which performs an operation A*B+C on three complex numbers, A, B and C. Assume that prior to the computation, the registers ar and ai contain the real and imaginary parts of A, and similarly, the pairs br and bi, and cr and ci hold the values of B and C. A compiler would automatically be able to generate the following code, requiring just two instructions, which places the result into a register pair dr and di.

TABLE 1

Complex A*B + C on Double-FMA in SIMD Mode.

ar* br + cr → tr; ar * bi + ci → ti first FMA SIMD instruction
−ai * bi + tr →dr; ai * br + ti → di second SIMD instruction The node further incorporates other functions into the ASIC. Besides the embedded processing core and floating point cores, the system includes embedded DRAM 18, an integrated external DDR2 memory controller, a Direct Memory Access (DMA) module 16, 10 Gb Ethernet interface and associated functionality 19 as well as all the network link cut-through routing buffers and routing control block that allow any two nodes to communicate with low latency. The compute node particularly includes four embedded cores 11, such as the PPC450, each capable of being utilized for message handling and computation operations.

As further shown in FIG. 1, virtual cut-through torus routing is supported in hardware block 22, which is integrated into the ASIC allowing for the elimination of the network adapter. Preferably, a virtual channel routing network is supported with two (2) dynamic and two (2) deterministic channels.

The details of DMA feature of the torus network may be found in the co-pending U.S. patent application Ser. Nos. 11/768,784, 11/768,645, 11/768,781, 11/768,682, 11/768,795, 11/768,813 and 11/768,572 the whole contents of which are described or otherwise provided herein below.

As implemented in the supercomputer of the invention having multiple nodes as shown in FIG. 1, the direct memory access (DMA) engine 16 permits certain hardware sub-systems within a computer system to access system memory for reading and/or writing that is independent of the central processing unit, or compute nodes comprising processor(s) in the case of parallel computer system. A DMA transfer comprises functions for copying a block of memory (data) from one device to another within a computer or computer system, e.g., from system RAM to or from a buffer on the DMA device w/o interrupting the processor operation, which is quite important to high-performance embedded systems such as implemented in the present invention. The CPU initiates the DMA transfer, but the DMA carries out the task. Further use of the DMA 16 engine is made by disk drive controllers, graphics cards, network cards, sound cards and like devices.

Computer systems that employ DMAs, and DMA message passing can transfer data to and from system devices with much less CPU overhead than computer systems constructed to message and pass data without a DMA engine or channel. For example, the BlueGene/P massively parallel supercomputer (alternately referred to herein as the "BGP supercomputer") available from International Business Machines, Inc. (IBM), includes a DMA engine integrated onto the same chip as the processors (CPUs), cache memory, memory controller and network logic.

One operation facilitated by use of the DMA engine in the processing node is the sharing of reception and injection byte counters among the network compute nodes (for both computation and I/O tasks or applications) and respective processor core elements in the interconnected as a network. Each compute node, or I/O node comprising the parallel computer system includes a plurality of processors, memory and a DMA engine, constructed from a single ASIC such that DMA resources, e.g., DMA reception and injection byte counters, are limited As such, the system provides that the processors and the DMA can write and read the shared byte counters in such a way that more outstanding messages can be supported by the DMA engine, and therefore the parallel computer system.

The ASIC nodes 10 (FIG. 1) comprising the parallel computer system that are interconnected by multiple independent networks optimally maximize packet communications throughput the system with minimal latency. As mentioned herein, in one embodiment of the invention, the multiple networks include three high-speed networks for parallel algorithm message passing, including the Torus with direct memory access (DMA), collective network, and a Global Asynchronous network that provides global barrier and notification functions.

Furthermore, at least four modes of operation are supported: the virtual mode, SMP 1-core mode, SMP 4-core mode, and a dual mode. In the virtual node mode, each of the processing cores will perform its own MPI (message passing interface) task independently. Each core uses approximately one-quarter of the memory (L3 and DRAM) of the compute node, while coherence among the four MPI within the node and across the nodes is maintained by MPI. In the SMP (Symmetric Multi Processor) 1-core mode, one core performs a single MPI task, using the entire memory capacity of the node. In the SMP 4-core mode, one MPI task with 4 threads is running, using the whole node memory capacity. The fourth or dual mode is a hybrid case, wherein two SMP MPI tasks are running, with each SMP using 2 processor cores running a thread each. Finally, one can also support modes such as a 1, 3 split, and 1, or 2 or 3 cores idling. Thus a compute node can trade off amount of memory versus parallelism, a feature unique to this supercomputer, or parallel computer system.

Because of the torus's DMA feature, internode communications can overlap with computations running concurrently on the compute nodes. Also, complex forms of messaging protocols, particular arithmetic functions, often called "reduction functions", are required to be invoked on message data as it arrives. One compute node core, or processor, may be designated to perform these functions without distracting computations on other processor cores. Additionally, because of the computational power of the I/O processor, the application is able to define arbitrarily complex reduction functions, supporting new algorithmic development that overlaps computational power with communication activities. For particular classes of parallel algorithms, or parts of parallel calculations, this architecture may apply the power of some or all cores at a particular compute node to work in collaboration on communication activities.

Figures 1, 1A:
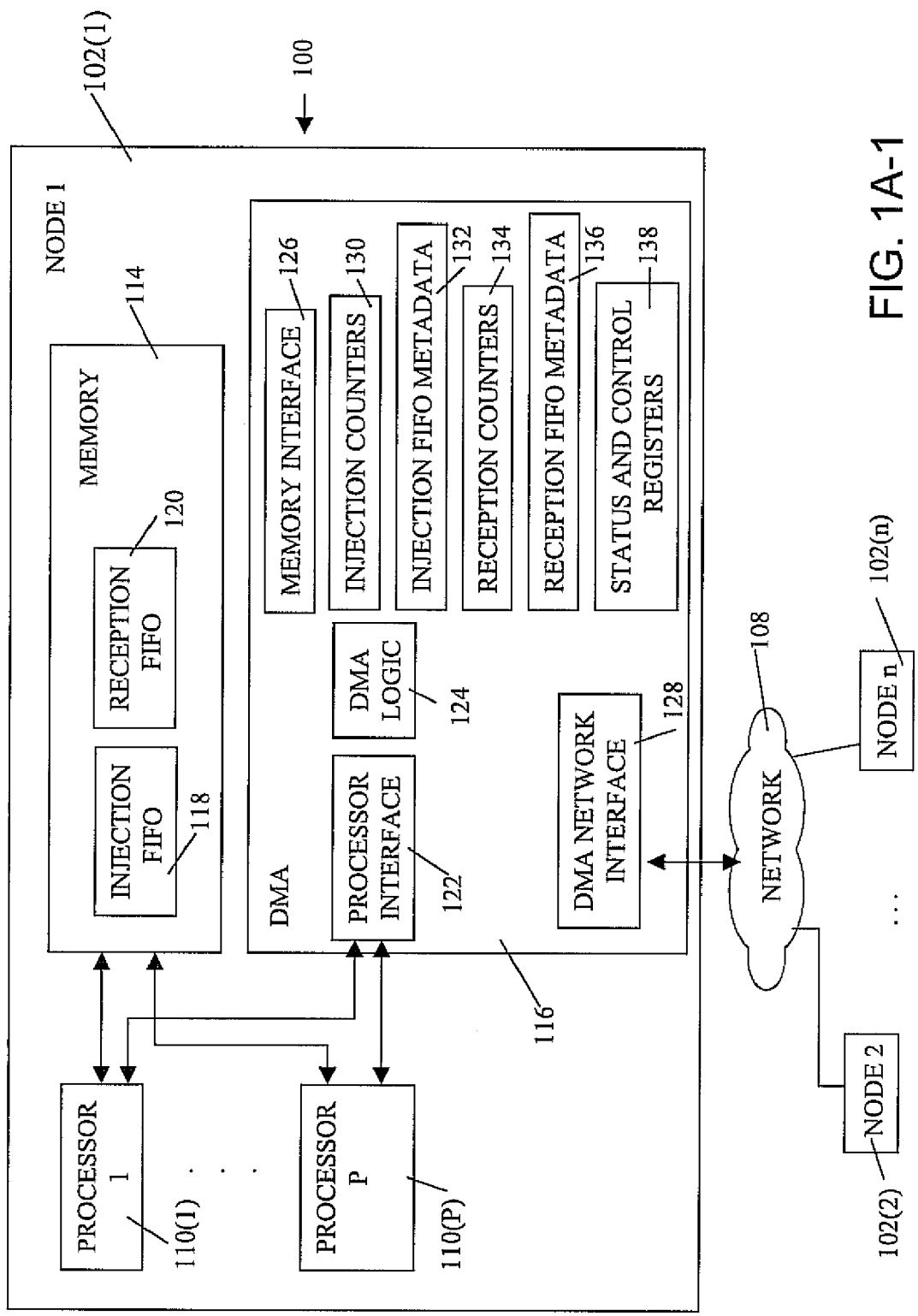

FIG. 1A-1 is a more detailed schematic block diagram illustrating one embodiment of the massively parallel, ultra-scalable supercomputer 100 implementing ASIC nodes including the novel DMA engine 116, and implementing the DMA's novel message passing using a limited number of shared DMA byte counters. Parallel computer system 100 comprises a plurality of individual compute nodes 102(1), 102(2)... 102(n), which, as mentioned, are constructed as single ASICs and interconnected across a network 108. FIG. 1A-1 highlights a preferred construction of one of the compute nodes, ASIC 102(1), constructed in accordance with the principles of the invention. Each of compute nodes (102(n)) is fabricated to integrate all the functions of a computer into a single compute ASIC to enable a dramatic reduction in node size and power consumption. In a supercomputer, or parallel computer system, the reduced node size and its lower power consumption provides for increased node density thereby decreasing the overall cost/performance for the parallel computer system (100).

In more detail, compute node or ASIC 102(1) may function as both a compute node and an I/O node in the parallel computer system (100). Compute node 102(1) comprises a plurality of processors or processor cores, 110(1), ... 110(p), where p is equal to four (p=4), or more.

Besides the embedded processing cores 110(p), and floating point cores (not shown in FIG. 1A-1), parallel computer system 100 includes a DMA 116 (constructed in accordance with the invention), and a memory 114. (This memory may be implemented as a memory subsystem consisting of embedded DRAM, a memory controller, and normal DRAM) Memory 114 includes injection 118 and reception 120 FIFOs. Processors can read and write the memory as can a DMA engine (116). DMA engine 116 consists of a processor interface 122, DMA logic 124, a memory interface 126, and a DMA network interface 128, injection counters 130, injection FIFO metadata 132, reception counters 134, reception FIFO metadata 136 and status and control registers 138. The injection FIFO metadata 132 include pointers to where in memory (114) the Injection FIFOs 118 are located, and the current head and tail of the FIFOs. The Reception FIFO metadata 136 includes pointers to where in memory the Reception FIFOs 120 are located, and the current head and tail of the FIFOs. Especially in a system-on-a-chip implementation, the amount of logic area devoted to the DMA is extremely limited, and thus the number of counters is relatively small. Effective sharing of counters between multiple messages is therefore needed to ensure high quality performance.

DMA engine 116 directly controls transfer of long messages, which long messages are typically preceded by short protocol messages that are deposited into reception FIFOs on a receiving node (for example, compute node 102(2)). Through these protocol messages, the sender compute node and receiver compute node agree on which injection counter (130) and reception counter (134) identifications to use, and what the base offsets are for the messages being processed. The software is constructed so that the sender and receiver nodes agree to the counter ids and offsets without having to send such protocol messages. Long message transfer may be initiated by a core processor on the sender node by placing a "put" message descriptor into an injection FIFO 118 (in memory 114), writing the injection counter base and writing (for a non-shared counter) incrementing (for a shared counter) the counter value via writes via the DMA (memory) interface 126, and appropriately modifying the injection FIFO metadata 132 for that message. This includes advancing a tail pointer in the corresponding injection FIFO metadata indicating the "last" message descriptor via a write to the DMA processor interface 122. DMA logic 124 reads the injection FIFO metadata 132 and recognizes which FIFOs have messages to be sent.

The DMA logic causes the memory interface 126 to read the message descriptor in the Injection FIFO 118. The put message descriptor includes the injection (130) and reception counter (134) ids to be used, the message length, the initial injection and reception offsets of the message, the destination node and other network routing information. The DMA engine 116 begins fetching the message and assembling it into "put" packets to be placed on to the network (108). Each put packet contains the reception counter id, an offset from the reception counter base address (134) where the data from this packet is to be stored, and a count of how many bytes in this packet should be written. Novel DMA engine 116 is responsible for updating this information correctly for each packet, and puts the packets into the DMA network interface 128 (when space is available), at which time the packet enters the network and is routed to the destination compute node (e.g., compute node (p)).

After DMA engine 116 puts the message in the DMA network interface 128, it decrements the specified injection counter 130 by the number of bytes in the packet. Upon reaching the destination, the packet is put into the DMA network interface at that compute node (e.g., 102(p)), and the node's local DMA engine "recognizes" that the packet is there. For a put packet, the receiver compute node's DMA engine reads the reception counter id, offset and count from the received packet, looks up the reception counter base address, writes the appropriate number of bytes starting at the counter's base plus packet offset, and then decrements the counter value by the bytes.

If a remote get operation is used, instead of the processor on the sender node injecting a descriptor into the injection FIFO 118, the receiver node sends a short get message (which contains a put descriptor and an injection FIFO id) to the sender compute node (e.g., 102(p)), and the DMA logic at the sender compute node puts this descriptor into the injection FIFO specified in the packet, and advances that FIFO's metadata appropriately. To share a byte counter, the base address of the shared counter must be set to a value smaller than the base address of any message to be using that counter. The initial value of the shared byte counter may be set to zero. The initial offset in a message descriptor is the message's starting address minus this base offset. The particular processor increments the counter value by the current message length, and in accordance with the novel DMA engine and shared byte counter operation, the processor need only know the current message length, but not the lengths of the other messages using the shared byte counter, nor the number of bytes that have already been received. It is understood that the byte counter can be shared between messages even if the messages come from different source compute nodes.

Network 108 preferably provides all the network link cut-through routing buffers and routing control block that allow any two nodes to communicate with low latency. The four (or "p") processor cores embedded in ASIC (node 102(1)) as shown may be utilized for message handling and computation operations with the virtual cut-through torus routing supported by hardware block 22 integrated into the compute nodes.

Figures 1, 1A, 2:
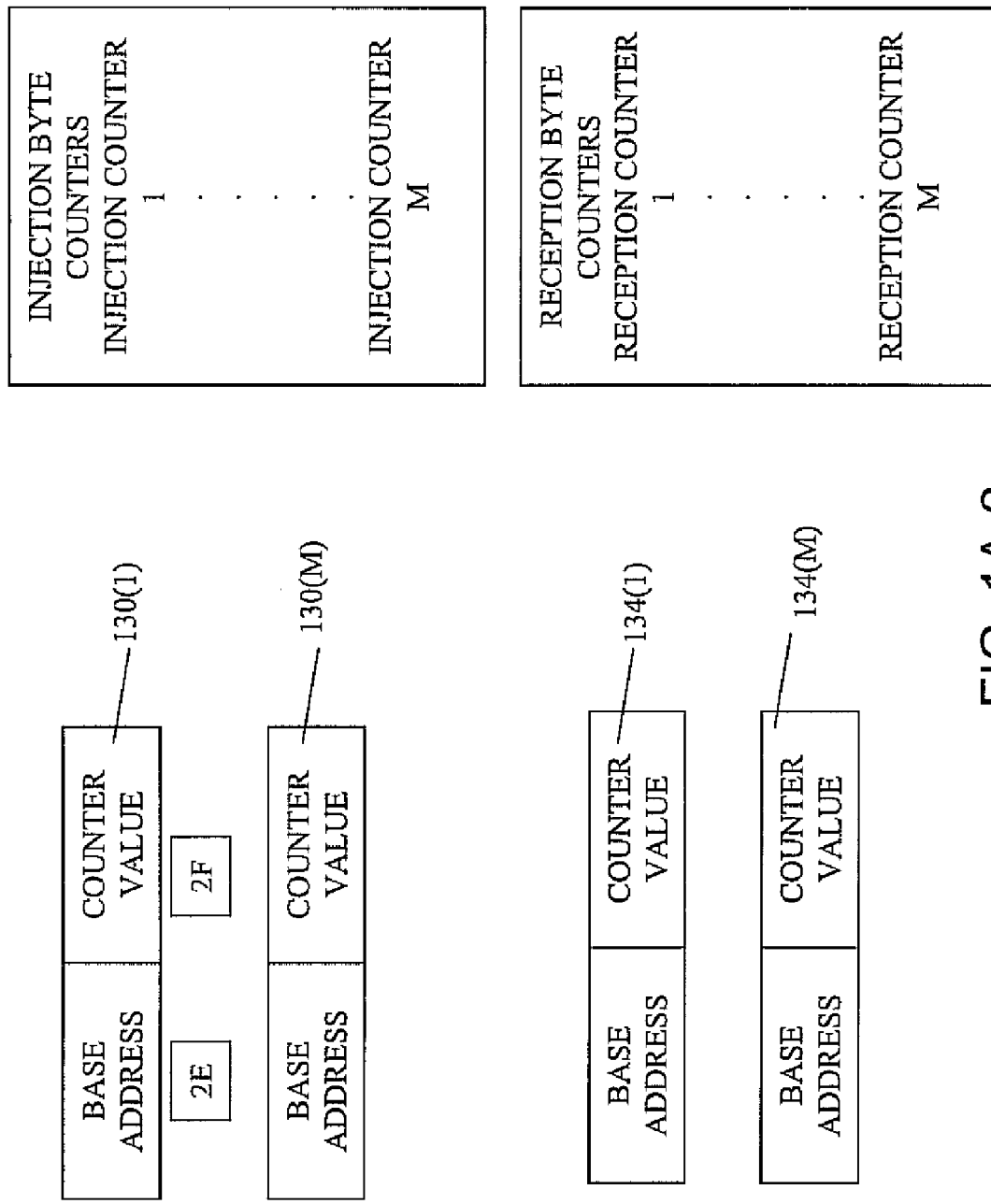

FIG. 1A-2 provides further detail of the multiple shared injection byte counters 130(1) through 130(m), and multiple shared reception byte counters 134(1) through 134(m). Each of the shared byte counters, whether injection or reception, has a base address, e.g., address 2E, and a byte counter value, e.g., value 2F, as indicated in shared injection byte counter 130(1).

FIG. 1A-3 highlights the operation by which a single shared reception byte counter 130(1) may be used by multiple messages 3B and 3C (in this case two messages). The base address of the shared reception byte counter 134(1) has a value, which is a lower bound (3A in the figure) of the starting addresses of the multiple messages 3B, 3C. The initial offset for each message, identified as 3F, 3G for messages 3B, 3C, respectively, is the difference between the messages' starting addresses and the base address portion contained in shared reception byte counter 134(1) as shown.

The DMA engine 116 shown in FIG. 1A-1, the details of which explained with respect to FIGS. 1A-2 and 1A-3, is particularly suited for passing long messages (which are processed atomically) in the parallel computer system. Long messages are typically preceded by short protocol messages that are deposited into a reception FIFOs on the receiving node. Through these protocol messages, the sender and receiver agree on which injection and reception counter ids to use, and what the base offsets of the message are. The long message transfer can then be initiated by a processor on a sending node, e.g., 102(1), by placing a "put" message descriptor into injection FIFO (memory) 118, writing the injection counter base and value via writes to the DMA processor interface 122 and appropriately modifying the Injection FIFO metadata 132 for that message (e.g., advancing a tail pointer indicating the last message descriptor in the FIFO) via a write to the DMA's processor interface 122. DMA logic 124 is responsible for reading the injection FIFO metadata 132 and recognizing which FIFOs have messages to be sent.

The DMA logic causes the memory interface 126 to read the message descriptor in the Injection FIFO (memory) 118.

The put message descriptor includes the injection and reception counter ids to be used, the message length, the initial injection and reception offsets of the message and the destination node and other network routing information. The DMA engine begins fetching the message and assembling it into packets to be put in the network. Each packet contains an offset from the reception counter 134, where the data from this packet is to be stored, and a count of how many bytes in this packet should be written. The DMA is responsible for updating this information correctly for each packet, and puts the packets into the DMA network interface 128 (when space is available) at which time the packet enters the network and is routed to the destination node.

After the DMA engine puts the message in the DMA network interface, it decrements the shared injection counter by die number of bytes in the packet and adjusts the injection FIFOs metadata by advancing the head pointer. Upon reaching the destination, the packet is put into the DMA network interface at the target compute node, the local DMA of which recognizes that the packet is there. The target DMA reads the reception counter id, offset and count from the packet, looks up the reception counter base address, writes the appropriate number of bytes starting at the base plus packet offset and then decrements the counter value by the bytes.

If a remote get operation is used, instead of the processor on the sending node injecting a descriptor into the injection FIFO, the receiving node sends a short get message (which contains a put descriptor) to the sender, and the sender DMA logic 124 puts this descriptor into the injection FIFO 118 and advances the FIFO's metadata 132 appropriately.

To share a counter, the base address of the shared counter must be set to a value smaller than the base address of any message to be using that counter. The initial value of the counter is set to zero. The initial offset in a message descriptor is the message's starting address minus this base offset. The local processor associated with the message then increments the counter value by the current message length; the local processor only needs to know the current message length, not the lengths of the other messages using this counter, nor how many bytes have already been received. The DMA engine ensures that this increment operation is done atomically, so that immediately after the increment, the counter contains the sum of the number of bytes to be injected (received) minus the number of bytes already injected (received). Thus when the shared injection (reception) counter reaches zero, all bytes in all messages have been sent (received). If the initial value of the counter is not zero, but some arbitrary value C, then all messages are complete when the byte count reaches arbitrary value C. Messages sharing the counter may be sent to/received from different nodes in the parallel computer system.

It should be understood that the DMA engine's use of shared byte counters may be realized in hardware, software, or a combination of hardware and software. However, it is not limited to applications therein, but may be implemented in any kind of parallel computer/server system(s)—or other parallel computer system adapted for carrying out message passing using the novel DMA engine's use of shared byte counters.

As described herein, two packet types are distinguished, general packets and special packets. General packets are handled by DMA engines at compute nodes comprising the parallel computer system similar to conventional transfers, and special packets are handled by the novel processing ability of the invention, and contain the destination address(es) where the special packets are to be stored. The invention detects special packets, extracts destination addresses from the packets and reorders the packets if received out-of-order.

The novel parallel computer system, DMA engine, and method for message passing tracks the number of received packets, or the number of outstanding packets by using DMA channel byte counters.

Special packets are part of a long message (data transfer) partitioned into multiple packets which are to be stored into continuous address space for further handling by the application. Special packets contain a destination address on the receiver side as a part of the packet header, extended header or payload. The destination address is disclosed by the receiver during the rendezvous prior to the message start or at the beginning of data transfer. Special packets are identified by one or more bits in the packet header. For that matter, the packet header contains one or more fields to specify packet type (Dm): 0—general packet; and 1—special packet. Special packets contain several bytes to specify the destination address, or address offset in the receiver address space, "Put offset" fields, packet header, extended header or payload contain information on channel, and VC fields, and are constructed to support one or more channels to keep track of one or more data streams.

In preferred embodiments the parallel computer system, DMA engine, and novel message passing operation of the invention include that one or more DMA channels for data reception are supported, and can receive several intermixed packet streams by keeping track of number of received and outstanding packets belonging to a single message/packet stream. This is implemented using injection and reception byte counters in each DMA channel, which are set at the beginning of the reception of a packet stream at the remote compute node. The reception or injection byte counters use a specified number of bytes, or specified number of packets that will be received. That is, at the reception of a packet, a channel field in the packet identifies the channel and the corresponding channel counter is updated (decremented by the number of valid data bytes in the package). When the channel counter reaches 0 all packets/bytes have been received. The channel then notifies the processor by raising the interrupt or uses some other means for processor notification (like polling).

Figures 1, 1A, 2, 3:
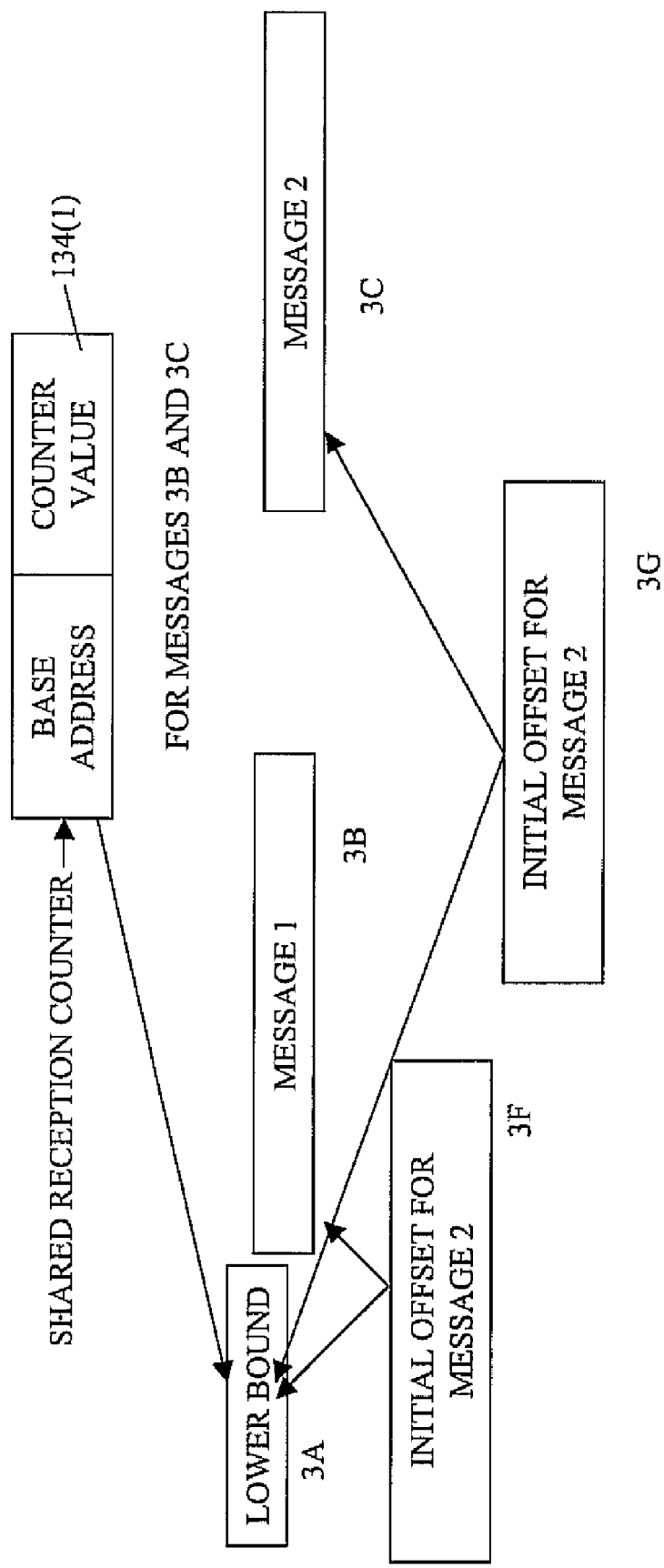
Figures 1, 1B, 2, 3:
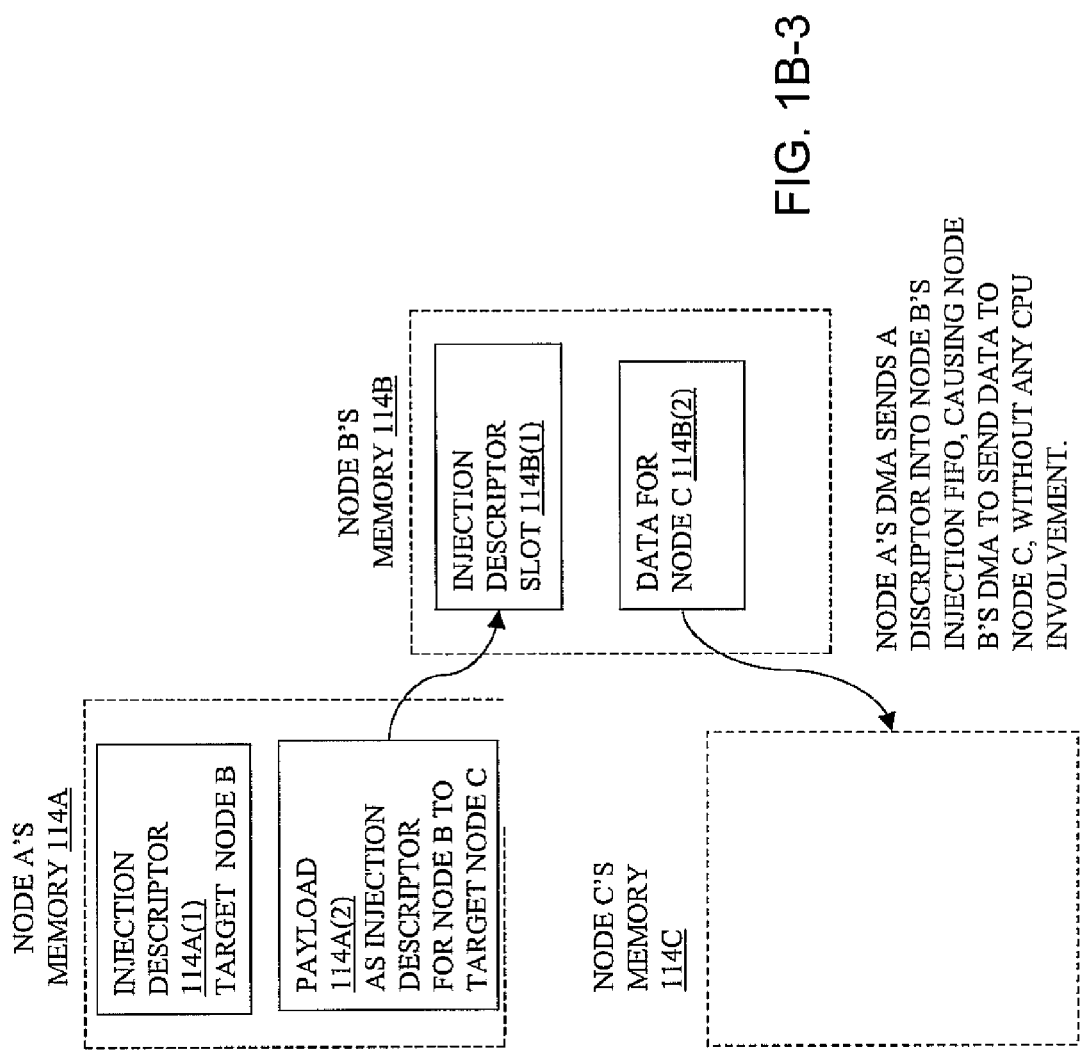

FIG. 1B-1 herein describes the injection and reception FIFOs (as FIFO registers, broadly) of DMA 116, as well as injection and reception counters. Processor interface 122 within the DMA provide or allow processors on the same compute ASIC chip (comprising a compute node such as node 102($n$) program the DMA, and read the status registers (as described in detail above). When a compute node is sending a message, its DMA injects the message by reading data from main memory 114 through L3 cache or memory interface 126, and writes into the torus network via the DMA network interface 128. When it is receiving, DMA 116 transfers data from the torus network (reading from DMA network interface 128) and writes data back into the main memory through the L3 cache or memory interface 126. The main DMA internal registers comprise 128 injection FIFOs, 256 injection counters, 32 reception FIFOs, 256 reception counters, and various status and interrupt bits, such as to flag when a FIFO crosses a threshold, or when a count-down counter becomes zero.

Each FIFO (injection or reception) comprises 4 FIFO registers, as shown in FIG. 1B-1. When a FIFO is programmed, a physical address range of the main memory from a start address is maintained in start address register 133(1), to the end address maintained in end address register 133(2) for the FIFO shown. A head pointer register 133(3) and tail pointer register 133(4) indicates where the valid data are (in memory 114). The valid data exist in memory within the range of the start address and end address under the control of either the DMA, or an instance or thread of a global application running on the processors (110(p)), depending on the particular operating mode. Injection counters 130 (FIG. 1A) are shown in FIG. 1B-1 to include a base address register 131(1) and a byte count register 131(2). Reception counters 134 also contain a base address register 135(1), a byte counter register 135(2), and an additional maximum (max) address 135(3).

Upon initialization, the head and tail pointer registers 133 (3), 133(4) of an injection FIFO 132 are set to the start address contained in register 133(1). The thread or instance of the global application running at the compute node write injection descriptors into the injection FIFO 118 and move the tail pointer in tail pointer register 133(4). The DMA 116 detects that the head and tail points (as maintained in head (133(3)) and tail (133(4))) registers are now different. The DMA therefore begins processing the descriptors maintained in the FIFO. Each injection descriptor is 32 bytes long, and corresponds to one message to be sent over the network (injection descriptors are essentially messages, which identify data for transfer by the message). Once a message is sent, the DMA moves the head pointer up by 32 bytes (in head pointer register 133(3), until it reaches the value maintained in the tail pointer register 133(4). When either the head or tail pointer reaches the end address maintained by register 133(2), they wrap back to start address (in start address register 133(1)). The thread or instance of the global application program "wraps" back the tail pointer, and the DMA 116 automatically, and without processor interaction (or interruption) controls the head pointer wrap back.

The valid descriptors are stored in memory 114 within memory addressed extending (1) from the head pointer to the tail pointer, if the number maintained in the tail pointer register (133(4)) is larger than the number maintained in the head pointer register (133(3)), or (2) if from the address represented by the number maintained in the head pointer register to the end address maintained in the end address register, then from the start address in the start address register to the tail pointer as maintained in the tail pointer register, if the number in the tail pointer register is less than the number maintained in the head pointer register.

FIG. 1B-2 herein depicts injection FIFO descriptor format (139), torus network hardware header format 141, FIFO packet application header format 143 and DMA put/get hardware header format 144. With respect to the FIFO descriptor format 139, a 32 byte descriptor is includes to describes complete message, and as shown in injection descriptor format 139, includes a 16 byte control field (139(1)), which contains information local to a compute node, and a 16 byte network packet header 139(2), the packet header to be sent over the network along with the message data. Control field (139(1)) includes a local transfer flag (139(11)) to indicate whether the message is a local transfer. If the local transfer flag is set to 1, then the current message will be transferred from local memory to local memory, without going out onto the torus network. Each message also has an associated injection counter ID (139(12)). The injection counter base address 131(1) is added to a send message address offset (139(13)), to form the actual beginning physical address of the message data. A message length field 139(14) maintains for the DMA 116 the length of the message in bytes.

The 16 byte network packet header 139(2) includes a torus network hardware header 139(21) containing 8 bytes, and an application header for memory FIFO packets or a DMA put/get hardware header 139(22). When sending over the torus network, a long message is broken into smaller packets. On Blue Gene/L and P, the torus network packet size ranges from 32 bytes to 256 bytes, in increments of 32 bytes. Torus network hardware header format (141) depicts in detail the breakdown of headers included in torus network hardware header 139(21). These include "1 byte marker" 141(1) that indicates the beginning of a data packet, where "10 bits routing info" 141(2) contains the torus routing information. A "3 bits packet size" field 141(3) determines the packet size, and a "2 bits target node processor" field 141(4) maintains a processor core for a message. The destination node is determined by a "3 bytes target node (x,y,z) coordinates (141(6)). Because there are 4 processors on a Blue Gene/P compute chip, a 2 bit processor ID field is sufficient in the instant compute node embodiment. A 1 bit DMA flag 141(5) and the 8 byte DMA header 139 (22) are used by the receiving node to decode the packet.

The receiving DMA handles 3 types of packets, a memory FIFO packet, a put packet or a get packet. When the DMA flag 141(5) in the torus header is set to 0, the packet is a memory FIFO packet. The memory FIFO packet is put into one of the reception FIFOs on the receiving node. The reception FIFO mapping is done locally at the receiving node, depending on the status of "2 bits target node processor ID (flag) 141(4). A reception FIFO is handled in a manner similar to that of an injection FIFO, except that the data packets have sizes from 32 bytes to 256 bytes, and the DMA moves the tail pointer 133(4) and the application thread running on the processors (comprising the compute node) moves the head pointer 133 (3).

The application header for memory FIFO packets or DMA put/get hardware header 139(22) comprise a FIFO packet application header format 143, or DMA put/get hardware header 144. The FIFO packet application header format 143 includes a "4 byte put offset (143(1)) and a 4 byte application header 143(2). Since a long message is broken into smaller packets, the "sending" DMA updates both the send message address offset 139(13) and 4 byte put offset 143(1) after each packet is sent. The packets can arrive at a destination node out of order. The 4 byte put offset 143(1) provides for reordering the packets for the receiving compute node processor(s) to reassemble a FIFO message. The 4 byte application header 143(2) is not used by the DMA for FIFO packets, and usually contains a function ID that the receiving node will execute once the packet is received.

When the 1 bit DMA flag 141(5) is set to 1 (in torus network hardware header 141), the FIFO packet application header format 143 is then replaced with the DMA put/get header format 144. Therein, if a remote get flag (144(4)) is set to 0, then the packet is a "put" packet, and 4 byte put offset 144(1) field, and 1 byte rdma counter ID (144(2)) field are used. The 4 byte put offset field (144(1) is the put offset in bytes, as is found in the FIFO packet. For each packet received, the receiving DMA will look up a reception counter, identified in the DMA put/get header format 144 by the 1 byte rdma counter ID (144(2)). The counter's base address 135(1) is added to the 4 byte put offset 144(1) to form the actual physical address of the packet's data payload or the receiving node. A "1 byte, number of valid bytes in payload" 144(3) contains the number of valid bytes in the payload. In typical long message transfers, the sending node sets up an injection counter and a receiving node sets up a reception counter with the total number of bytes in byte counter 131(2), and byte counter 135(2) to be transferred in the message via a remote put. The DMA 116, after sending/receiving each packet, will update the byte counter by subtracting the number of valid bytes in the packet data payload. When the byte count reaches 0, the message transfer is complete.

The $3^{rd}$ DMA operating mode is remote get. In this case, a remote get flag 144(4) is set to 1, and 4 byte put offset 144(1)

field, 1 byte rdma counter ID (144(2)) field are not used. On a sending node A, the injection DMA does the similar work as a remote put packet, except that a message is fully contained in one torus packet. The data payload that node A sends to node B, contains a 32 byte descriptor for node B, to be put into a "1 byte, injection FIFO with FIFO ID (144(5)). Once the packet is received on node B, node B puts the descriptor contained in the packet payload into its injection FIFO, then sends the data related to this descriptor back to node A.

While the above-described is the standard mode RDMA remote get supported by the Blue Gene/P hardware, the novel construction also provides for new multiple node messaging operations, based in the ability to directly send a descriptor into a receiving node's injection FIFO. For that matter, FIGS. 1B-3 and 1B-4 herein highlights operation whereby the invention carries out third party sends. That is, and as shown in FIG. 1B-3, a compute Node A's memory 114A prepares 2 descriptors. One descriptor is an injection descriptor 114A(1) with the "1 bit in 1 byte remote get flag" 144(4) set to 1, targeting a receiving node B. The payload descriptor 114A(2) for injection descriptor 114A(1) is an injection descriptor for node B to send data to Node C. Node A sends this packet to node B, and Node B puts the payload descriptor 103 in the payload into an injection FIFO descriptor slot 114B(1) of compute node B's memory 114B. Then, compute node B processes this injection FIFO descriptor and sends "data for compute node C" 114B(2) to memory 114C in compute node C. All of the data transfers except for the 2 descriptors prepared on Node A are done with DMA hardware without any processor involvement.

FIG. 1B-4 shows a $2^{nd}$ method where node A requests multiple messages from node 13 with a single remote get packet to node B. Again, node A prepares in its memory 114D an injection descriptor 114A(1) for its remote get message, targeting node B, and data payload and multiple descriptors 114A(2) for node B to send several put messages back to node A. Then, node A sends this packet to node B, where the multiple injection (put) descriptors 114E(1) are put into injection FIFO slots on node B. Node B processes these injection FIFO descriptors and sends data for "injection descriptor 1" 114E(2), data for "injection descriptor 2" 114E(3) and data for "injection descriptor 3" 114E(4) back to node A.

The first method of $3^{rd}$ party send can be extended to a multiple party (that is, multiple node send as Node A could ask Node B to send a descriptor to Node C, resulting in Node C send data to Node D, etc.

The first and second method can also be combined to have node A send a single packet to node B, resulting in node B sending multiple messages to multiple targets.

The DMA engine 116 implemented in the system of the present invention provides a unique solution to the known limitations in message passing within parallel computer systems by providing a DMA engine at the compute nodes comprising the parallel computer system with Injection FIFO Metadata describing multiple Injection FIFOs where each Injection FIFO may contain an arbitrary number of messages. The novel DMA engine, novel parallel computer system comprising the DMA engine, and method for message passing in a parallel computer system that utilizes such novel DMA engine fixes the amount of effort required by an application running on a compute node to carry out messaging, regardless of the number of messages. By containing the effort and attention required by the local instances of the global application in handling the messaging via the Injection FIFOs, overall system and local performance is not degraded by an increasing number of messages.

For example, a local instance of a global application running at a compute node may implement a computation phase followed by a communication phase. The novel DMA engine, and its operation, at the end of the computation phase, provides for the application to initiate the entire communication phase by merely providing a description of the Injection FIFO to the DMA engine. The message descriptors in the Injection FIFO are created in the computation phase. Hence, handing-off an entire Injection FIFO is faster than initiating the communication phase by handing off each individual message descriptor in the FIFO, as is the case in the prior art message-passing practices.

Thus, the processing element at the processing node implemented in the present invention provides for the Injection FIFO to the DMA engine using Injection FIFO Metadata, which Injection FIFO Metadata is part of the DMA engine. For that matter, the novel DMA engine provides Injection FIFO Metadata for multiple Injection FIFOs. The Injection FIFO Metadata provides for fine-grain control over the Injection FIFO. For example, and assuming that the Injection FIFO comprises a circular buffer, all message descriptors are identified and exchanged by use of a producer (or source) pointer and a consumer (or target) pointer. The DMA engine moves the consumer pointer as it sends the messages. After the DMA engine sends all the messages, the producer and consumer pointers are equal. If the application wishes to send the same communication pattern, the invention provides that the application running on the parallel computer system need only set the consumer pointer to its original value. Consequently, the other elements of the Injection FIFO remain unchanged, and need not be re-written by the application. Thus, such a repeating communication pattern is efficiently served.

The DMA engine is useful for further message communication scenarios for parallel computer systems. For example, where an application has many repeating communication patterns, the novel message-passing that utilizes the novel DMA engine improves message-passing operation where there are more communication patterns than Injection FIFO Metadata (provided by the DMA engine), and where the message descriptors for a particular communication pattern are stored in a circular buffer. In order to start a communication pattern, the local instance of the application merely writes a few words describing the circular buffer into the Injection FIFO Metadata of the DMA engine. Such effort is small, and is independent of the number of messages in the communication pattern.

In one embodiment, the invention comprises a parallel computer system is constructed as a network of interconnected compute nodes to operate a global message-passing application for performing communications across the network. Each of the compute nodes includes one or more individual processors with memories which run local instances of the global message-passing application operating at each compute node to carry out local processing operations independent of processing operations carried out at other compute nodes. Each compute node also includes a DMA engine constructed to interact with the application via Injection FIFO Metadata describing multiple Injection FIFOs, where each Injection FIFO may contain an arbitrary number of message descriptors in order to process messages with a fixed processing overhead irrespective of the number of message descriptors included in the Injection FIFO.

The method for passing messages within a parallel computer system includes running a global message-passing application across the parallel computer system including running local instances at each compute node for passing messages into and out of the compute node by operation independent of other compute nodes, and to exchange messages with the compute nodes, in which each compute node also includes a DMA engine constructed to interact with the application via Injection FIFO Metadata describing multiple Injection FIFOs, where each Injection FIFO may contain an arbitrary number of message descriptors in order to process messages with a fixed processing overhead irrespective of the number of message descriptors included in the Injection FIFO.

Figures 1, 1B, 2, 3, 4:
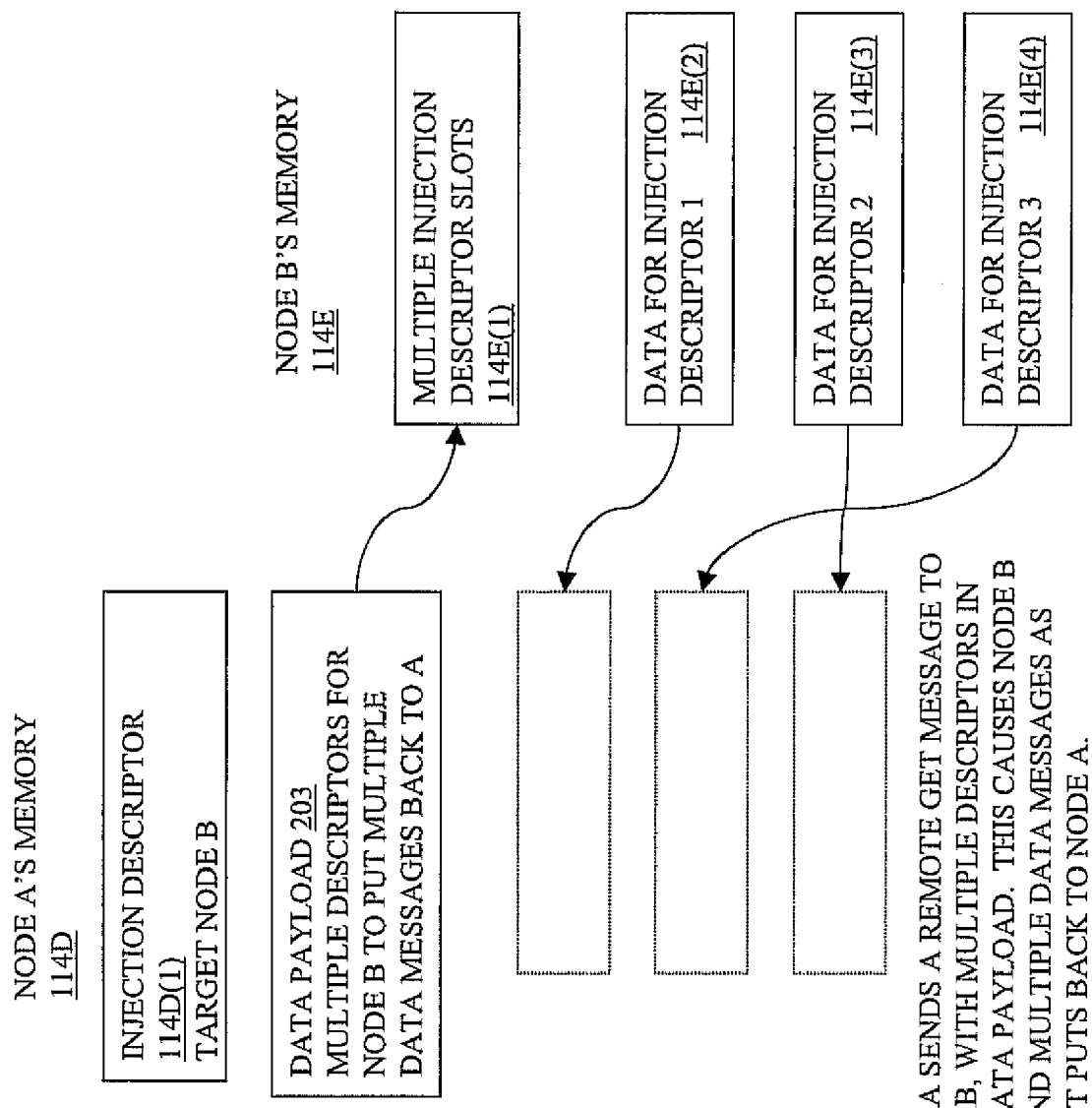
Figures 1, 1C:
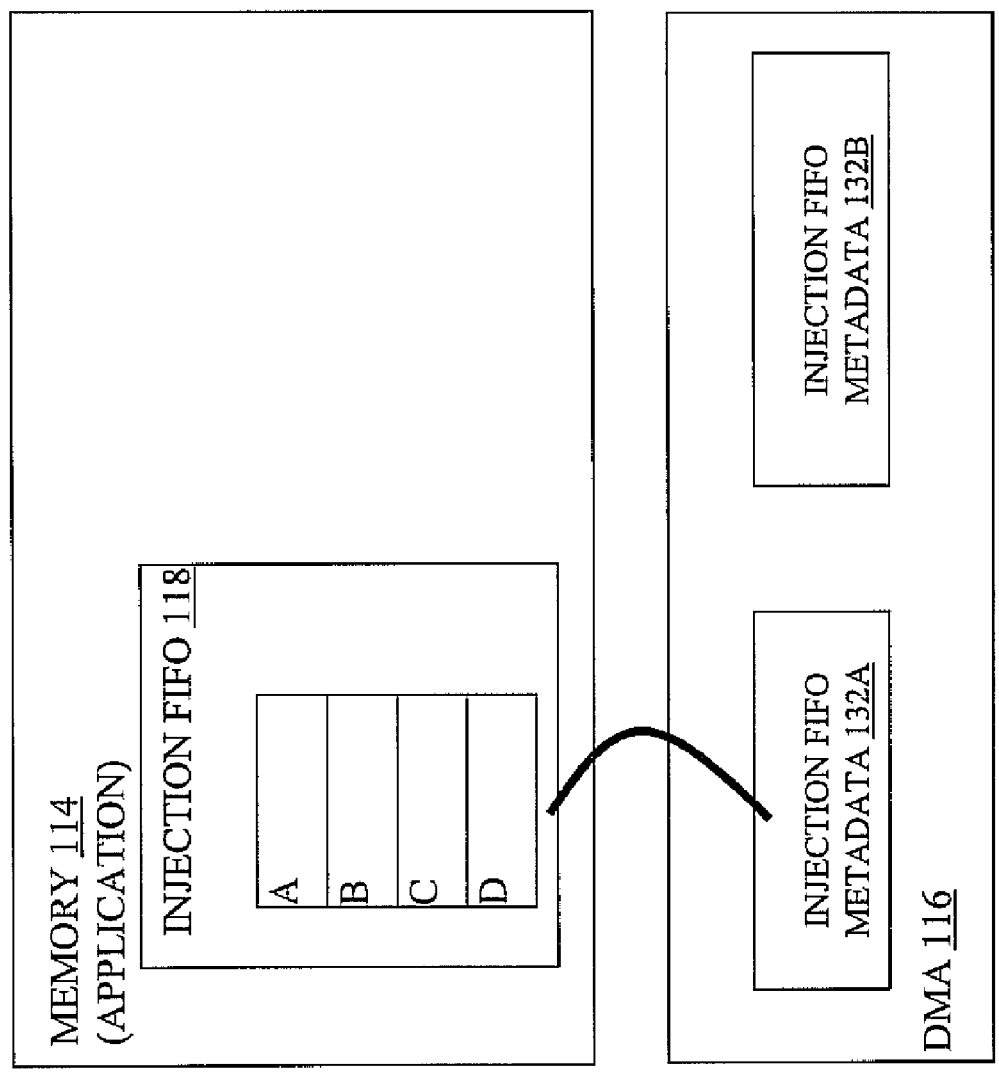

FIG. 1C-1 shows an injection FIFO 118 is arranged to provide storage for one or more message descriptors A, . . . D, that are injected into a FIFO interface from a compute node. Injection FIFO 118 provide storage for 4 message descriptors.

In FIG. 1C-1, the Injection FIFO Metadata 132 of the DMA engine 116 of node 102(1) of a parallel computer system 100 (FIG. 1A) is illustrated as two pieces of Injection FIFO Metadata 132a, 132b, where each piece can describe an Injection FIFO set aside for the local instance of the message-passing application operating at the compute node comprising same. The Injection FIFO Metadata, 132a, 132b, accommodates the novel DMA engine operation, and therefore, the global message-passing network operation. Injection FIFO Metadata 132a describes the Injection FIFO 118 of memory 114, but Injection FIFO Metadata 132 as shown in FIG. 1C-1 has not been configured in view of the fact that there is no Injection FIFO associated with it seen in memory 114 (the way that the presence of Injection FIFO 118 can be attributed to Injection FIFO Metadata 132a). That is, Injection FIFO Metadata 132b has not been configured by the message-passing application with an Injection FIFO, such as Injection FIFO 118 associated with Injection FIFO Metadata 132a, as mentioned.

Figures 1, 1D:
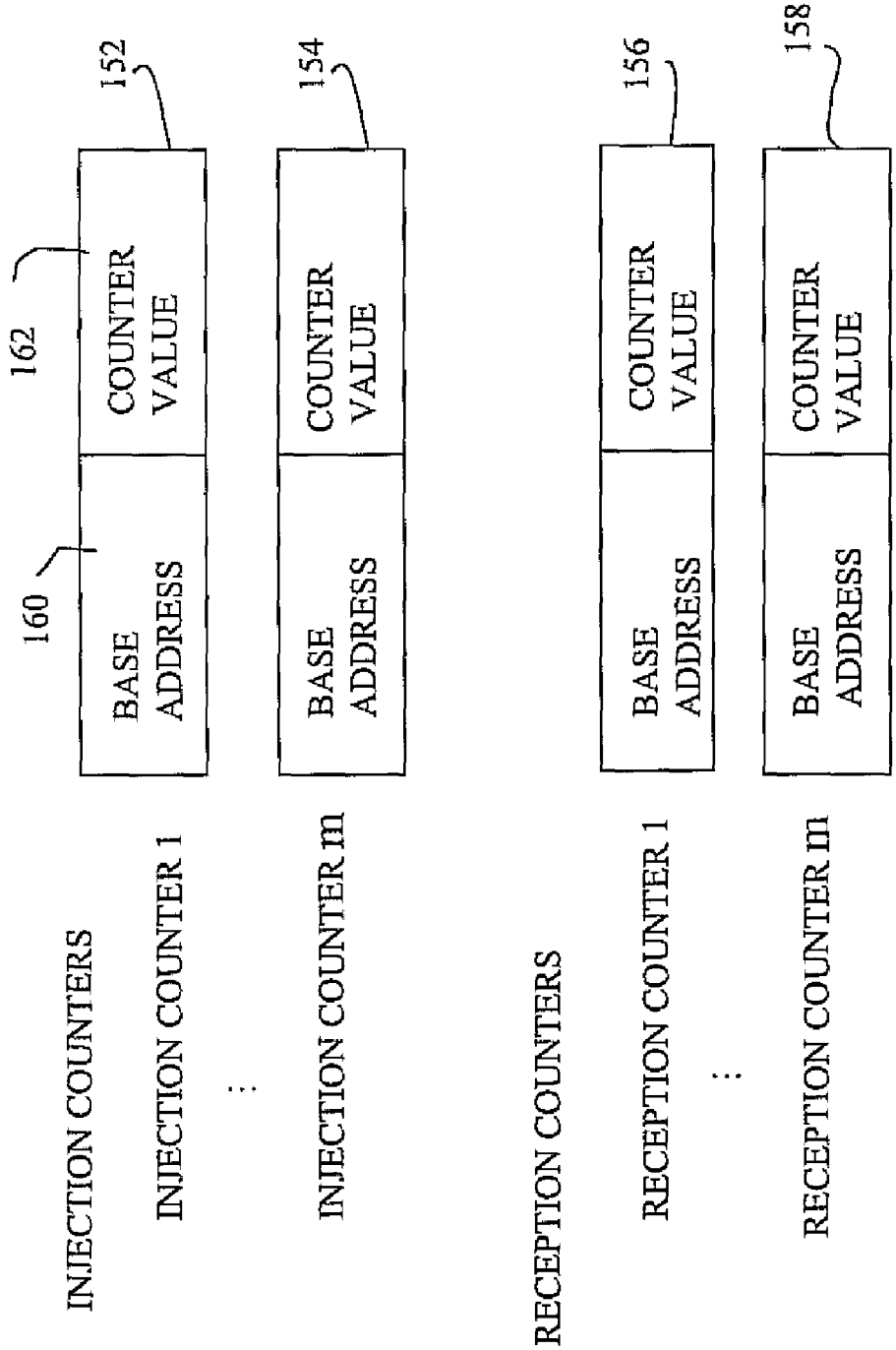
Figures 1, 1D, 2:
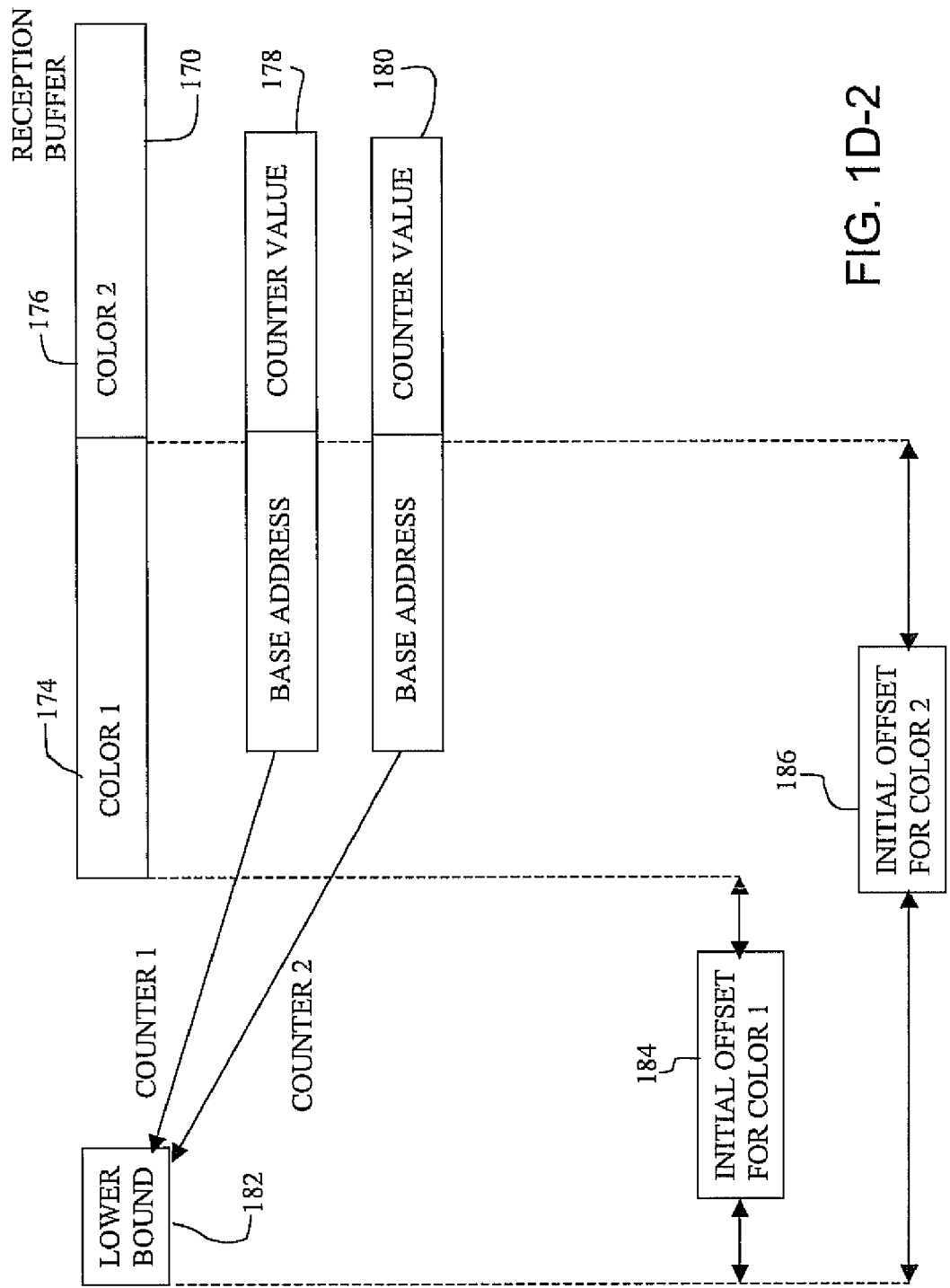
Figures 1, 1D, 2, 3:
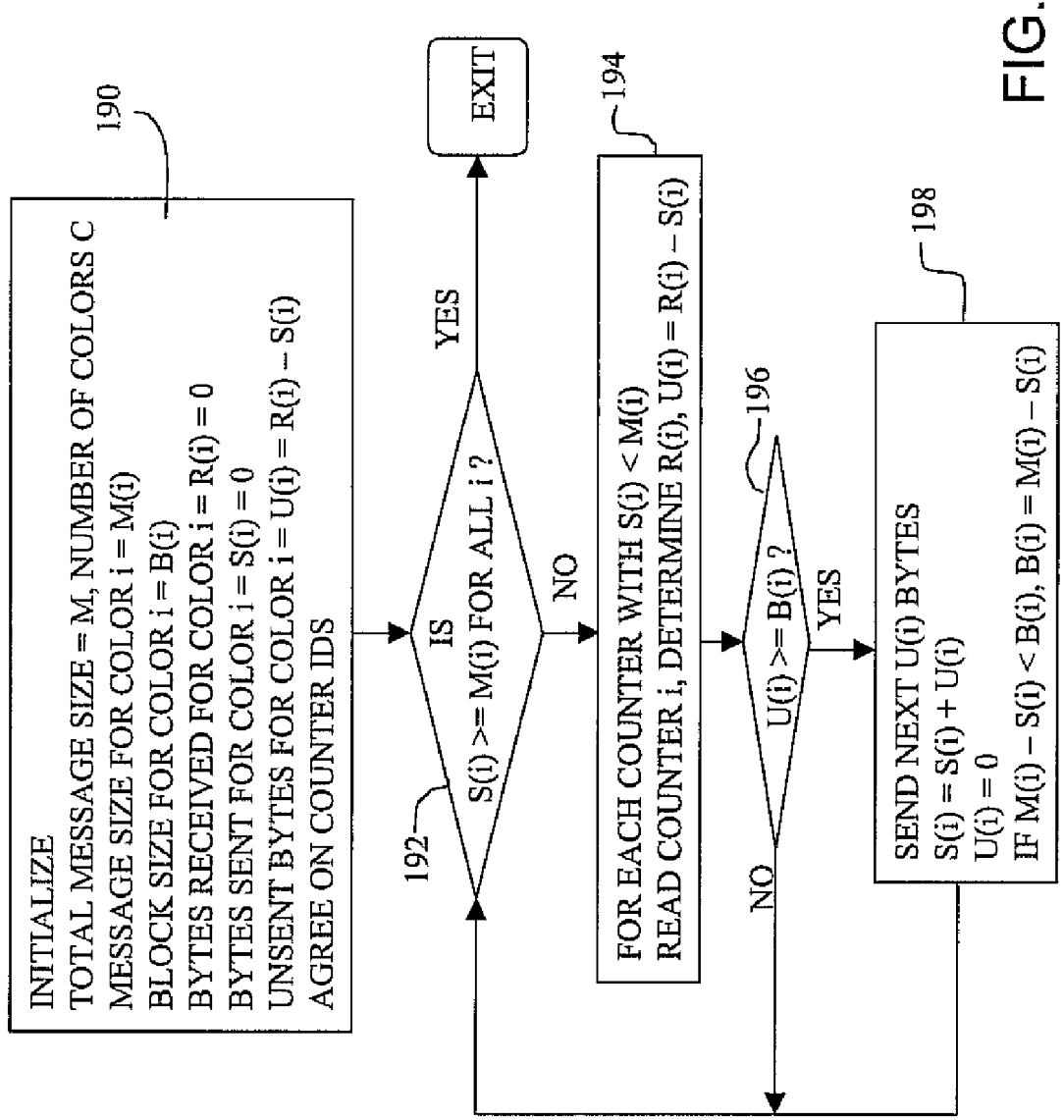
Figures 1, 1D, 2, 3, 4:
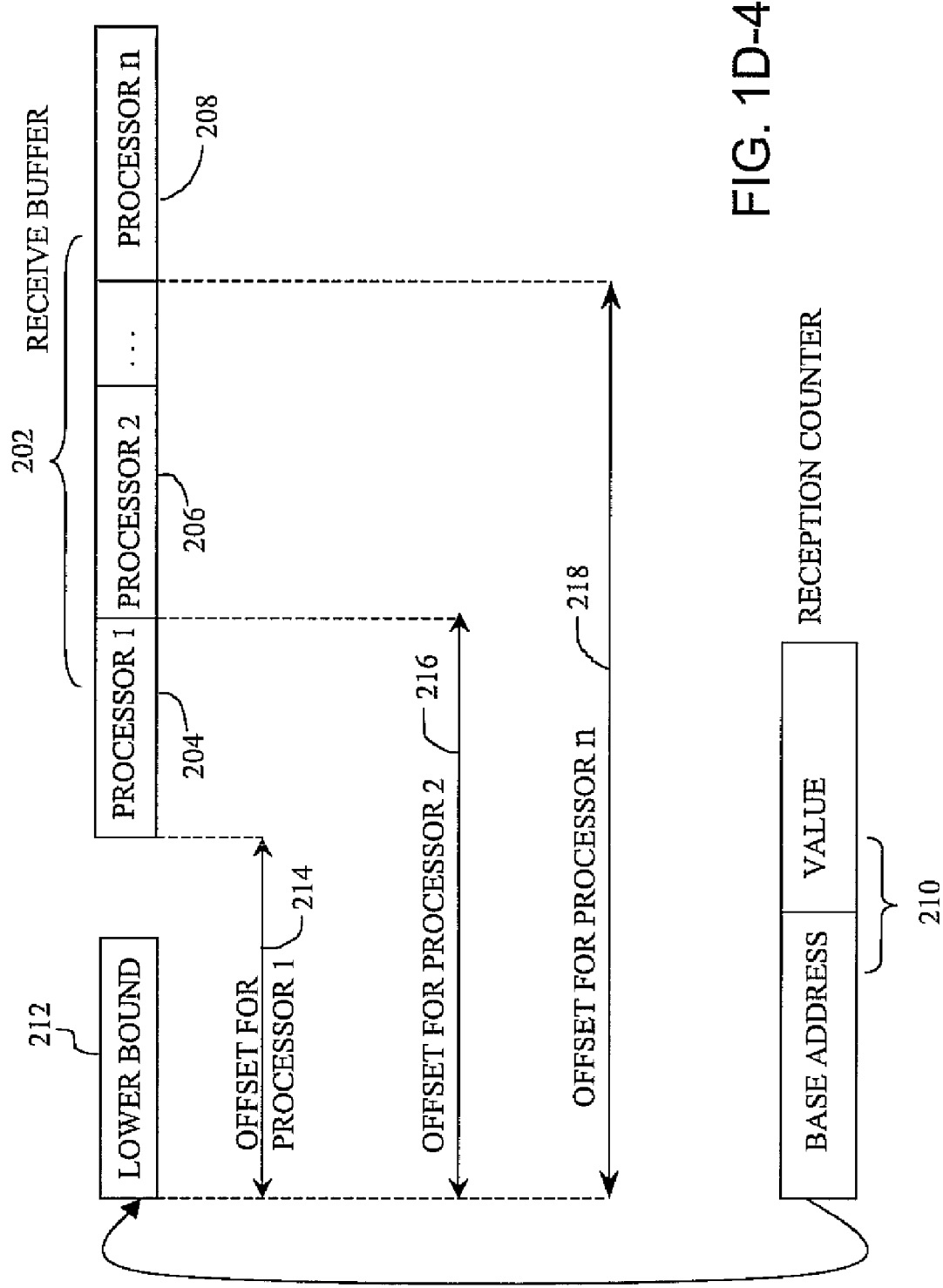
Figure 2:
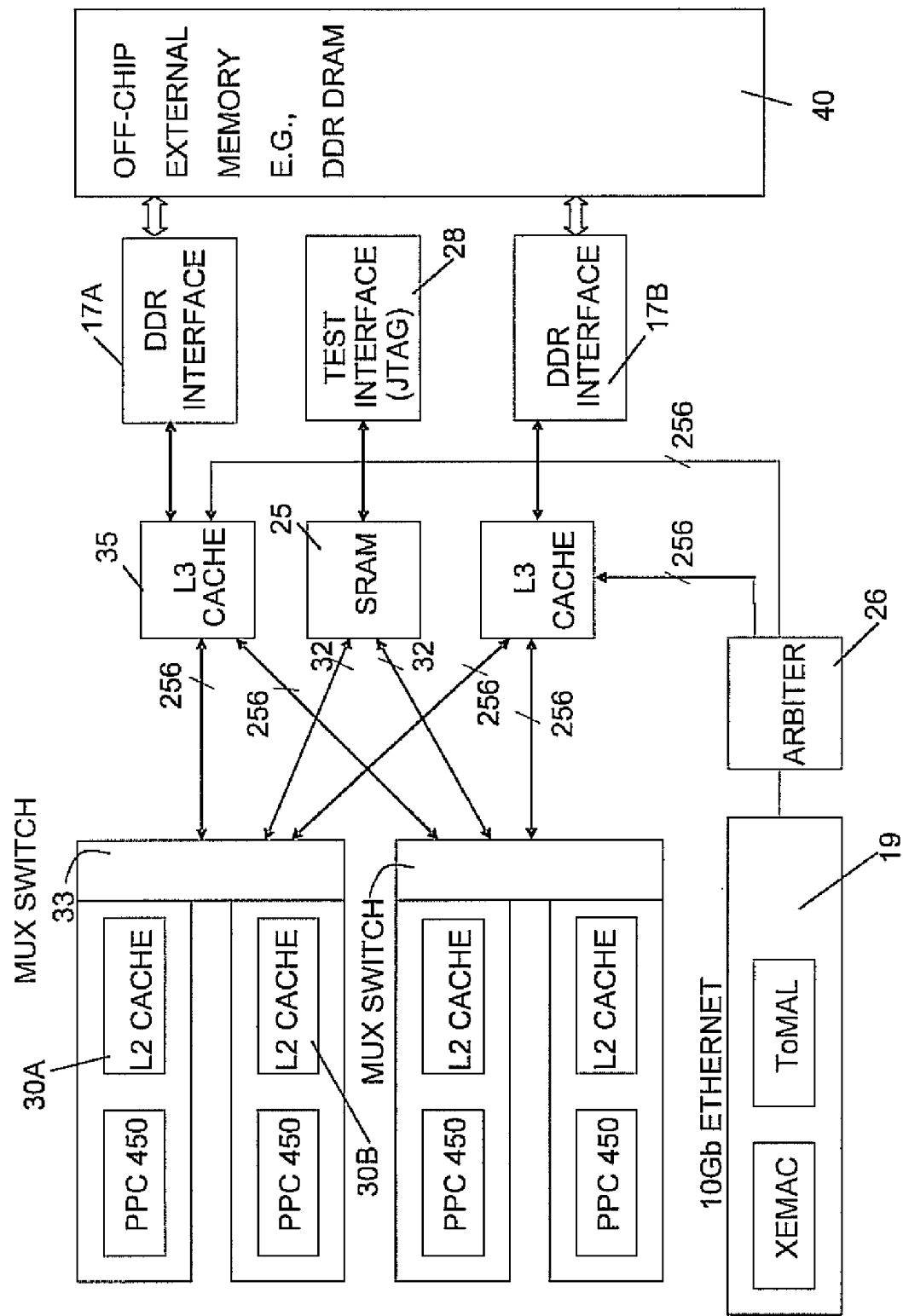
Figure 3:
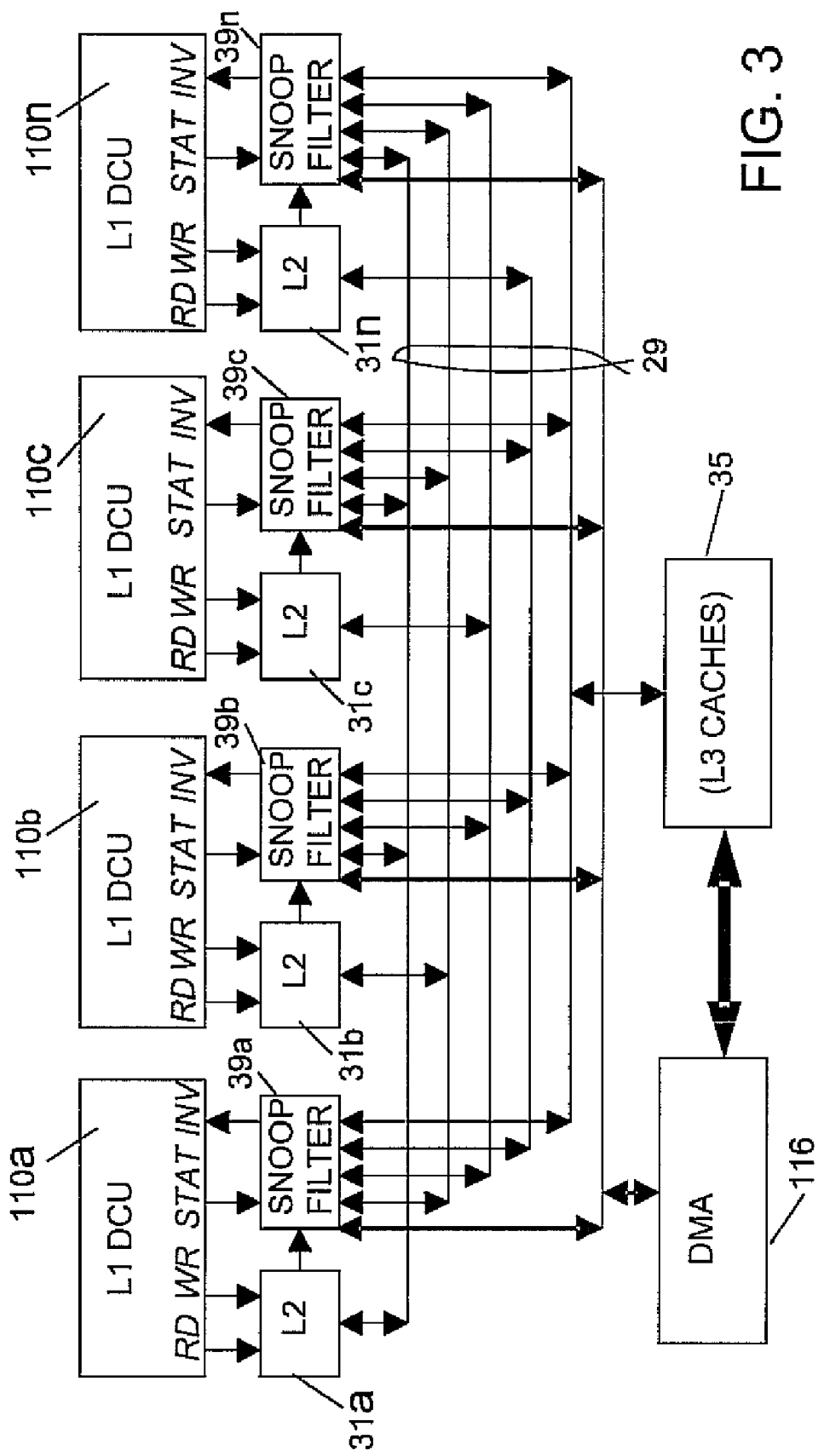

FIG. 1C2 is a schematic diagram illustrating a preferred embodiment of Injection FIFO Metadata 132a of the invention (introduced with reference to FIG. 1D1, for a single Injection FIFO 118 and its implementation as a circular queue buffer. Injection FIFO Metadata 132a contains various fields 140a, . . . , 140q for controlling the Injection FIFO 118 and supporting the novel message-passing operation within the parallel computer system of the invention. Any of fields 140a, . . . 140q marked (R) are readable only, and any marked (W) are writable. Any of fields marked (S) are only accessible via protected system calls, and not directly via the message-passing or communication application. For each bit field, for example, metadata bit field 315 as shown in FIG. 3, a corresponding bit from the metadata of 32 Injection FIFOs is collected into a single 32-bit word of metadata for more efficient control of multiple Injection FIFOs. The fields 140a, . . . 140q are further described below.

The injection FIFOs (118) are circular buffers within the application memory (114), and define a start address 140a, and an end address 140b of a buffer. The Injection FIFOs may be thought of as a producer-consumer queue with the communication software application acting as the producer, and the DMA network interface acting as the consumer. The producer queue Injection FIFO further includes a producer address 140c (producer queue address), and the consumer address 140d (consumer queue address). In operation similar to that known in the prior art, a communication software application injects a message by incrementing the producer address 140c. When space in the network is available, the DMA engine 116 fetches the message descriptor at the consumer address 140d, and injects the corresponding message into the network (via DMA network interface 128). The DMA engine 116 then increments the consumer address 140d.

For that matter, the DMA engine 116 preferably provides 128 Injection FIFOs descriptors, and, therefore, up to 128 active Injection FIFOs. With respect to multicore node operation, this novel feature allows for each core to have its own Injection FIFO, and in some cases, multiple Injection FIFOs. Such novel operation improves performance of a large message by splitting the large message across multiple Injection FIFOs. A network_resources bitmask 140p, shown in FIG. 1C-2 within Injection FIFO Metadata 132a specifies the network resources available to messages in the Injection FIFO. Network resources such as network_resources bitmask 140p include operation in view of network priorities. The resources include network buffers and network links, where splitting network resources across multiple Injection FIFOs allows a communication (message-passing) software application to better control use of network resources.

Injection FIFO Metadata 132a further comprises an is_empty bit (140e), which allows a communication application to efficiently determine if all the message descriptors in the FIFO have been sent. Put another way, in order to determine if there is work to be done by the DMA engine, the is_empty bit 140e represents whether there are additional, or any message descriptors to be sent. The Injection FIFO Metadata 132a further comprises an is_full bit (140f), which is used to allow the a communication application to efficiently determine if there is room in the descriptor for injecting additional message descriptors. That is, the is_full bit (140g) is used by the local instance of the message passing application to determine whether there are more message descriptors (load) to be operated upon (the producer of the Injection FIFO). A was_threshhold_crossed_bit (140h) records if the free space in the Injection FIFO was ever below the threshold value (140n). Was_threshhold_crossed_bit (140g) can be cleared using the clear_threshold_crossed bit (140h), and a threshold_interrupt bit (140q) supports determining whether crossing the threshhold also causes an interrupt for the processor cores (comprising a compute node).

In the Injection FIFO Metadata 132a, an enable bit (140l) is included for determining whether the Injection FIFO Metadata is available for application use. If the enable bit (140l) is not set, the descriptor is ignored by the DMA engine. If priority bit (140m) is set, the descriptor is served by the DMA engine more frequently than descriptors without this bit set. Service_quantum value (140o) is included for determining how many message payload bytes should be sent from this Injection FIFO Metadata by the DMA engine, assuming room in the network is available, before serving another Injection FIFO Metadata. The is_active bit (140i) is used by the application to determine if the descriptor is active.

In some applications, there are multiple communication patterns that may be active during different parts of the application. Each such pattern may be described by a the message descriptors within an Injection FIFO. If the number of such patterns is greater than the number of Injection FIFOs supported by the Injection FIFO Metadata, the DMA can be reprogrammed so that Injection FIFO Metadata can be switched with very low overhead from one communication pattern to another. The DMA engine 116 only serves the Injection FIFO Metadata if it is active; the Injection FIFO Metadata is activated by the communication application using the activate bit (140j). The communication application de-activates the descriptor using the de-activate bit (140k). In this case, the application uses the is_empty bit (140e) to see if Injection FIFO Metadata is finished its current Injection FIFO and is available for a new Injection FIFO. If is_empty bit is set, the application may de-activate the Injection FIFO using deactivate bit 140k. This deactivation ensures that the DMA engine does not act on inconsistent information in the Injection FIFO Metadata while it is being reprogrammed by the application from one Injection FIFO to another. To reprogram the Injection FIFO Metadata, the application then writes in the new Injection FIFO Metadata consisting of the start, end, producer and consumer addresses. The application then re-activates the Injection FIFO Metadata using the activate bit 140j. In this way, only the Injection FIFO Metadata is reprogrammed to point to a different Injection FIFO in memory 114; the message descriptors in these different Injection FIFOs need not be reprogrammed.

As mentioned, the invention provides for high throughput large message and low latency small message collective operations on a parallel machine with a DMA Direct Memory Access) engine.

The DMA engine 116 shown in FIG. 1A-1 includes multiple byte counters that count the number of bytes injected into the network and received from the network. Each counter includes a base address addressing a location in memory. Each counter also includes a byte count of a packet or message injected or received. A packet contains a destination, a counter identifier (id) and an offset. The offset in packet specifies the memory position relative to the base address contained in the counter identified by the counter id, where the data of the packet is stored. A DMA unit may have, for example, 256 reception and 256 injection counters. This number may vary and depend on a design choice, thus a DMA unit may have any number of counters. A message descriptor is placed into an injection fifo (first-in-first-out). A processor in a node creates message descriptors, for example, based on the parameters or attributes of an application call such as an MPI call. This message descriptor specifies or contains information associated with the injection counter id, the number of bytes, the offset of the send buffer from the injection counter base address, a destination, a reception counter id, and an offset of the receive buffer from the reception counter base address. The destination specification or attribute may include a broadcast bit. In BlueGene supercomputing systems, packets can be broadcast down a single dimension of a three dimensional torus. Several one-dimensional broadcasts may be performed to broadcast in multiple dimensions.

The present disclosure additionally describes a method and system in one embodiment in shared memory mode, in which the processors on the same node comprise one or more threads in the same application process and have a common memory address space. Thus each processor can access all of the memory in this common address space. One of the processors is assigned to each color in an arbitrary manner. Thus a single processor could handle all colors, or different processors, each could handle a different color. For simplicity of explanation, the description herein assumes that a single processor is handling all colors, but one skilled in the art will appreciate variations in which different processors handle different colors. Thus, the method and system is not limited to a single processor handling all colors.

In one embodiment of the present disclosure, a DMA engine and a plurality of counters, for instance, one reception counter per color and injection counter per color, may achieve theoretical peaks. In the method and system of the present disclosure in one embodiment, a core or a processor monitors the byte counters that track the number of received bytes. If a node is required to send the data corresponding to a particular color to another node or set of nodes, when a sufficient number of bytes is received for that color, a processor on the node injects a message descriptor into a DMA injection fifo thereby initiating transfer of the bytes out of that node. The message descriptor in one embodiment includes the injection counter identifier (id) that identifies the counter having the base address of a memory location, the offset from that base address where the data to send is stored, and the size of the sending data. Messages in different injection fifos can result in data flowing out of different links from the node. In this way, all colors can be both received and sent at the same time at every node in the network. For example, a node may receive and send on links at the same time.

Broadcast messages may be classified as long or short, for example, based on performance measurements associated with communicating those messages. For a long broadcast, software pre-arranges injection and reception counter ids for each color, and an offset from the reception counters. In one embodiment, counter ids and offsets for each color are common among the node, although they do not need to be in all cases. For instance, if there is no hardware broadcast, they need not be common. Counter ids are put into the packets as part of data that describes those packets, for instance, in a header or other portion of the packet. Assuming the byte counters decrement upon reception, all nodes program the byte counters to a suitably large number, for instance, one that is at least bigger than the message length. The source of the broadcast injects a message descriptor into an injection fifo. The DMA engine 116 takes that descriptor, for example, from the injection fifo, puts the information from the descriptor into each packet and injects individual packets of the message into the network.

In one embodiment, it is assumed that these packets use non-overtaking deterministic routing and are always injected into the same fifos in the nodes in the network. Thus, packets arrive in the same order in which they are sent. A packet contains a reception counter id and an offset from the base reception address. In a 2D or 3D broadcast, some or all nodes along the line of the broadcast re-send the message to other nodes along a line in a different dimension of the torus. If these nodes wait until the entire message is received, suboptimal performance is achieved; for example, in a 2D broadcast, it takes twice as long as the optimized pipelined method of the present disclosure in one embodiment. Rather, there is a message length of M bytes, which is broken up into submessages (colors) of length $M(i)$ bytes where $M=M(1)+\ldots M(C)$ where C is the number of colors. Color i has a block size of $B(i)$ bytes. The re-sending nodes poll the respective reception counter until at least $B(i)$ bytes have been received. Suppose the actual number of bytes received is $U(i)>=B(i)$. Because of in-order delivery, the first $U(i)$ bytes have been received. Then, the re-sending node injects a descriptor into a fifo used by that color specifying that $U(i)$ bytes be sent down the next dimension. In one embodiment, the re-sending node uses the same reception counter ids and specifies the initial offset. The re-sending node then waits until the next $B(i)$ bytes have been received, injects the next descriptor with an updated offset of $U(i)$ and so on until all the bytes have been received and re-injected. In this way, if $M(i)$ is the same for all colors and $B(i)$ is the same for all colors, $M(i)/B(i)$ submessages are sent, but links in all dimensions are kept busy at the same time. Thus, for long messages and $B(i)/M(i)$ relatively small, the performance for a single color is approximately doubled compared to the non-pipelined method, and for $C>1$ color is approximately C times faster than an optimized single color method.

Reduction operations are used to compute a result involving data distributed over a group of processes. Examples include sum, product, minimum, maximum, and/or user defined global operations. If the operation is a reduction, then after seeing that at least $B(i)$ bytes have been received, the nodes perform an arithmetic operation (e.g., adding integers in the incoming byte stream to a local contribution) and then resending, if necessary, the result of the operation to other nodes. Thus, when the counter indicates that the next B(i) bytes have been received, a processor performs the reduction operation on those B(i) incoming bytes with the corresponding B(i) bytes from its local contribution, storing the result in the corresponding location or slot in a receive buffer, that is, a location in memory. When the processor completes this reduction, if there is a next node in the reduction tree, the processor prepares a descriptor associated with B(i) reduced bytes and injects the descriptor into an injection fifo for sending the B(i) reduced bytes to that next node.

The broadcast is complete when each node has received all M bytes. If a node is a re-sender of color i, then the broadcast for color i is complete when the node receives and sends M(i) bytes. If a node is only a receiver of color i, then the broadcast is complete for color i when the node receives M(i) bytes. The overall broadcast for the entire message M is complete when the broadcast for all colors are complete.

If the operation is an allreduce, the operation can be pipelined as a reduction to a single node with a broadcast from that node back to the other nodes. On a 3D torus, this could be a 3 color reduce and a 3 color broadcast, that is, 3 links worth of bandwidth can be obtained.

For short reductions, latency is important. Typical MPI (message passing interface) implementations send point-to-point messages in a tree structure to perform the reduction. Messages are usually sent into a memory fifo on receiving nodes and software is responsible for polling the fifo and handling packets. The latency for polling and packet handling can be excessive. The method and system of the present disclosure in one embodiment optimizes short reduction on a set of nodes as explained below. Every node in the reduction agrees on a counter id and reception buffer. The counter identified by the counter id includes an address of a reception buffer that is used for this short message. If there are n nodes in the line and the message length is B bytes, then node number m sends its bytes to a portion of the buffer allocated for it. For example, node m sends to offset (m−1)*B from the base address stored in the counter. If the set of nodes is in a line (e.g., along a row or column of 2D network of nodes), a single descriptor broadcasting the data to every other node in the line can be used. If so, these can be arranged so that half the data flows in the positive and half flows in the negative direction. If not, n descriptors of point-to-point messages are injected. Each node receives (n−1)*B bytes (or n*B bytes if a node sends to itself. Nodes poll on the counter until all the bytes have been received at which time it performs the reduction operation on the bytes in the receive buffer. For instance, DMA logic may poll on its own reception counter until all the bytes have been received. For reductions involving larger numbers of nodes, for example on a plane, multiple steps of this procedure can be used. That is, on a plane, each node participates in a row reduction, followed by a column reduction. Measurements results using this approach show that a short reduction of a single double precision number along a row of length 8 nodes can be done in approximately one third the time it takes MPI to send and receive a single 0 byte message.

FIG. 1D-1 shows detailed structure for injection counters (FIG. 1A-1 130) and reception counters (FIG. 1A-1 134). Each node (FIG. 1, 102, 104, 106) may include multiple injection counters 152, 154 and multiple reception counters 156, 158. The counters may be implemented as register arrays, SRAM, or by any other mechanism. Each counter has a base address 160 that points to a location in memory and a byte counter value 162. When a DMA puts packets into the network, the packets carry a reception counter id, a byte length and an offset. When the packet is received, the bytes in the packet are written to memory location pointed to by the base address of the counter identified by the counter id, plus the offset, and the byte count value stored in the counter identified by the counter id is, for example, decremented by the number of bytes received. In one embodiment of the method and system of present disclosure, an interrupt occurs when the byte count value reaches zero, signaling that all bytes of the packet have been received.

FIG. 1D-2 shows a single reception buffer 170 located in memory (for example, FIG. 1A-1, 114) of a node. The result of a broadcast or reduction is put in this buffer. The buffer 170 is split into multiple colors, for example, color 1 174 and color 2 176, in the example shown in FIG. 1D-1. Each color has a counter 178, 180 associated with it. In this example, the base address for each counter is the same 182, although in general each counter could have its own base address. The initial offsets for each color are shown at 184 and 186. The offsets are programmed in the corresponding descriptors. A message may include multiple colors or submessages. Each color or submessage may further be divided into a number of blocks.

FIG. 1D-3 is a flow diagram illustrating steps taken in an intermediate node in a long broadcast. A processor in the node may perform the steps. Each receiving node sets up multiple byte counters, for example, reception counters, one for each color. Each node implements the same counter id and offset for a color as other nodes in one embodiment. Counter ids for a color may be different on different nodes if a sending node can specify die correct counter id and offset to the receiving node. Thus, each node could agree on a different counter id and offset. If the hardware supports a broadcast, then the counter ids and offsets are the same on all nodes for that color.

For purposes of discussion, FIG. 1D-3 assumes that the intermediate node re-broadcasts all colors. More generally, a node may only need to re-broadcast some colors. Each node knows which colors to re-broadcast and to what destinations, for example, from having agreed previously by some convention or and an application programming interface telling the node, etc. For colors that the node does not re-broadcast, the node monitors the byte counters for those colors until all bytes have been received.

Step 190 illustrates an initialization step. Nodes agree on the message size M, counter ids, the number of colors C, the message size for each color M(i), the block size B(i), the number of bytes received R(i)=0, the number of bytes sent S(i)=0, and the number of unsent bytes U(i)=R(i)−S(i). The root node in the network sends out multiple color messages to certain nodes in the broadcast. These destination nodes may be different for each color. On the re-broadcasting nodes, at step 192, a node determines whether it has sent all the bytes for all its colors, if so, the node is done with processing this operation. At step 194, for colors still in progress, the node polls one or more counters identified by the counter ids agreed on during the initialization process, and determines the number of bytes received R(i) and the number of unsent bytes U(i). For instance, the number of bytes received may be determined from reading a reception counter associated with the color being processed, and the number of bytes sent may be determined from reading an injection counter associated with the color being processed. A processor in a node, for example, reads the one or more counters that the DMA engine updates when the DMA engine actually receives and/or sends the bytes.

At step 196, if U(i)<B(i), the block size, then not enough data has been received for color i and step 404 is reentered. Otherwise, a processor on the node re-sends or routes B(i) bytes to its destinations at step 198. Resending B(i) involves preparing a DMA descriptor with correct send and receive offsets for the message. A DMA descriptor includes information about the message block B(i), for example, the counter ids, the number of bytes in the message block and offsets from the base address allocated for this message block B(i). A processor, for example, creates the descriptor and injects the descriptor in the injection fifo associated with this message block B(i). This descriptor tells which injection counter to use for determining the memory address where the data to send is located. The DMA logic 124 (FIG. 1A-1) updates the injection counter's counter value with the count of the bytes sent. Since each block of a message may have a different offset, a resending DMA in one embodiment creates offsets on a packet by packet basis so that the data is placed in and sent from the correct part of the receive buffer based on the offset that a processor specifies in the descriptor. At this point S(i) bytes have already been sent so the offsets are the initial send and receive offsets plus S(i) and the message length is U(i), if U(i) was sent. The node then updates S(i)=S(i)+U(i), sets the unsent byte count U(i)=0. The block size may need to be updated, for instance, in case the number of remaining bytes to be received and resent is less than the block size B(i). This may happen, for example, if the block is the tail of the message whose size is not an exact multiple of the block size B(i).

If the collective is a reduction, the reduction operation is performed at step 198 prior to sending the next U(i) bytes. Sending the next U(i) bytes involves performing the reduction operation on the newly received data in the receive buffer. In one embodiment, the result of this reduction is stored in the location or slot of the receive buffer corresponding to the newly received data.

FIG. 1D-4 shows a receive buffer 202 for a short reduction with slots allocated. A receive buffer 202 may be allocated in the memory of a node and is used to store data that is received into the node. Each processor is assigned its own portion of that buffer 204, 206, 208. All nodes in the reduction agree on reception counter ids. If there is a broadcast capability, the reception counter id is the same on all nodes; if there is not a broadcast capability, the reception counter id may be different on each node. On each node in one embodiment, there is a single reception counter 210 that contains a base address 214. The base address 214 points to the lower bound 212 of the memory location (e.g., receive buffer 202) where the message block is placed. The reception counter 210 also stores byte count of the message block. The offsets for each processor are shown in 214, 216 and 218. Offsets are determined from the descriptor in the packet of the message block. The offsets may range from 0 to the size of the receive buffer.

For a reduction, a processor sends a message to each node taking part in the reduction operation. This message may be a single message if there is a broadcast capability. A descriptor of the message specifies the counter id, the number of bytes and the offset corresponding to its slot in the buffer. Sending of a message is initiated, for example, by a processor that injects a descriptor into an injection fifo. A processor also places its own data, for instance, intermediate data or local contribution used in computations, in its own slot in the receive buffer 202. After sending the message, the processor polls its reception byte counter for this reduction until the expected number of bytes in the reduction have been received. The expected number of bytes is known from the semantics of the reduction software call. After receiving all bytes, each processor performs the reduction, for example, a sum, minimum, maximum, etc. Each node obtains or computes the same result for the reduction because the contents of receive buffer is identical on all nodes. Using standard software techniques, if there are many nodes in the reduction, multiple phases of the above can be used to obtain the result of the overall reduction. For example, to perform a reduction in a 2-D (dimension) plane, each node can set up buffers and counters for two reductions, a row and a column reduction. Nodes first participate in a reduction along its first dimension (row) and then feed the result of that reduction into a reduction along the second dimension (column).

In another embodiment, the method and system may operate in "Virtual Node Mode", in which the memory is partitioned so that each processor can read and write only a portion of memory. If a processor can read, but not write, the memory of the other processors, the processor handling a color sets a memory address to point to the start of its receive buffer and another address for the number of bytes received for that color. These addresses are known to all processors on the node, for example, via appropriate software calls.

For a broadcast, as bytes are received, the processor handling the color updates its bytes received memory location as blocks are processed. The other nodes can read this location and copy bytes from the handler's receive buffer to its own receive buffer as blocks are received.

For a reduction, the processor handling the color performs the reduction operation on the received data by combining data received from the network and the local contributions of all the processors. When this is complete for each block, the other processors can copy the result of the reduction for that block into its own memory.

If a processor cannot normally read the memory of the other processor, a system call can be made that gives other processors read access to a limited portion of the memory. This system call can be made prior to the broadcast or reduction to cover the relevant areas of memory, then the above-described technique with respect to a broadcast can be used.

Each node of system is further advantageously provided with a system and method enabling asynchronous broadcast for ordered delivery between compute nodes in a parallel computing system where packet header space is limited. As described in co-pending disclosure U.S. patent application Ser. No. 11/768,619 entitled "Asynchronous Broadcast For Ordered Delivery Between Compute Nodes In A Parallel Computing System Where Packet Header Space Is Limited", in one aspect, a mechanism on receiving processors in the system provides order to data packets received from a broadcast call and to distinguish data packets from several incoming asynchronous broadcast messages where header space is limited. In the present invention, processors at lower leafs of a hierarchy do not need to obtain a broadcast message by directly accessing the data in a root processor's buffer. Instead, each sequence intermediate node's rank id information is squeezed into the software header of packet headers. In turn, the entire broadcast message is not transferred from the root processor to each processor in a communicator but instead is replicated on several intermediate nodes which then replicated the message to nodes in lower leafs. Hence, the intermediate compute nodes become "virtual root compute nodes" for the purpose of replicating the broadcast message to lower levels of a hierarchy. The entire contents of Ser. No. 11/768,619 are entirely attached and provided herein in Appendix A.

As is well known, throughput of networks can degrade if internal network buffers fill up. Full buffers in one part of the network can prevent other packets from passing through that part of the network. Algorithms such as TCP/IP use "pacing", or window flow control algorithms, to limit the number of packets in the network; this can improve throughput. These algorithms use acknowledgement packets to grant a sender permission to send additional packets. However, the software overhead to implement such algorithms is excessive in a scientific parallel computing environment where high throughput and low latency are essential.

Thus, each node of system is further advantageously provided with a pacing mechanism that can be integrated into the hardware, for example, the DMA engine, that would eliminate software overhead. As described in co-pending disclosure U.S. patent application Ser. No. 11/768,682 entitled "Hardware Packet Pacing Using A DMA In A Parallel Computer", in one aspect, a direct memory access controller keeps track of a total number of bytes put on the network as a result of a remote get operation, using a hardware token counter. A remote get message is sent as a plurality of sub remote get packets. Each of the sub remote get packets is sent if the total number of bytes put on the network does not exceed a predetermined number. The method in one embodiment may comprise establishing a token counter on a direct memory access controller initially set to a first predetermined value and establishing maximum pacing submessage size, the maximum pacing submessage size being a value less than or equal to the first predetermined value. The method may further comprise establishing a remaining bytes count, the remaining bytes count initially set to a message length field value in an original remote get packet and setting a submessage size to the maximum pacing submessage size or the remaining bytes count, whichever is less. The method may also comprise waiting for the token counter to be greater than or equal to the submessage size, injecting a remote get packet of the submessage size to a network when the token counter is greater than or equal to the submessage size and decrementing the token counter and the remaining bytes count by the submessage size. The method may further comprise repeating the steps of setting, waiting and injecting until the remaining bytes count is zero. The entire contents of Ser. No. 11/768,682 are wholly attached and provided herein in Appendix B.

Each node of system is further advantageously provided with an apparatus for capturing data packets for analysis. As described in co-pending disclosure U.S. patent application Ser. No. 11/768,572 entitled "Bad Data Packet Capture Device", in one aspect, an apparatus and method for capturing data packets for analysis on a network computing system includes a sending node and a receiving node connected by a bi-directional communication link where the sending node sends a data transmission to the receiving node on the bi-directional communication link, and the receiving node receives the data transmission and verifies the data transmission to determine valid data and invalid data and verifies retransmission of the data verified as invalid data as corresponding valid data. Memory in the receiving node stores the invalid data and the corresponding valid data. The processor may then receive and perform an analysis of the invalid data and the corresponding valid data received from the memory device. The entire contents of Ser. No. 11/768,572 are wholly attached and provided herein in Appendix C.

As the DMA engine 116 has limited byte counter resources, the DMA engine includes byte counter sharing between multiple messages, and an ability to check and determine when a message (required data transfer) is complete, particularly in the case where other messages sharing the byte counter have not been completed for efficient message passing. As described in co-pending disclosure U.S. patent application Ser. No. 11/768,813entitled "Message Passing With A Limited Number Of DMA Byte Counters", in one aspect, an apparatus and method for passing messages in a DMA engine having a limited number of byte counters for tracking a number of bytes that are sent or received by the DMA engine, is provided wherein the byte counters may be used in shared counter or exclusive counter modes of operation. The method includes using rendezvous protocol, a source compute node deterministically sending a request to send (RTS) message with a single RTS descriptor using an exclusive injection counter to track both the RTS message and message data to be sent in association with the RTS message, to a destination compute node such that the RTS descriptor indicates to the destination compute node that the message data will be adaptively routed to the destination node. Using one DMA FIFO at the source compute node, the RTS descriptors are maintained for rendezvous messages destined for the destination compute node to ensure proper message data ordering thereat. Using a reception counter at a DMA engine, the destination compute node tracks reception of the RTS and associated message data and sends a clear to send (CTS) message to the source node in a rendezvous protocol form of a remote get to accept the RTS message and message data and processing the remote get (CTS) by the source compute node DMA engine to provide the message data to be sent. The message is complete when the injection counter at said first compute node counts down to zero (0), and wherein the receive is complete when the reception counter at said destination compute node counts down to zero (0). The entire contents of Ser. No. 11/768,813 are wholly attached and provided herein in Appendix D.

As further shown in FIG. 2 illustrating the node architecture detailing L2, L3 and 10 Gb Ethernet connections, there is also included in the node a Scratch SRAM 25, provided to serve as a background communication mechanism with a host system. All four cores 12 have equal access to the SRAM which is critical for the independent exchange of messages between each core and the host system. The size of the Scratch SRAM may range on the order of 32-128 KB. As a common bottleneck for inter-processor is the exchange of software locks, the Scratch SRAM also provides functionality especially tailored for handling lock exchanges. That is, as will be explained in further detail herein below, it provides atomic load-and-update functions accessible by all cores using only a single load instruction. Further details regarding the hardware locking functionality that provides support for synchronization between the multiple processors in the multiprocessor and the orderly sharing of the resources are described in greater detail herein below.

Referring back to FIG. 1, there is additionally provided two DDR-2 controllers 17 which enable use of the low cost commodity DDR-2 external memory (not shown). As mentioned, the latency to this external memory is one of the critical design parameters and different memory configurations may be supported with the internal DDR-2 controller thereby allowing many system memory configurations as will be explained in greater detail herein.

In a preferred embodiment, the same compute node ASIC may be used as an I/O node which is associated with a subset of the compute nodes (16, 32, 64, or 128 compute nodes), for handling fileserver communication and I/O operations. That is, the I/O nodes are identical to the compute nodes. The only difference is that an I/O node enables and uses an external network interface, such as a 10 Gigabit Ethernet 19. While the compute nodes may have the integrated 10 Gb Ethernet (they share a common ASIC), for purposes of discussion, the 10 Gb Ethernet interface 19 is enabled at the I/O nodes only. As shown in FIG. 2, the 10 Gb Ethernet functional units (XEMAC, ToMAL) interfaces to an arbiter unit 26 which arbitrates inputs to L3 from torus DMA 20 and from 10 Gb Ethernet 19. This allows the processor within a node to set up a transfer and return to handling messages with very little overhead.

The node ASIC 10 additionally includes the functionality necessary to boot, debug and support RAS (reliability, availability and serviceability). On the ASIC, this functionality is provided by an extension of the IEEE1149.1-1993 standard, also known as the JTAG standard. While the standard was originally conceived for manufacturing test of chip I/O pins and chip-to-chip interconnections on a card via boundary scan, the JTAG standard has also defined "Test Data Registers" (TDRs) that provide a mechanism for accessing the chip internal logic. As in the predecessor system described in commonly-owned, co-pending International Patent application PCT/US02/05571 filed Feb. 25, 2002 entitled "A Novel Massively Parallel Supercomputer", the entire contents and disclosure of which is incorporated by reference as if fully set forth herein, extensive use is made of these JTAG TDRs for chip self test functions, for boot code loading, for chip configuration and control, for monitoring and for debug. In particular, each of the PPC450 cores has a slave JTAG interface 29 that can be used with the IBM RiscWatch™ software for detailed debug operations of each PPC450 core.

As found in co-pending disclosure U.S. patent application Ser. No. 11/768,791, in one aspect, a novel method is described that uses the JTAG interface and Control System software for a debug functionality that allows cycle-by-cycle access to a large part of the chip state, so that detailed waveforms can be constructed of the evolution of the chip state. In particular, the system is able to construct a cycle-by-cycle view of any part of the state of a digital chip, using a combination of on-chip circuitry and software. In one implementation, assuming the system supports multiple frequency clock domains in a chip or ASIC, there is provided, in one aspect, generating a synchronized set of enable signals in correspondence with one or more IC sub-units for starting operation of one or more IC sub-units according to a determined timing configuration. Then, there is required a counting, in response to one signal of the synchronized set of enable signals, a number of main processor IC clock cycles; and, upon attaining a desired clock cycle number, generating a stop signal for each unique frequency clock domain to synchronously stop a functional clock for each respective frequency clock domain. Upon synchronously stopping all on-chip functional clocks on all frequency clock domains in a deterministic fashion, data values may be scanned out at a desired IC chip state. The chip state can be followed for a length of time that is limited only by the amount of storage space of external computers. The subset of the digital chip state to be viewed is not subject to pre-determined restrictions (such as special on-chip wiring), other than that the state is contained in scannable latches, such as commonly already required for manufacturing test of the chip. Flexibility is provided for enabling choice of the chip state of interest at bring-up time (as opposed to at design time). The lack of restrictions (other than data volume) for the length of time over which the chip state can be followed is a further advantage. The additional on-chip circuitry required to implement this function constitutes only minimal additional chip area, as it is largely shared with existing Logic Built In Test (LBIST) circuitry for chip manufacturing test. The entire contents of Ser. No. 11/768,791 are wholly attached and provided herein in Appendix E.

From a full system perspective, the supercomputer as a whole is controlled by a Service Node, which is the external computer that controls power-up of the machine, partitioning, boot-up, program load, monitoring, and debug. The Service Node runs the Control System software as will be described in greater detail herein below. The Service Node communicates with the supercomputer via a dedicated, private 1 Gb/s Ethernet connection, which is distributed via an external Ethernet switch to the Service Cards that control each midplane (half rack). Via an Ethernet switch located on this Service Card, it is further distributed via the Midplane Card to each Node Card and Link Card. On each Service Card, Node Card and Link Card, a branch of this private Ethernet terminates on a programmable control device, implemented as an FPGA (or a connected set of FPGAs). The FPGA(s) translate between the Ethernet packets and a variety of serial protocols to communicate with on-card devices: the SPI protocol for power supplies, the $I^2C$ protocol for thermal sensors and the JTAG protocol for Compute and Link chips.

On each card, the FPGA is therefore the center hub of a star configuration of these serial interfaces. For example, on a NodeCard the star configuration comprises 34 JTAG ports (one for each compute or I/O node) and a multitude of power supplies and thermal sensors.

Thus, from the perspective of the Control System software and the Service Node, each sensor, power supply or ASIC in the supercomputer system is independently addressable via a standard 1 Gb Ethernet network and IP packets. This mechanism allows the Service Node to have direct access to any device in the system, and is thereby an extremely powerful tool for booting, monitoring and diagnostics.

Moreover, the Control System can partition the supercomputer into independent partitions for multiple users. As these control functions flow over an independent, private network that is inaccessible to the users, security is maintained.

In summary, the computer utilizes up to five interconnect networks for various types of inter-processor communication. 10 Gigabit Ethernet or Infiniband, depending on the availability of appropriate low cost switches and RAID systems, are used to support locally attached disk storage. A private 1 Gb Ethernet (coupled locally on card to a variety of serial protocols) is used for control, diagnostics, debug, and some aspects of initialization. Two types of high bandwidth, low latency networks make up the system "fabric".

Node Memory

The compute node memory system includes an on-chip cache hierarchy, an off-chip main store, and optimized on-chip support for locking and communication between the 4 ASIC processor cores 12. The memory system is architected for peak performance over the range of target applications, as will be described. The aggregate memory of the machine is completely distributed in the style of a multi-computer, with no hardware sharing between nodes. Each node may own, for example, 2 gigabytes of physical memory, resulting in a total of 144 terabytes in a 72K-node system. As shown in FIG. 1, the physical memory of the node is shared by the four processors 12 within the ASIC, and the hardware provides optional coherence support.

FIG. 1 shows the first-level caches 15 associated with each processor core 12. The instruction cache is part of each PowerPC450 core macro, and is separate from the data cache. In an example embodiment, the I-Cache, or instruction cache, is 32 Kbytes in size, with a line size of 32 bytes. It is 64-way set-associative, and includes 16 sets. Lines are stored with virtual address tags, and are replaced in round-robin order. If enabled, the I-Cache can speculatively prefetch the next 3 lines following a cache miss. As shown in FIG. 1, I-Cache line fills are performed through a dedicated 128-bit bus emerging from each respective PowerPC450 core. Preferably, instruction fills go around the L2 cache, and are serviced from the L3 cache so they do not interfere with data accesses to the L2 cache. The L1 D-Cache, or data cache 15, is part of the PowerPC450 core macro, and is separate from the instruction cache. It has the same basic organization as the I-Cache, but is physically tagged. In one embodiment, the data cache is 32 Kbytes in size, has a line size of 32 bytes, and is set-associative with 16 sets of 64 ways each. Like the I-Cache, it uses a round-robin replacement policy. The data cache produces two separate 128-bit data buses 31 to and from L2, one for reading and one for writing. A line transfer between the L1 and L2 caches would then require two consecutive 16-byte transfers, and optimally return the critical word first. The PowerPC450 memory system allows pages of memory to be mapped as write-through, cacheable, or cache inhibited. Each D-Cache 15 supports snooping cache coherence protocol, and more particularly write-invalidate cache coherence protocol. The D-Cache provides single-cycle hit latency, and, of 850 MHz, for example, the peak fill rate is 6.8 Gbyte/sec.

Unlike the previous generation, PowerPC 450 core provides hardware support for cache coherence for write-invalidate cache coherence protocol for multicore coherence. The coherence of a node is architected as shown and described with respect to FIG. 3.

In this protocol, a processor ensures that it has exclusive access to data before it writes that data. On each write, all other copies of the data in all other caches are invalidated. If two or more processors attempt to write the same data simultaneously, only one of them wins the race, causing the other processors' copies to be invalidated. When one of the cores or DMA writes data, the write signal is fed to snoop filters of the other three cores. The snoop filter filters out most of the unnecessary invalidations to enhance the performance of the other three cores when the write is irrelevant to them. The details of the snoop filter mechanisms implemented in the node ASIC of the supercomputer of the invention are described in commonly-owned, co-pending United States Patent Publication Nos. US06/0224836 (U.S. patent application Ser. No. 11/093,130); US060230239 (U.S. patent application Ser. No. 11/093,132); US06/0224838 (U.S. patent application Ser. No. 11/093,152); US06/0224837 (U.S. patent application Ser. No. 11/093,131); US06/0224835 (U.S. patent application Ser. No. 11/093,127); US06/0224840 (U.S. patent application Ser. No. 11/093,160); US06/0224839 (U.S. patent application Ser. No. 11/093,154) the whole contents and disclosures of each of which is incorporated by reference as if fully set forth herein.

In a further aspect, the processors of a multiprocessor system having a cache coherence mechanism may be partitioned into groups, and the cache coherency mechanism along with the processors may be partitioned so that every group of processors remains consistent and operates just like a smaller version of the whole multiprocessor system. Thus, as found in co-pending disclosure U.S. patent application Ser. No. 11/768,532 entitled "Programmable Partitioning For High-Performance Coherence Domains In A Multiprocessor System", in one aspect, the supercomputer of the present invention implements techniques for logically partitioning the multiprocessor computing system having a multitude of processing units and a multitude of snoop units. Each of the processing units includes a local cache, and the snoop units are provided for supporting cache coherency in the multiprocessor system. Each of the snoop units is connected to a respective one of the processing units and to all of the other snoop units. The multiprocessor computing system further includes a partitioning system for using the snoop units to partition the multitude of processing units into a plurality of independent, adjustable-size, memory-consistent processing groups. Preferably, when the processor units are partitioned into these processing groups, the partitioning system configures the snoop units to maintain cache coherency within each of said groups.

In the operation, data packets specifying memory references are sent from the processing units to the snoop units, and each of the snoop units includes a packet processor for processing the data packets. Also, the partitioning system includes a multitude of control mechanisms, and each of the control mechanisms is associated with one of the snoop units. Each of the control mechanisms blocks the associated snoop unit from processing selected ones of the data packets; and in particular, blocks the associated snoop unit from processing data packets coming from processing units outside the processing group to which the snoop unit belongs. In this way, the control mechanisms effect the desired logical partitioning of the processing units. The entire contents of Ser. No. 11/768,532 are wholly attached and provided herein in Appendix F.

In the coherent multiprocessor system implemented at the nodes of the invention, and in a node where a memory reference issued by one processor can affect the caches of other processors in the system, the present invention, and particularly, the nodes, are enabled to single-step coherence events transferred between processors in a multiprocessor system. Thus, coherence events which are active at a certain processor cycle in a compute node could be processed in a single-step, allowing for designers and programmers to easily troubleshoot multiprocessor systems. As found in co-pending disclosure U.S. patent application Ser. No. 11/768,857 entitled "Method And Apparatus For Single-Stepping Coherence Events In A Multiprocessor System Under Software Control", in one aspect, each processor's snoop unit further includes a plurality of multiple coherence ports for receiving coherence requests from each processor in the multiprocessor system and for transmitting a coherence acknowledgment from the processor to which the snoop unit is attached. A coherence traffic processing unit processes the coherence requests and the coherence acknowledgments, and, a coherence port to processor unit receives and transmits the coherence requests and the coherence acknowledgments between the coherence traffic processing unit and the processor. A plurality of step registers are programmed under software control for performing single-stepping in said multiprocessor system, wherein the coherence requests active at a certain cycle are processed in a single-step mode. To monitor the processing of coherence events in a multiprocessor system, the method comprises the steps of: clearing the memory of a plurality of step registers disposed in a snoop unit; mapping the step registers into a plurality of memory address space; and determining if a bit value has been written into the step register, wherein if a bit value has been written into the step register, the computer-implemented method will proceed in a single-step mode and if no bit value has been written into the step register, the computer-implemented method will proceed in a normal execution mode. Thus, the single-step mode provides for processing of coherence requests to the processor in single steps and the normal execution mode provides for processing of the coherence requests to the processor in the normal course. The entire contents of Ser. No. 11/768,857 are wholly attached and provided herein in Appendix G.

In the coherent multiprocessor system implemented at the nodes of the invention, a method and system is provided to insert specific coherence events in a multiprocessor computer system, and to present those coherence events to the processors of the multiprocessor computer system as if they were generated by the normal coherence protocol. These coherence events are inserted in the computer system by adding one or more special registers for this purpose. By writing into said special registers, specific coherence events are inserted into the multiprocessor system. To the processors, these inserted coherence events are indistinguishable from the normal events generated by the inter-processor coherence protocol.

Once the inserted coherence events are processed, the processing of normal coherence events can continue in the execution mode. As found in co-pending disclosure U.S. patent application Ser. No. 11/768,547 entitled "Insertion Of Coherence Events Into A Multiprocessor Coherence Protocol", in one aspect, the method of inserting coherence events into a multiprocessor computer system, where each processor unit has a local cache, and a snoop unit for supporting cache coherency in the multiprocessor computer system, includes providing each of the snoop units with a set of insert registers for storing a plurality of coherence events; and, presenting the coherence events to the processing units for processing. The computer system may then be monitored to determine the effect of processing the coherence events. The entire contents of Ser. No. 11/768,547 are wholly attached hereto and provided herein in Appendix H.

In the coherent multiprocessor system implemented at the nodes of the invention, a novel arbitration mechanism for selecting one or more request signals from among a plurality of request signals requesting access to a shared resource, is provided. That is, an arbitration mechanism is provided that enables the sharing of a snoop, or invalidation port of a cache between multiple queues of invalidation requests broadcast from remote processors in a coherent multiprocessor system. As found in co-pending disclosure U.S. patent application Ser. No. 11/768,799 entitled "Method And Apparatus For A Choose-Two Multi-Queue Arbiter", in one aspect, the apparatus and method enables the granting to one or more requesting entities access to a resource in a predetermined time interval (e.g., an arbitration cycle), each requesting entity asserting a request signal for accessing the resource. An arbitration cycle corresponds to a time in which the grant signals associated with the one or more of the asserted request signals is generated. Thus, while most arbiters grant a single request each arbitration cycle, in the present implementations, when the resource being shared has the capacity to handle more than one request per arbitration cycle, either because of resource availability or because the resource operates faster than the arbiter, the arbitration mechanism implements an arbitration methodology that can grant multiple requests in a single arbitration fairly and efficiently. The entire contents of Ser. No. 11/768,799 are wholly attached hereto and provided herein in Appendix I.

As known, FIFO queues are a very common structure used in computer systems. They are used to store information that must wait, commonly because the destination of the information is busy. For example, requests to utilize a shared resource often wait in FIFO queues until the resource becomes available. Another example is packet-switched networks, where packets often wait in FIFO queues until a link they need becomes available.

A common operation in a multiprocessor is memory synchronization, which insures that all memory accesses and their related coherence protocol events started before some point in time have completed. For example, memory synchronization can be used before initiating a DMA transfer of data prepared in memory. The synchronization insures that the memory is completely consistent before the DMA transfer begins.

Before a multiprocessor memory synchronization can complete, all coherence protocol events that were initiated prior to the synchronization must be processed. Some of these events could be stored in FIFO queues in the coherence logic of the multiprocessor. One way to make sure all such events have been processed is to drain all of the FIFO queues before completing the memory synchronization. However, this is inefficient because coherence events that arrived after the memory synchronization began are unnecessarily processed, causing a delay in the completion of the synchronization. A second problem with this approach is that processors must be prevented from generating new coherence actions or else the queues will continue to fill, potentially causing a livelock. Stopping all of the processors is necessary for the complete draining approach, but inefficient.

The supercomputer of the present invention thus implements a mechanism for tracking queue entries that existed prior to the memory synchronization, and completing the synchronization when those entries have been processed. Ideally, the memory system is further allowed to continue generating new coherence protocol events while the events prior to the synchronization are draining. As found in co-pending disclosure U.S. patent application Ser. No. 11/768,800 entitled "Method And Apparatus For Efficiently Tracking Queue Entries Relative to a Timestamp", in one aspect, a method and apparatus implemented at the node comprises a coherence logic unit, each unit having a plurality of queue structures with each queue structure associated with a respective sender of event signals transmitted in the system. A timing circuit associated with a queue structure controls enqueuing and dequeuing of received coherence event signals, and, a counter tracks a number of coherence event signals remaining enqueued in the queue structure and dequeued since receipt of a timestamp signal. A counter mechanism generates an output signal indicating that all of the coherence event signals present in the queue structure at the time of receipt of the timestamp signal have been dequeued. In one embodiment, the timestamp signal is asserted at the start of a memory synchronization operation and, the output signal indicates that all coherence events present when the timestamp signal was asserted have completed. This signal can then be used as part of the completion condition for the memory synchronization operation. The entire contents of Ser. No. 11/768,800 are wholly attached hereto and provided herein in Appendix J.

FIG. 2 depicts the overall architecture of L2 and L3. Respective second-level L2R and L2W caches 30a, 30b, respectively, are relatively smaller and basically serve as a prefetch and write-back buffers for the third-level (L3) cache which is large. The multiplexer (MUX) devices 33 switches connect four L2 caches to 2 banks of L3 cache 35, e.g., at 4 MB capacity each. L3 is shared by instructions and data, and provides high-bandwidth, low-power access to the working set of most applications. The L3, being integrated on the SOC, has higher bandwidth and shorter latency, and it greatly eases the memory wall problem.

Each L2 caches 30a,b include a read-only line store and a write buffer. L2R is very small, and basically serves as a prefetch buffer for line fills. L2R is fully-associative and includes 15 lines, each of which is 128 bytes in size preferably fully fix twice the size of an line). An L2R hit is expected to have a latency of 3 cycles, and match the peak fill rate. The presence of the write buffer allows the core to complete writethroughs very quickly and allows for the larger L2, L3 line size to be aggregated. Both the L2 caches implement some form of prefetching. The L3 cache 35 is constructed of embedded DRAM (eDRAM) and, in one embodiment, is 8 megabytes in size. Several options for the organization of the cache are possible. For example, in one embodiment, a straightforward set-associative cache, shared by 4 processors, is implemented. In another embodiment, two L3 caches 35, each of which is shared, are implemented. The cache organization enables 4 processors to access L3 simultaneously in the best case. The capability of partitioning off a portion of the L3 cache for direct access is additionally possible.

At a nominal design core frequency of 850 MHz, for example, the L1 cache 15 may sustain a peak fill rate of 16 bytes every 1.176 nsec cycle. The eDRAM macro can provide 32 bytes of data every 2 nsec. Therefore, four macros in parallel are needed to match the peak L1 fill rate of all four processor cores. The datapath between the L3 and L2 caches may operate at half the core frequency and return 32 bytes (256 bits) per cycle. Again, the L3 cache 35 may be divided for simultaneous processor access, which would result in an implementation requiring four banks of macros.

Each node of system is further advantageously provided with memory that forms a programmable bank memory subsystem and a programmable bank selector mechanism. As described in co-pending disclosure U.S. patent application Ser. No. 11/768,805entitled "Programmable Bank selection for Banked Memory Systems", the eDRAM, DRAM and other memory structures are programmable to be partitioned, and configurable in a variety of memory configurations with embedded circuitry selectors. The entire contents of Ser. No. 11/768,805 are entirely attached and provided herein in Appendix K.

Each node of system is further advantageously provided with a prefetch unit placed between the between caches in different levels of hierarchy in order to alleviate the latency of access of the slower cache mechanisms. One particular implementation enables prefetching of streams of varying prefetch depth. As described in co-pending disclosure U.S. patent application Ser. No. 11/768,697 entitled "A Method of Prefetching Streams of Varying Prefetch Depth", in one aspect, a monitoring method is provided that comprises monitoring a plurality of load requests from a processing unit for data in a prefetch buffer and determining an access pattern associated with the plurality of load requests, adjusting a prefetch depth according to the access pattern, and prefetching data of the prefetch depth to the prefetch buffer. The entire contents of Ser. No. 11/768,697 are entirely attached and provided herein in Appendix L.

Returning to FIG. 1, as a direct-mapped, 8 Mbyte cache can store 1/256 of the expected 2 Gbyte main store, this results in a tag size of 8 bits. Assuming a line size of 128 bytes, the directory would have 64K entries of 8 bits each, requiring 0.5 Mbits of SRAM. If the cache is 8-way associative, then the number of lines remains the same, but the tag size increases to 11 bits. The node memory system additionally includes the shared SRAM comprising locks functionality for inter-processor communication and exchange for avoiding bottlenecks.

The hardware locking functionality that provides support for synchronization between the multiple processors in the multiprocessor and the orderly sharing of the resources are provided. As described in U.S. patent application Ser. No. 11/768,812, entitled "Configurable Memory System And Method For Providing Atomic Counting Operations In A Memory Device", in one aspect, addresses a common bottleneck for inter-processor memory access (e.g., the exchange of software locks), by providing in a configurable memory system for a multiprocessor environment, atomic load-and-update functionality especially tailored for handling lock exchanges accessible by all processor cores using only a single load instruction. That is, a system and method for performing atomic counter operations in a memory storage device is provided in a computer processing system including a processor device that issues physical memory addresses for accessing a memory location in a memory storage device. The memory device receives the physical memory address from an issuing processor, the memory address including instruction bits specifying an atomic counter operation to be performed at a memory location; and, removes the instruction bits from the received memory address to form a further memory address used in selecting the memory address location in the memory storage device. An atomic counter operation is performed at the further memory address according to the instruction bits. The instruction bits represent an operational code for performing the atomic counter operation that is embedded in the physical memory address. The op code representing one or more atomic counter operations that may be performed include one or more of: fetch-and-clear, fetch-and-increment, and fetch-and-decrement operations. Moreover, further, the physical memory address from an issuing processor further includes one or more bits designating one or more contiguous set of counters in the memory storage device, each counter allocated for the atomic counter operations. The entire contents of Ser. No. 11/768,812are entirely attached hereto and provided herein in Appendix M.

Each node of system is further advantageously provided with a method and apparatus to reduce interleaving packets of a stream or message and reduce separating write-combinable accesses. As described in co-pending disclosure U.S. patent application Ser. No. 11/768,593entitled "Extended Write Combining Using a Write Continuation Hint Flag," in one aspect, a method and/or apparatus to reduce the amount of Read-Modify-Write cycles caused by the alignment of packet boundaries when storing data in memory is provided. Thus, the amount of Read-Modify-Write cycles to a memory device is reduced. Numerous Read-Modify-Write (RMW) cycles are caused by the alignment of packet boundaries when storing the packet to the cache memory. The RMW cycles are reduced by communicating message continuation information along with packet data, thus, extending the active time of the fragment in a write combining buffer, and increasing the probability of write combining. More specifically, the processor initiates and executes a Read-Modify-Write command as new packets of data are received for the same message. The apparatus reduces the amount of Read-Modify-Write cycles by explicitly signaling or flagging to the write combing buffer that a write continuation is likely to occur in the near future and to wait for additional data packets before writing the data associated with the flagged message to the cache memory, thereby changing the replacement policy decisions of the write combining buffer. The entire contents of Ser. No. 11/768,593are entirely attached and provided herein in Appendix N.

Error correction codes (ECCs) have been developed to not only detect but also correct bits determined to be in error. ECCs utilize multiple parity check bits stored with the data message in memory. Each check bit is a parity bit for a group of bits in the data message. When the message is read from memory, the parity of each group, including the check bit, is evaluated. If the parity is correct for all of the groups, it signifies that no detectable error has occurred. If one or more of the newly generated parity values are incorrect, a unique pattern called a syndrome results, which may be used to identify the bit in error. Upon detection of the particular bit in error, the error may be corrected by complementing the erroneous bit. While error detecting codes have a low overhead, error correcting codes are very inefficient for small data items and are usually used for groups of 8 bytes and larger. If a fraction of the group is changed, the unchanged data needs to be retrieved to generate the ECC for the entire group, causing expensive Read-Modify Write cycles. As described in co-pending disclosure U.S. patent application Ser. No. 11/768, 527 entitled "Combined Group ECC Protection And Subgroup Parity Protection" in one aspect, error correction code may be generated that provides error correction capabilities for a group of data as well as parity protection for fractions of that group. Further code may be generated that simultaneously represents ECC on a group of bits and parity across subgroups of these bits. A method and system for providing combined error code protection and subgroup parity protection for a given group of n bits is provided with the method comprising the steps of identifying a number, m, of redundant bits for said error protection; and constructing a matrix P, wherein multiplying said given group of n bits with P produces m redundant error correction code (ECC) protection bits, and two columns of P provide parity protection for subgroups of said given group of n bits. The entire contents of Ser. No. 11/768,527 are entirely attached and provided herein in Appendix O.

Finally, the nodal memory system includes a main store 40 that is composed of double-data rate (DDR2) DRAM. It is built from commodity double-data rate synchronous DRAM (SDRAM DDR-2) devices. The main store is external to the node ASIC. One target memory system is based on of two (2) sets of DDR-2 memory controllers 17a, 17b, each with a 128 bit data interface running at ½, ⅔, or ⅓ of the processor frequency. For a 2 GB/node design, 40 DDR-2 0.512 Gb chips, each with ×8 data width memory is provided to support chipkill and potentially prefetching pointers. For a 4 GB/node design, 40 DDR-2 1 Gb chips, each with ×8 data width memory is provided. Another possibility for a 2 GB/node design is to use 20 DDR-2 1 Gb chips, each with ×16 data width, and for a 4 GB/node design, 20 DDR-2 Gb chips, each with ×16 data width. For a processor clock frequency at 850 MHz, and DDR-2 at ½ processor frequency, the total memory bandwidth is 13.6 GB/s. When functioning as I/O nodes, the ASIC also supports the external DDR-2 in a similar way.

An ECC and chipkill algorithm described in commonly-owned, co-pending U.S. patent application Ser. No. 11/768,559 entitled "Error Correcting Code With Chip Kill Capability And Power Saving Enhancement", in one aspect, provides a strategy for detecting memory errors in computer systems and detects and corrects memory chip errors when less than two full redundant memory chips can be used for error correcting code. A memory error correcting approach is provided that, with high probability, can correct memory chip failure with a much-reduced amount of redundancy. Thus, the supercomputer of the invention, implementing a memory system that includes a first set of user data memory chips and a second set of system data memory chips, implements a method and system for detecting memory chip failures. The method for detecting chip failure comprises the steps of accessing user data from the user data chips; and using error detection data from the system data chips testing the user data for errors. This testing step includes the steps of (i) generating a sequence of check symbols from the user data, (ii) grouping the user data into a sequence of data symbols, (iii) computing a sequence of syndromes using said sequence of data symbols and said sequence of check symbols, (iv) if all the syndromes are zero, identifying the user data as having no error, and (v) if one of the syndromes is non-zero, then (1) computing a set of discriminator expressions, and (2) using said discriminator expressions to determine whether a single symbol error has occurred or a double symbol error has occurred. In the preferred embodiment, if an error is detected, then the error is corrected, and less than two full system data chips are used for testing the user data and correcting the error. The entire contents of Ser. No. 11/768,559 are entirely attached and provided herein in Appendix P.

With the advent of high speed external memories that employ a source synchronous interface it has become difficult to extract data from the interface. Today DDR SDRAMs deliver data and strobe that are edge aligned. In order to capture the data, the strobe signal is delayed to the midpoint of the data and then used as a clock to latch the data into storage elements (i.e., the latches on a chip). With higher memory interface speeds, the amount of data eye available to move the strobe into is shrinking. For analysis and for strobe centering the system must be able to determine the data eye internal to the chip particularly, for monitoring the DDR memory data eye and adjusting the strobe location to improve the memory interface. Thus, as described in co-pending disclosure U.S. patent application Ser. No. 11/768,810 entitled "Data Eye Monitor Method And Apparatus" in one aspect, a system and method provides for an infinite persistant data eye wherein the strobe signal may be continuously adjusted in real-time operation to ensure accurate latching of the data signals at the input of a receiving data latch circuit throughout its operation. To generate an infinite persistent data eye, a two-phase process is provided whereby, in a first phase, incoming read data signals are adjusted individually and latched to provide the read data to a requesting unit. The read data is also fed into a balanced XOR tree to combine the transitions of all incoming read data signals into a single signal. This signal is passed along a delay chain and tapped at constant intervals. The tap points are fed into latches, capturing the transitions at a delay element interval resolution. Using XORs, differences between adjacent taps and therefore transitions are detected. The eye is defined by the segments that show no transitions over a series of samples. The eye size and position can be used to readjust the delay of incoming signals and/or to control environment parameters like voltage, clock speed and temperature. Once the width of the data eye is known, various actions can be taken to improve the memory interface (i.e. strobe centering can be adjusted). Actions can be performed by hardware or by a combination of software and hardware. Using this method the data eye can be monitored continuously during actual read operations and not simply during a diagnostic or power on time. The entire contents of Ser. No. 11/768,810 are entirely attached and provided herein in Appendix Q.

Finally, this ASIC has greatly enhanced performance counters that are unified not just on per core level, but also on per node level. Details of a shared performance monitor for a multiprocessor system is described in herein-incorporated, commonly-owned, co-pending U.S. patent application Ser. No. 11/768,777 entitled "A Shared Performance Monitor In A Multiprocessor System", wherein in one aspect, there is provided a performance monitor unit in a multiprocessor environment which is easy to program and access, and which allows free allocation of counters between the number of processors. Such a performance monitor unit allows assigning all performance counters available on a chip for counting processor events to a single processor to count large number of processor events simultaneously, or that such a design allows for flexible allocation of counters to processors as needed for individual performance tuning tasks optimally. This allows for more efficient usage of available resources, and simplify performance tuning by reducing cost. The performance monitoring unit (PMU) for monitoring performance of events occurring in a multiprocessor system comprising a plurality of processor devices, with each processor device for generating signals representing occurrences of events at the processor device, comprises: a plurality of performance counters each for counting signals representing occurrences of events from one or more plurality of processors in the system; and, a plurality of input devices for receiving the event signals from one or more processor devices of the plurality of processor units, the plurality of input devices programmable to select event signals for receipt by one or more of the plurality of performance counters for counting, wherein the PMU is shared between multiple processing units, or within a group of processors in said multiprocessing system. The entire contents of Ser. No. 11/768,777are entirely attached and provided herein in Appendix R.

System Interconnect (Types and Topologies)

Collective Network

This network is similar to the collective network as described in herein incorporated commonly-owned, co-pending International Patent application PCT/US02/05571 filed Feb. 25, 2002 entitled "A Novel Massively Parallel Supercomputer", the contents and disclosure of which is incorporated by reference as if fully set forth herein. In the preferred embodiment as shown in FIG. 4, this network 50 may be configured as a sparse binary combining tree of nodes 10 that extends over the entire supercomputer machine, allowing data to be sent from any node to all others (broadcast), or a subset of nodes, with low latency. It is understood that the collective network router may have more than 3 ports (3 ports means binary (2 in, 1 out)). Higher degree virtual trees, (tertiary-tree, quaternary, etc.) can be mapped onto collective networks with more ports, allowing shorter and lower latency paths at the expense of more chip-to-chip connections and significantly higher cabling costs. Lower dimensions give longer latency and fewer chip-to-chip communications. Message passing is supported on the collective network, and controlled by any of said cores within each ASIC, allowing intensive operations like broadcast and reduction communication to proceed independent of the compute nodes. Every link of this network has a preferred target bandwidth of 1.7 Gigabytes/sec in both the transmit and receive directions, but is not limited to this speed and, in fact, may change as the technology improves.

Software enhancements to the collective network are now described in herein-incorporated, commonly-owned, co-pending U.S. patent application Ser. No. 11/768,669entitled "A Mechanism To Support Generic Collective Communication Across A Variety Of Programming Models". That is, the system and method of the invention is provided with techniques for supporting collective communications on a plurality of processors that use different parallel programming paradigms, and, in one aspect, may comprise a schedule defining one or more tasks in a collective operation, an executor that executes the task, a multisend module to perform one or more data transfer functions associated with the tasks, and a connection manager that controls one or more connections and identifies an available connection. The multisend module uses the available connection in performing the one or more data transfer functions. A plurality of processors that use different parallel programming paradigms can use a common implementation of the schedule module, the executor module, the connection manager and the multisend module via a language adaptor specific to a parallel programming paradigm implemented on a processor. Relatedly, a method and system that supports collective communications on a plurality of processors that use different parallel programming paradigms, may comprise receiving a plurality of application calls invoking a collective operation from a plurality of processors using different parallel programming language, each of the plurality of application calls being received via a language adaptor specific to a parallel programming language implemented in a processor. The method may also include, for each of the plurality of application calls, creating a schedule defining one or more tasks in a collective operation associated with an application call, creating a executor for executing said one or more tasks, and invoking a multisend operation to perform a communication tasks associated with said one or more tasks. The entire contents of Ser. No. 11/768, 699are entirely attached and provided herein in Appendix S.

The hardware functionality built into the collective network is integer addition, subtraction, maximum, minimum, AND, OR, XOR, and broadcast. The functions are implemented in the lowest latency possible manner. For example, the addition function results in the lowest byte of the word being sent first on the global network. This low byte is immediately added to the other bytes (in hardware) from the other sources with the result being shifted out to the next router in the network. In this way, a 64 bit word has already up several layers of the network before the high order byte is shifted out. This results in the possibility for a very low latency addition over the entire machine. This low latency addition is critical for iterative sparse linear equation solving techniques that require a global inner product.

Finally, a global floating point sum over the entire machine may be performed in a few microseconds by utilizing the collective network two times. The first time the maximum of all the exponents is obtained and the second time all the shifted integer numbers are added in global operations.

One I/O node 55 is dedicated to providing I/O operations for 16, 32, 64, 128 or 256 compute nodes (depending on the depth of the network and packaging technology supported). It should be understood that this ratio of I/O nodes to compute nodes is configurable to optimize physical packaging of the supercomputer. That is, the packaging design enables alternate configurations such that the ratio of computation nodes to I/O nodes may change depending on requirements of the parallel calculations. The 10 Gb Ethernet network connects I/O nodes and external switches to disks and hosts.

When functioning as I/O nodes the ASIC includes a 10 Gigabit Ethernet or like interface such as Infiniband, that may be used to access, through a large switch, a large RAID disk system. The switches also interface to the host, allowing the host to access either the system nodes or to the RAID disk system through simple Ethernet I/P transactions. Inside the machine, dedicated I/O processors, which are ASICs with Ethernet functionality enabled, terminate the 10 Gigabit connection. Any I/O node can read or write the RAID disk at full 10 gigabit/s speed. In the example embodiment described, the 72 k nodes of the system are configured to have a peak aggregate I/O bandwidth to disk or host of 576 terabyte per second (assuming compute node to I/O ratio 128:1, and each 10 Gb link delivers 1 GB/s I/O bandwidth).

Global and Notification Network

The Global Barrier and Notification Network is part of this invention. The functionality of the global barrier and notification network is closely related to the functionality of a collective network and may function as a "sideband" network in parallel therewith. For example the global "or" function is an interrupt, and a global "and" is an "all wait". These functions are utilized in the global barrier and notification network by generating and communicating global asynchronous signals comprising: (1) signals that each node in a logical partition (e.g., sub-collective network) can set and detect; (2) hardware logic functions that perform a global AND or of all the input signals; and (3) a global network to collect and distribute the results to each node. Several different signals may co-exist in a large system and the idea may be implemented in many ways. Preferably, a single bit wide differential pair is run in parallel to the collective network to facilitate low latency global barriers.

Each root node of the global barrier and notification network is connected along the route of the collective network to a predetermined number of compute nodes of the computing structure and operates in conjunction therewith for initiating global asynchronous operations in the computing structure, the massively-parallel supercomputer, as needed for a particular parallel algorithm. Preferably, the collective network and global barrier and notification networks may be configured in a binary-tree-like configuration that extends over the entire supercomputer machine, allowing data to be sent from any node to all others (broadcast), or a subset of nodes, with low latency. It is understood that other virtual tree embodiments, tertiary-tree, quaternary, etc. may be implemented with the trade-off for lower latency being more interconnects.

The logic circuit utilized for asynchronous global signal generation that is implemented in the global barrier and notification network can be found in herein incorporated, commonly-owned, co-pending International Patent application PCT/US02/05571 filed Feb. 25, 2002 entitled "A Novel Massively Parallel Supercomputer". Further details regarding operation of the Global Barrier and Notification Network is described in commonly-owned, co-pending United States Patent Publication No. US04/0068599, the whole contents and disclosure of which is incorporated by reference as if fully set forth herein.

Three Dimensional Torus

Figure 5:
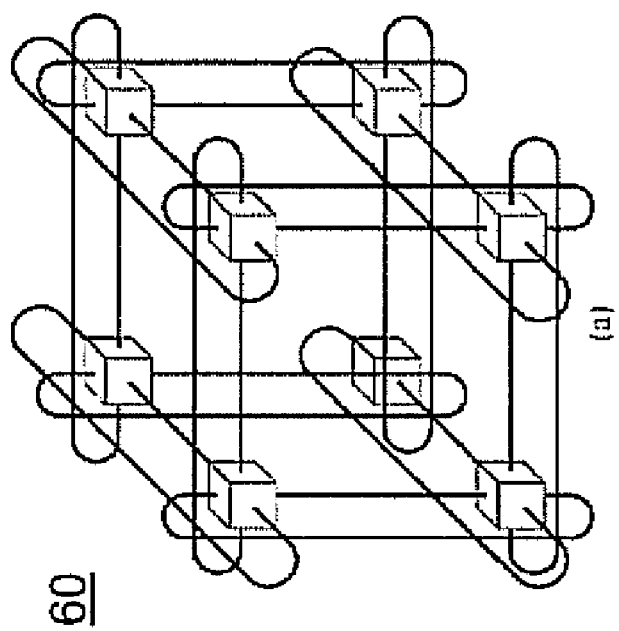
FIG. 5 depicts a unit cell of a 3-D torus implemented in the massively parallel supercomputer of the present invention.
Figure 4:
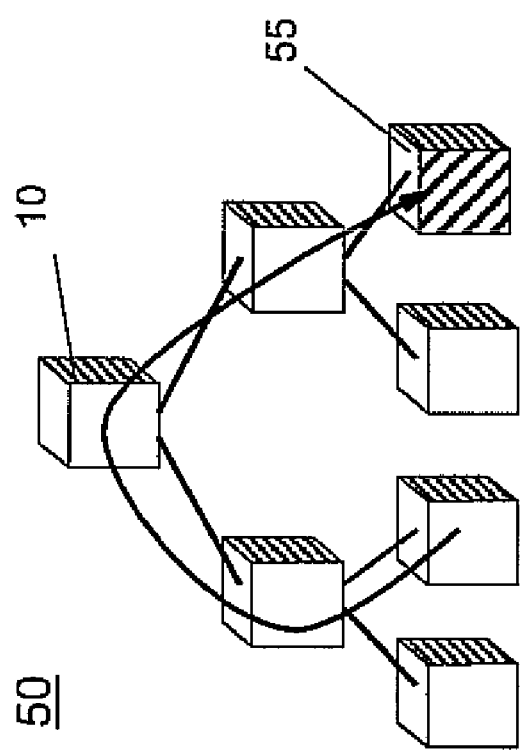

As described with respect to FIG. 5, the physical machine architecture is related to n-dimensional torus 60 which in the example embodiment, is a simple 3-dimensional nearest neighbor interconnect that is "wrapped" at the edges. All neighbor nodes 10 are equally distant, except for time-of-flight differences such as exist between different racks of ASICs, making code easy to write and optimize. The nearest neighbors may be four times the processor speed (e.g., 3.4 Gb/s in each direction) in an example embodiment. Each node therefore supports 6 independent bi-directional nearest neighbor links with an aggregate bandwidth of 5.1 GB/s, for example. As will be described in further detail, the system circuit cards are wired in sub-cubes while mid-planes, two per rack, are wired as sub-cubes. The entire 72 k machine is a 72×32×32 torus, although other partitions are possible.

The torus network 60 of FIG. 5 is used for general-purpose, point-to-point message passing and multicast operations to a selected "class" of nodes. The topology is a three-dimensional torus constructed with bi-directional, point-to-point, serial links between routers embedded within the ASICs. Therefore, each ASIC has six neighbor connections, some of which may traverse relatively long cables. The torus network provides both adaptive and deterministic minimal-path routing, and is deadlock free. Throughput and latency are optimized through the use of virtual through (VCT) routing as described herein and in the reference to P. Kermani and L. Kleinrock entitled "Virtual Cut-Through: A New Computer Communication Switching Technique," Computer Networks, Vol. 3, pp. 267-286, 1979 incorporated herein by reference. Messages may be composed of multiple packets, which are the atomic units of routing. Therefore, adaptively-routed packets from the same message may arrive out of order. Packets are variable in size, ranging from 32 bytes to 256 bytes with a granularity of 32 bytes (i.e., one to eight 32-byte chunks per packet).

As mentioned, Virtual channels (VCs) are used to provide deadlock-free adaptive routing and increase throughput and the torus network in the supercomputer and may have four or more VCs in a configuration whereby two VCs employ adaptive routing, and two employ deterministic routing. One of the deterministic VCs is used as an "escape channel" for the adaptive sub-network in order to guarantee deadlock freedom, and the other is reserved for high-priority packets. Because it is expected that most traffic will be adaptively routed, two adaptive VCs are provided in order to reduce head-of-line blocking and allow for the use of simple FIFO buffers within the routers.

Flow control between routers is provided through the use of tokens because the latency across a cable allows multiple packets to be in flight simultaneously. There is sufficient VCT buffer space to maintain full link bandwidth in the absence of contention.

The network will reliably deliver a single copy of every packet injected. Routers guarantee reliable forwarding by keeping good copies of every packet until downstream routers acknowledge successful reception. Using link-level parity or CRC (or both), routers may detect packets corrupted in transmission. When this occurs, an "Error" indicator is appended to the packet indicating that it should be discarded by the receiver. Therefore, only a single, good copy of each packet will leave the network.

Thus, a scheme similar to the Unique Token Protocol of the Reliable Router scheme described in the reference to William J. Dally, Larry R. Dennison, David Harris, Kinhong Kan, and Thucydides Xanthoppulos entitled "Architecture and Implementation of the Reliable Router," Proceedings of HOT Interconnects pp. 122-1 33, August 1994 incorporated by reference herein, which maintains at least two copies of every packet in the network at all times, may be used. However, according to an example embodiment, the present invention maintains only a backup copy while a packet is at risk on a link, which is where almost all of the packet corruption occur. In the rare event that the router hardware corrupts a packet, error detection on the message level may submit a request to the sender.

Further details of torus router link input and output circuits can be found in herein incorporated, commonly-owned, co-pending International Patent application PCT/US02/05571 filed Feb. 25, 2002.

In one embodiment, there are four virtual channel (VC) FIFOs, corresponding to two adaptive VCs, one deterministic VC, and one high-priority, deterministic VC.

As mentioned, flow control is managed through the use of tokens, each of which is associated with 32 bytes of VC FIFO buffer space. Therefore, a single packet may consume multiple tokens. Tokens for each of the VC FIFOs are individually managed and granted by downstream routers to upstream routers in batches. An upstream router will never send a packet unless it has a sufficient number of tokens to cover the entire packet size. In other words, a packet is never sent unless there is sufficient buffer space at the downstream router to store it, if necessary. This is an important property for guaranteeing deadlock freedom.

Because a packet cannot be sent unless there is sufficient space to buffer it downstream, the size of the VC is dictated by the link bandwidth and latency between adjacent routers. Their size allow for full utilization of the link bandwidth in the absence of contention. In the worst case, two adjacent routers can be separated by five cable hops when the machine is partitioned, and each cable hop has a latency of about 30 ns. As will be described, adjacent cable hops must traverse a link chip, which is expected to have a latency of about 10 ns. Therefore, the worst case link latency between adjacent routers is around 200 ns.

The following scenario can be used to calculate the VC FIFO size: an upstream router sends a 256-byte packet. The downstream router receives the packet in its entirety and verifies its integrity. Because the packet has been forwarded and not stored, the downstream router would like to return 8 tokens immediately. However, the upstream link is blocked by a 256-byte packet that has just started transmission. Once the upstream link is free, the tokens are returned. The VC FIFO must be large enough to the data that can be sent during the latency of this scenario. Assuming a 3.4 Gbit/sec link bandwidth, the calculation proceeds as follows:

| Event | Time |
|---|---|
| Begin sending 256 byte packet | 0 |
| Header of packet arrives downstream | 200 |
| Tail of packet arrives downstream | 802 (2048 bits/3.4 Gb/s = 602 ns) |
| Packet is processed | 812 |
| 256 byte "blocking" packet is complete | 1530 |
| Token arrives at upstream router | 1730 |
| Token is processed | 1740 |

(1740 ns) × (3.4 bits/ns)/(8 bits/byte) = 740 bytes

Therefore, a VC FIFO size of approximately 740 bytes is sufficient. However, a larger FIFO allows for some slack so that tokens can be returned in batches, and allows for some amount of network congestion to be tolerated. Given the ASIC technology used in the present invention, it is easily feasible to implement a VC FIFO size of 2K bytes or larger.

Torus Routing Algorithm

The torus routing algorithm attempts to maximize network throughput by routing individual packets adaptively whenever possible. The routing algorithm is provably deadlock free, and uses only minimal paths. Packet latency is minimized through the use of virtual cut-through (VCT) routing, which behaves like wormhole routing under modest load. Packets are variable in size, allowing software to favor latency or bandwidth. The basic idea behind the torus routing algorithm is to embed two virtual networks onto the physical network: an adaptive network and a deterministic network. The adaptive network is not deadlock free, but the deterministic network is. Because a packet can always choose the deterministic network, it serves as an escape route for deadlocks in the adaptive network. Further details regarding this approach may be found in the reference to Jose Duato entitled "A New Theory of Deadlock-Free Adaptive Routing in Wormhole Networks," IEEE Transactions on Parallel and Distributed Systems, Vol. 4, No. 12, pp. 1320-1331, December 1993 and the reference to Steven L. Scott and Gregory M. Thorson entitled "The Cray T3E Network: Adaptive Routing in a High Performance 3D Torus," In Proceedings of HOT Interconnects 1996, the contents and disclosures of each of which are incorporated by reference as if fully set forth herein. Such an algorithm is relatively easy to implement because the network uses VCT routing. Furthermore, a packet is never sent unless there is sufficient buffer space at the downstream router to hold the entire packet. Therefore, the time that a packet occupies a link is always finite and, as a result, deadlocks only occur as buffer space dependencies. The deterministic network routing algorithm is guaranteed not to have any cyclic buffer dependencies, and the adaptive network routing algorithm includes the possibility of switching to the deterministic network at each router.

In one embodiment, the adaptive network utilizes two equivalent VCs. That is, packets using the adaptive network will be free to use either VC at each hop. The advantage of the two adaptive VCs is simply to reduce head-of-line blocking between buffered packets. Consequently, two paths are needed into the Global Crossbar.

Only one VC is needed for the deterministic network if bubble flow control is used in the manner such as described in the reference to C. Carrion, R. Beivide, J. A. Gregorio, and F. Vallejo entitled "A Flow Control to Avoid Message Deadlock in k-ary n-cube Networks," Proceedings of the Fourth International Conference on High Performance Computing, pp. 322-329, 997, the contents and disclosure of which is incorporated by reference as if fully set forth herein. This algorithm insures that there is at least one free packet buffer in every network cycle so that deadlocks based on cyclic buffer dependencies are impossible. There are other well-known deterministic, deadlock-free routing algorithms that use more than one VC. For instance, the classic, dimension-ordered algorithm described in the reference to W. J. Dally and C. Seitz entitled "Deadlock-Free Message Routing in Multiprocessor Networks," IEEE Transactions on Computers, pp. 547-553, May 10, 1987, the contents and disclosure of which is incorporated by reference herein, requires only two VCs to implement. Therefore, the deterministic network preferably utilizes no more than two VCs.

Preferably, both the adaptive and deterministic networks use minimal-path routing. That is, packets are only free to move in profitable directions, where a profitable direction is one that moves the packet closer to its destination. Furthermore, the routing algorithms cannot tolerate any node failures, node failures are handled by repartitioning the machine, as will be explained in greater detail herein.

When a packet is injected into the network, software specifies whether the packet can or cannot use the adaptive network. It is expected that most traffic will use the adaptive network. A packet at the head of an injection queue is treated similarly to an incoming packet by the router.

Every incoming packet not terminating at the router triggers the Route Selection function, which generates a set of potential output VCs. That set remains with the packet until an output is granted. In a lightly loaded network, it is expected that the packet will be able to arbitrate and win an output quickly, avoiding buffering in a VC FIFO. Regardless, the packet can arbitrate when it reaches the head of the VC FIFO.

In order to guarantee freedom from deadlock, every packet is required to include in its set of potential output VCs the VC that conforms to the deterministic algorithm. At each hop, there is only one such VC. In addition, packets that are permitted to use the adaptive network will include both adaptive VCs in every profitable direction. Therefore, a deadlock in the adaptive network will always be resolved when one (or more) of the deadlocked packets chooses the deterministic VC. Eventually, this will always occur because the deterministic network is guaranteed to drain (and become available) in a finite amount of time.

A packet enabled for adaptive routing will always choose the first available VC, whether it is adaptive or deterministic. Therefore, the packet can jump between the two embedded networks. Because of VCT routing, this is still provably deadlock free. In short, a move the adaptive network to the deterministic network is seen as an injection from the point of view of the deterministic network. Conversely, a move from the deterministic to the adaptive network is seen as a reception from the point of view of the deterministic network. Therefore, the combined network remains deadlock free.

Class Operations in Torus

Some algorithms such as linear solvers and FFTs require the broadcast of information within a group of nodes that map physically onto a one or two dimensional surface of the three dimensional torus. To efficiently support these multicast requirements, a second type of routing within the torus network is utilized which is referred to herein as "class routing". Class routing is preferably implemented through the use of a small number (e.g., four to sixteen) of local registers at the receiving end of every torus link. For messages which are demarcated as a "class" packet, the routing of the packet is determined not by the destination but rather by his local register which carries a bit for each of the possible outputs as well as a bit indicating whether the packet should be stored locally in addition to possibly continuing. This routing enables efficient multicast onto a wide range of geometric shapes. Further details regarding Class Network Routing Operations in Torus may be found in commonly-owned, U.S. Patent Publication Serial No. US04/0081155 (U.S. Ser. No. 10/468,999 entitled "Class Networking Routing", the entire content and disclosure of which is incorporated by reference as if fully set forth herein.

Packet Format

It is the responsibility of the communication sub-system to deliver entire messages reliably: including packetizing, re-assembly, and verification. Furthermore, the communication sub-system includes features to enhance the performance of a Message Passing Interface (MPI). The packet is the atomic unit of routing, but is often a piece of a larger message. Because of adaptive routing, packets may arrive out of order. Therefore, each packet must include enough information to specify which message it belongs and where it belongs within that message. The packet format can be found as described in commonly-owned, co-pending International Patent application PCT/US02/05571 filed Feb. 25, 2002 entitled "A Novel Massively Parallel Supercomputer".

Message Passing/Collective Network

Message passing on the collective network is performed through the use of a packet structure similar to that of the torus network. There is additional support for a small number of class broadcast operations on the collective network. The collective network is a token based network which may be also utilized for system interrupts. Messages are non-blocking across VCs. Interrupts are carried in the same data stream and may be interleaved into the data at any time, including during a packet transmission, through the use of a special "interrupt" out-of-band bit. Further details regarding generation of interrupts and barriers in a global asynchronous network may be found in U.S. Patent Publication No. US04/0068599 (U.S. patent application Ser. No. 10/468,997) the entire content and disclosure of which is incorporated by reference as if fully set forth herein. When configured as a virtual tree, messages are injected into the collective network at any node in the system and they climb up the tree until arriving at either the tree vertex or, at a final destination depending on the type of transfer.

The hardware associated with the collective network is included in the compute and I/O node ASICs. The interface to the compute and I/O processors is a memory mapped FIFO. Each VC has an independent FIFO that guarantees non-blocking across VCs. The arithmetic and broadcast functions of the collective network are also integrated into the compute ASIC. At this local vertex, broadcast and arithmetic operations are in hardware leading to very low latencies. As the virtual tree structure is naturally "neck-down" at the physical 512 node boundary, the bandwidth of the collective network is not as costly in terms of cables as the torus links. Therefore, a high bandwidth collective network interface may be provided that can support 2B/processor clock in each direction simultaneously. The input stage also includes a FIFO interface that is segmented at the VC level.

Packets will be simply received or dropped depending on if the destination in the packet matches the node ID. As shown with respect to FIG. 4, 10 Gb Ethernet traffic utilizes this collective network to send file and host data to the I/O node 55.

System Packaging

Figure 6:
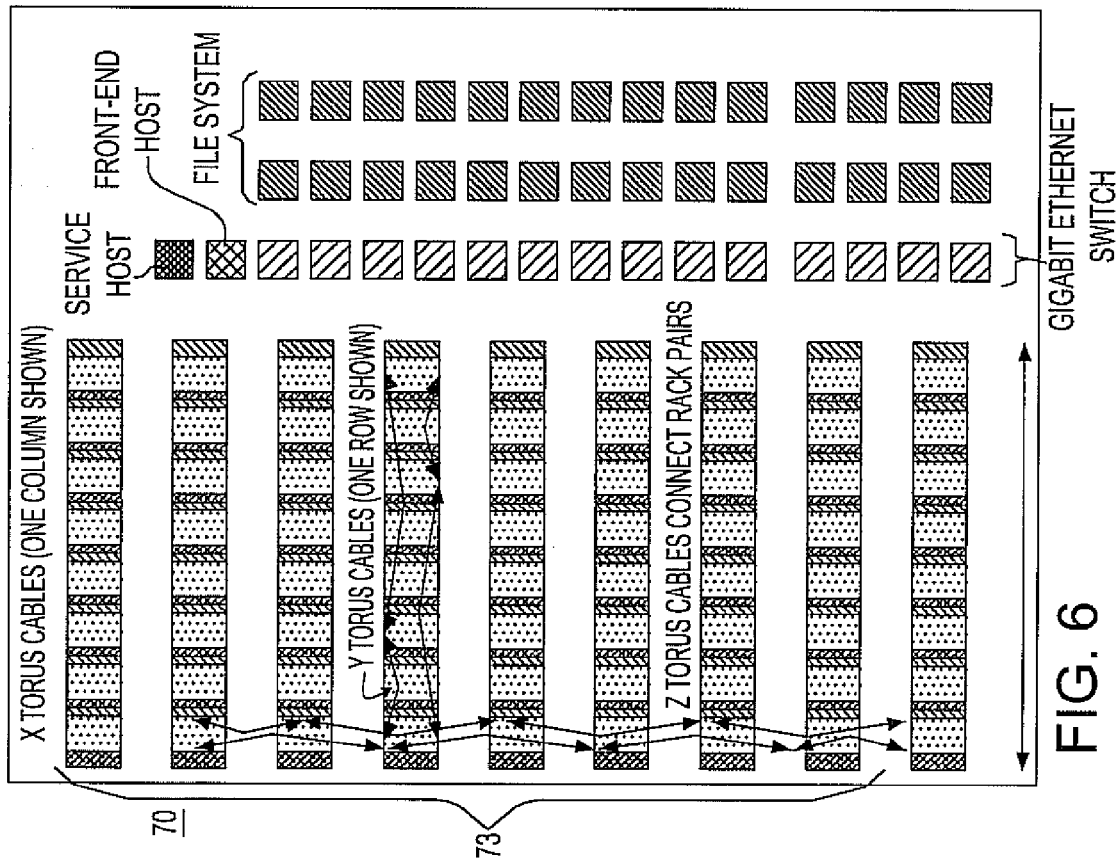
FIG. 6 is a conceptual top view depicting the 72-rack ultrascalable supercomputing machine of the present invention.

FIG. 6 is a conceptual top view 70 depicting the 72-rack ultrascalable supercomputing machine of the present invention.

In the exemplary embodiment depicted in FIG. 6, the supercomputing machine of the present invention comprises 73,728 nodes and seventy two racks in total, with 72 compute racks 73 of the 80 cabled as a single 73,728 processor system. The 73,728 processor system includes 72 compute racks of electronics, arranged as nine rows with 8 racks in each row. It is assumed that a certain wiring organization, optimized for the (x-y-z) machine. Compute racks are connected together using cables based on Spectra-strip twisted pairs, for example, as those used in enterprise servers. Each pair of racks completes a torus in the Z dimension. Thus, each pair of racks includes 2048 compute ASICs organized as (x-y-z) 8×8×32. A row or aisle includes four (4) such pairs, is organized (x-y-z) 8×32×32, and completes the "y" direction. Columns complete the "x" direction. The full 73,728 processor machine is cabled physically (x-y-z) as 72×32×32.

The packaging of the compute node must be handled carefully as there are many high speed signals and density is a high priority. A new high density first level package is designed for the compute ASIC. A single node compute card, as opposed to the 2 node compute card of its predecessor, is used. Each node includes a single compute ASIC and 2 sets of 20 SDRAM-DDR-2 memory chips, each ×8 data width, to support the two memory controllers in the compute ASIC. Each memory controller sends and receives data over a 16B (128 bit) data bus, with 2 additional devices provided for a robust error detection and correction scheme which can sustain the loss of an entire DRAM while preserving the data. This compute card preferably is situated at right angles to the node card. There are 32 compute cards plugged into a node card, and organized as a 4×4×2 interconnect sub-cube. The collective network and global barrier and notification network are grouped similarly within this node card.

When a Compute card is inserted into an I/O slot, the resulting I/O node will support 10 Gigabit Ethernet signaling. Since this is 10× the I/O bandwidth of its predecessor, it may support just 1 or 2 I/O nodes per 32-way compute node card.

Each node card includes 32 compute cards, and optionally 1 or 2 I/O cards which support the 10 Gigabit Ethernet or Infiniband connections, a clock re-driver which distributes the system clock, and an FPGA that provides for the card control and monitoring functions. The FPGA forms the leaf of the 1 Gb Ethernet Control network, and translates between Ethernet packets and a variety of serial protocols for communication with on-card devices: the SPI communication protocol for power supplies, the $I^2C$ protocol for temperature sensors, and the JTAG protocol for Compute, I/O and Link chip control, boot-up, monitor and debug.

Sixteen (16) nodes cards are plugged into a midplane from both sides with 8 node cards on each side. Preferably, each compute rack is comprised of two (2) "midplanes". Midplanes are arranged vertically, one above the other, and are accessed from the front and rear of the rack. Each passive midplane includes 4 link cards which accept the cables, and 16 node cards. Power connectors on the right and left edges of the midplane distribute 48V DC from the power supplies.

Preferably, as will be described, the supercomputing machine is air cooled. Within each compute rack hot airflow is horizontal, left to right. Room air enters the rack the left side and exits a vertical exit plenum at the top right of the rack. Banks of cooling fans, arranged in modules, can be individually accessed and serviced while the machine is running. Further details regarding the cooling module for the supercomputer system may be found in herein incorporated IBM Journal of Research and Development, Special Double Issue on Blue Gene, Vol. 49, Numbers 2/3, March/May 2005 at pp. 217-225.

Each compute and I/O card includes a unique address. The 18 bit address is defined by the cards location on the backplane (9 bits), as well as a address of the backplane (9 bits). Additional bits are encoded on the cards themselves so that each processor has a unique address. This address is used, for example, to form the Ethernet address of the card, or for purposes of reporting failures through the host diagnostic codes.

Clock Distribution

In the preferred embodiment, a common, chip-external half-speed clock is distributed to all of the 72 racks in the system. In this first mode of operation, the processor chips use a PLL to provide a 2:1 frequency stepup, so that the processor cores operate at twice (2×) the common, external system clock frequency. This choice is necessary to achieve the highest system clock speeds, due to a clocking limitation in the high speed signaling (HSS) driver and receiver I/O macros. For system operation below an 800 MHz processor core frequency, an alternate fill-speed external clock may be provided whose frequency is equal to the processor core speed. In this 2nd mode of operation, the on-chip PLL can be bypassed. The 2nd operation mode of this invention thereby obviates the requirement for clock regeneration with a PLL on each processor and avoids long term phase jitter. In both modes the HSS I/O macros send data at a rate four times (4×) the processor core clock speed. Whichever mode is used, using a system-wide common clock means that the relative phases of clock inputs to all processor cores in the entire multi-rack system remain fixed. There are never any bits slipped at clock boundaries because all clocks have a common frequency and a fixed phase relationship. This feature therefore lowers latency and removes the possibility of long software context switching times. Initial clock synchronization through the global broadcast function is also provided.

Figure 7:
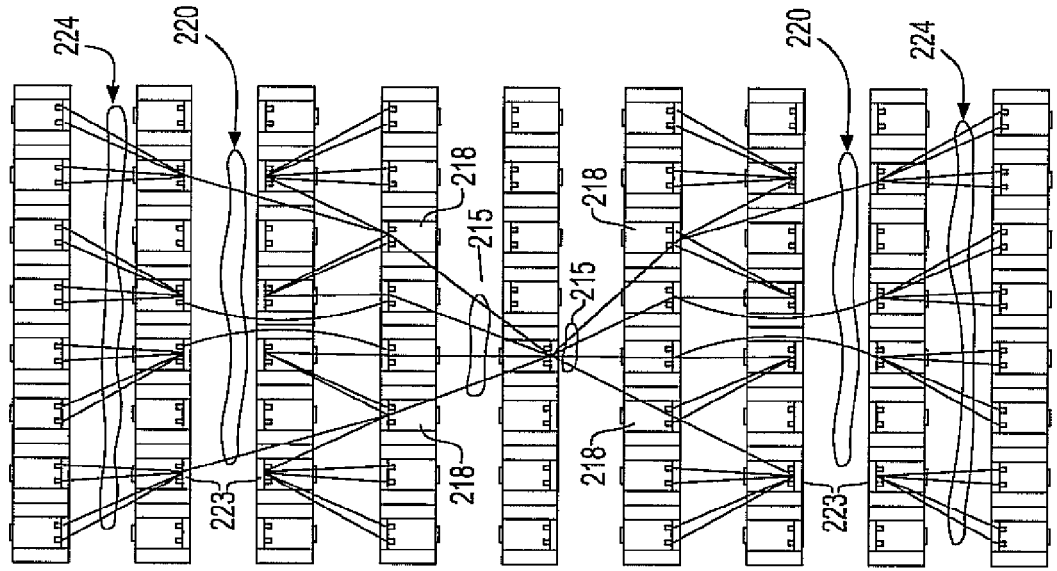
FIG. 7 depicts an example means for distributing a clock overlayed on a top view of the large supercomputing machine of the present invention.

One exemplary means for distributing this clock is shown in FIG. 7, overlayed on a top view of the large supercomputing machine array. A high frequency source near the center of the array depicted as cables 215 is preferably split into nine (9) outputs using a clock redriver and distributed down differential cables of approximately 4.5 meter in length to secondary boxes 218 which source cables 220. These secondary boxes 218, identical to the first except for the cable input replaces the clock source, in turn, distribute the clock to tertiary clock redrivers 223 that in turn send one clock depicted as cables 224 to each midplane. On the midplane, a clock distribution card produces clocks for all cards on the midplane. Compute and link cards in turn, using the same clock redriver, to produce clocks for all ASICs on the card. The depth of the clock tree is 6 stages.

In the preferred embodiment, all clocks to the ASICs have approximately the same delay and pass through the same number of cables, connectors, buffers, etc. Using Low Voltage Positive Emitter Coupled Logic (LVPECL) clock chips based on bipolar technology, the delay through the clock buffer is nearly independent of voltage, which nearly eliminates clock jitter due to temperature variation of the different clock chips. The principal source of jitter is expected to be temperature differences, which are expected to be slow and tracked by a novel data capture scheme as described herein according to Ser. No. 11/768,810 entitled "Data Eye Monitor Method And Apparatus".

Torus Cabling

As mentioned, each compute ASIC of the system is part of a 3-dimension torus connecting all compute nodes of a single system image with 6 high speed serial links. Each link is bi-directional, uses two differential signal pairs (e.g., four (4) wires total 30 per link) and runs with a bit rate of 4 times the frequency of the processor in each direction. With an example processor frequency of 850 MHz, the maximum data rate is 3.4 Gb/s/direction, and allows communication to adjacent neighbors in each of the 3 cardinal directions X, Y, and Z, for a total torus bandwidth of 40.8 Gb/s (5.1 Gbytes/s) per ASIC. As shown in Table 2, the compute card torus connections are arranged in a logical (x-y-z) 2×2×2 configuration. Connections in each logical dimension enter the through a connector, pass through two compute ASICs in series and leave the card by the same connector. Similarly, 512 compute ASICs of a midplane are connected in a logical 8×8×8 torus arrangement. Connections in each logical dimension enter the midplane from a link ASIC on a link card, pass through four compute cards and eight compute ASICs in series and return to the same link ASIC. These link chips re-powers the serial links for signals leaving the midplane.

TABLE 2

| Block | Number of Nodes | X-Y-Z |
| --- | --- | --- |
| Node Card | 8 | 2-2-2 |
| Midplane | 512 | 8-8-8 |
| Dual Racks | 2,048 | 8-8-32 |
| Aisle | 8,192 | 8-32-32 |
| System | 73,728 | 72-32-32 |

Collective Network and Global Barrier and Notification Network

Details regarding the packaging of collective network and global barrier and notification network can be found in herein incorporated IBM Journal of Research and Development, Special Double Issue on Blue Gene, Vol. 49, Numbers 2/3, March/May 2005 at pp. 233-235.

Rack Design

The packaging system for supercomputing machine of the invention places as many processors per rack as can be air cooled. The target power required for a compute card, which includes the ASIC, a plurality of DRAM modules, and the inefficiency of the local DC-DC converters, is 30 W, for example. As the complete rack includes air movers, AC-DC power supplies, link chips, Ethernet switches, cards, clocks, in addition to the compute cards, this adds additional heat load. Thus, an optimal design choice in the example embodiment described places 1024 compute nodes per rack, with an expected total heat load of approximately 45 kW per rack. As will be described, those 1024 compute cards are configured in a manner so as to minimize the number of cables and connectors, while avoiding placement of many components per circuit card that failure of a single components results in a very expensive replacement. The 1024 Compute cards in the rack are distributed over two sections, called "Midplanes", each comprising 512 Compute cards, as described below.

Cooling

Figure 8:
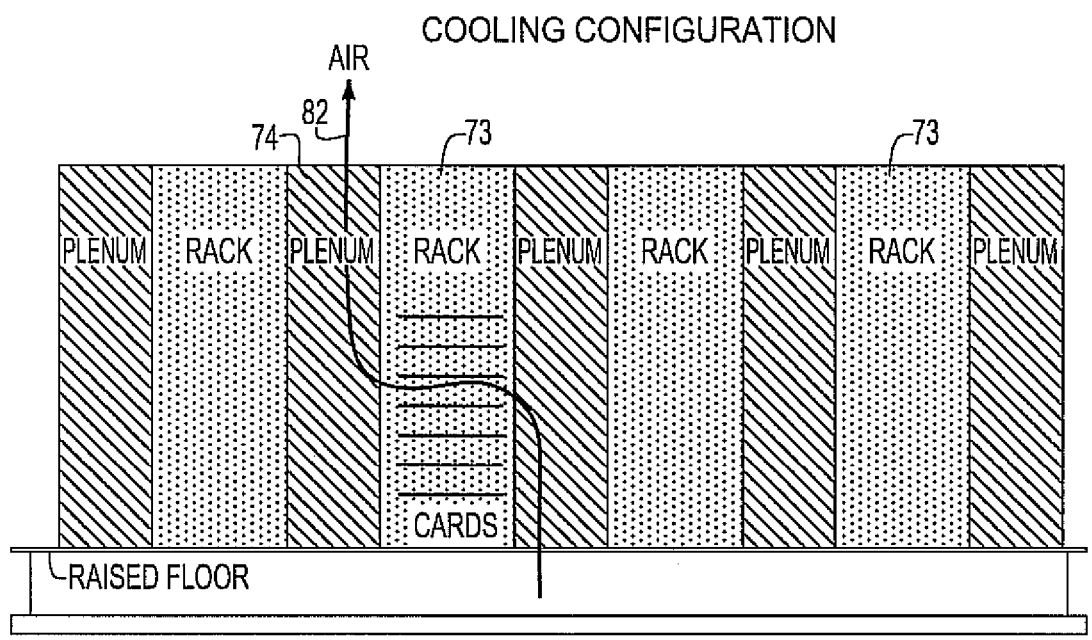
FIG. 8 depicts the airflow within a rack of nodes 73 implemented for the large supercomputing machine of the present invention.

The racks of the system are cooled by forced air convection. FIG. 8 depicts the airflow 82 within a rack 73. Air is drawn into one side of the rack 81 by an array of fans mounted on the opposite side of the rack. The cool air flows past the processor cards (compute and I/O cards) which plug into the node cards, and then the midplanes. The multiple and parallel air streams are collected by a plenum 74 on the rack, providing even and efficient cooling for the cards. In one embodiment, air flows 82 side to side across horizontally oriented cards.

Figure 9:
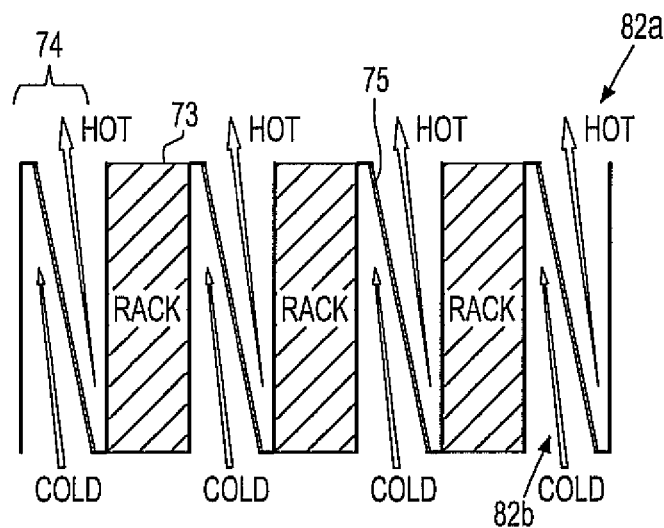
FIG. 9 illustrates a plenum having a diagonal partition comprising a thermal-insulating baffle to separate hot air from cold air in the airflow design shown in FIG. 8.

As illustrated in FIG. 9, the plenum 74 has a diagonal partition 75, comprising, for example, a thermal-insulating baffle to separate hot air 82a from cold air 82b. The diagonal partition 75 enables the plenum space to match the airflow rate exactly. Further details regarding the implementation of the novel plenum may be found in commonly-owned U.S. Pat. No. 7,085,133 entitled "Cooling Using Complementary Tapered Plenums," the entire content and disclosure of which is incorporated by reference as if fully set forth herein. It is understood that the plenum spacing can be narrowed if a hydro-air cooling scheme is employed.

Figure 10:
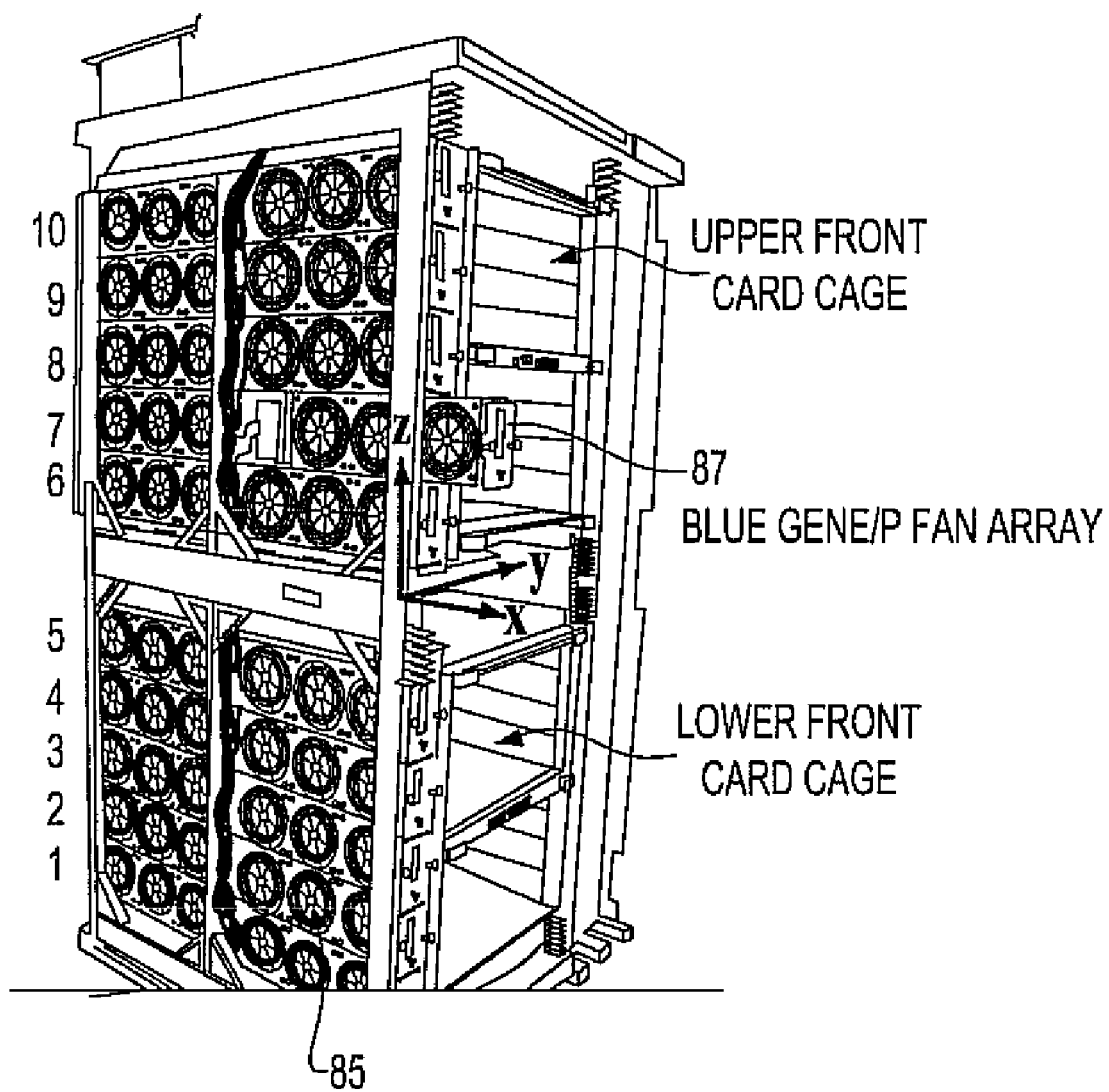
FIG. 10 depicts a side view of a fan generation system 80 implemented for the BGP supercomputer of the invention including arrays of fans 85 packaged into groups.

FIG. 10 depicts a side view of a fan generation system 80 implemented for the BGP supercomputer including arrays of fans 85 packaged into groups. The fans are organized into arrays with numbered rows, with a group of fans is mounted inside a hot-swappable module 87 with redundancy built-in. The fan modules can be replaced without affecting the operation of a rack. The fan speed and air temperature are monitored and controlled during operation by the BGP monitoring system.

Power Distribution

The system rack is powered by a distributed power supply system. Preferably, a 48.0 Volt distribution is used as this power distribution scheme due to the high efficiency for DC-DC conversion, at least for the smaller power modules. In addition, power throttling is implemented to prevent overheating at constant clock frequency as described in herein-incorporated, commonly-owned, co-pending U.S. patent application Ser. No. 11/768,752entitled "Power Throttling Of Collections Of Computing Elements". That is, in the present invention, an apparatus and method is provided for controlling power usage in a computer. A plurality of computers are connected with at least one local control device and a power source supplying power to the local control device and the computers is provided. Further, at least one sensor is connected to the computer and power usage data from the computer using the sensor is ascertained. Thereby, the power usage of the computer using a system control device communicating with the computer and the sensor may be controlled. Relatedly, the power usage of the computer may include the changing of the switching activity of the computer. The entire contents of Ser. No. 11/768,752 are entirely attached and provided herein in Appendix T.

Certain high-speed memory systems may be provided with a feature referred to as receiver parallel termination, which dampen reflections from DRAMs in the systems. Such parallel termination can be implemented with a resistor voltage divider, comprised of one resistor from the signal net to the driver and/or receiver supply voltage (Vdd) and a second resistor from the signal net to the ground reference voltage (Gnd). This type of parallel termination is simple to implement but results in significant DC power dissipation due to current flowing directly through the termination resistors from Vdd to Gnd. In order to reduce power consumption, parallel termination is frequently implemented with a push-pull voltage supply, which provides a midpoint termination voltage (Vtt) between Vdd and Gnd. For a multi-bit bus comprised of a number of nets, each of which is parallel terminated to the same Vtt supply, and for a realistic lossy Vtt supply, the total termination power of the bus varies with the difference between the number of nets driven high vs. low. As described in herein-incorporated, commonly-owned, co-pending U.S. patent application Ser. No. 11/768,552 entitled "Static Power Reduction For Midpoint-Terminated Busses", in one aspect, by controlling the state to which address and control bits are driven when the address and control bus is inactive, significant power savings may be obtained. Thus, in a memory controller and addressable memory devices such as DRAMs, the present invention provides a programmable register to control the high vs. low drive state of each bit of a memory system address and control bus during periods of bus inactivity. In this way, termination voltage supply current can be minimized, while permitting selected bus bits to be driven to a required state. This minimizes termination power dissipation while not affecting memory system performance. The entire contents of Ser. No. 11/768,552 are entirely attached and provided herein in Appendix U.

Midplane

Conceptually, the midplane includes card connections for 16 node cards, 4 link (cable) cards, and one Service card. The Service Card distributes clock, the 1 Gb Ethernet network for the Control System and various persistent power supplies to the other cards, to support its control functions. The midplane card provides high speed differential wiring for the clocks and torus, collective network, and Ethernet networks to interconnect and service all 512 Compute cards. When suitably configured by the Control System software, a midplane can function as an independent 512-way computer with a complete (8×8×8) Torus.topology, implemented without any cabling.

System Partitioning

The supercomputer of the invention may be logically repartitioned by software control, thus permitting a large group of racks, physically cabled together as one system, to be logically divided into multiple systems. Bach of these logically separated systems can then simultaneously run different code, or some separated systems can be serviced while others compute. Logical repartitioning therefore facilitate code development and system maintenance.

Link Chip

The link chip for this ultrascale peta-class machine will play a role analogous to that for its predecessor, BlueGene/L. The communication speed is now more than 2× higher, allowing 4 bits of data to be transferred per cycle of the processor. The torus, collective network and global barrier and notification network are connected across midplanes or partitioned by the link chips. Further details of the link chip implementation can be found in herein incorporated, commonly-owned, co-pending International Patent application PCT/US02/05571 filed Feb. 25, 2002.

Clock Distribution

Serial data capture in the supercomputer of the present invention is designed to be very low power. Towards this end, data is launched with a local clock, and data captured with a local clock, the two local clocks being at the same frequency but differing arbitrarily in phase. This avoids the requirement to send a copy of the launch clock with the data, which in the case of the serial links implemented, would increase the number of wires, and driving circuits, leaving the ASIC.

In one embodiment, the clock is distributed at the speed of the processor (full speed clock) to all processors within system. Alternately, a half frequency clock is distributed and multiplied up to the desired processor frequency within the ASIC.

A clock distribution including clock fanout boards of the desired multiplicity, and cables of the required length, may be connected together to achieve the desired depth, e.g., 20 boards. For example, with a clock fanout of 10, five (5) levels of redrive will generate 100,000 clocks. For example, as discussed herein with respect to FIG. 7, segmentation of the electronics into cards, boards, etc. for the supercomputer requires six (6) levels of redrive. In this manner, a stable distributed clock with maximum skew under 100 ps, at a frequency of at least 425 MHz is realized.

Serial Data Capture

The bandwidth for each of the serial links is 3.4 Gb/s (each direction) for the ASIC nodes in each direction. The bandwidth is bi-directional (not simultaneous bi-directional). The bi-directional requirement is handled via 2 sets of wires, one set for each direction, as discussed herein, in compliance with low power and low cost operating constraints. The High Speed Serial I/O macros used achieves a serial data rate 4× that of the processor clock rate. Further details regarding signaling and data capture can be found in herein incorporated comrnmonly-owned, co-pending International Patent application PCT/US02/05571 filed Feb. 25, 2002

System Software

As software is a critical component in any computer and is especially important in computers with new architectures, there is implemented a robust layered system of software that at the lowest level is very simple and efficient, yet sufficient to run most parallel applications.

Figure 11:
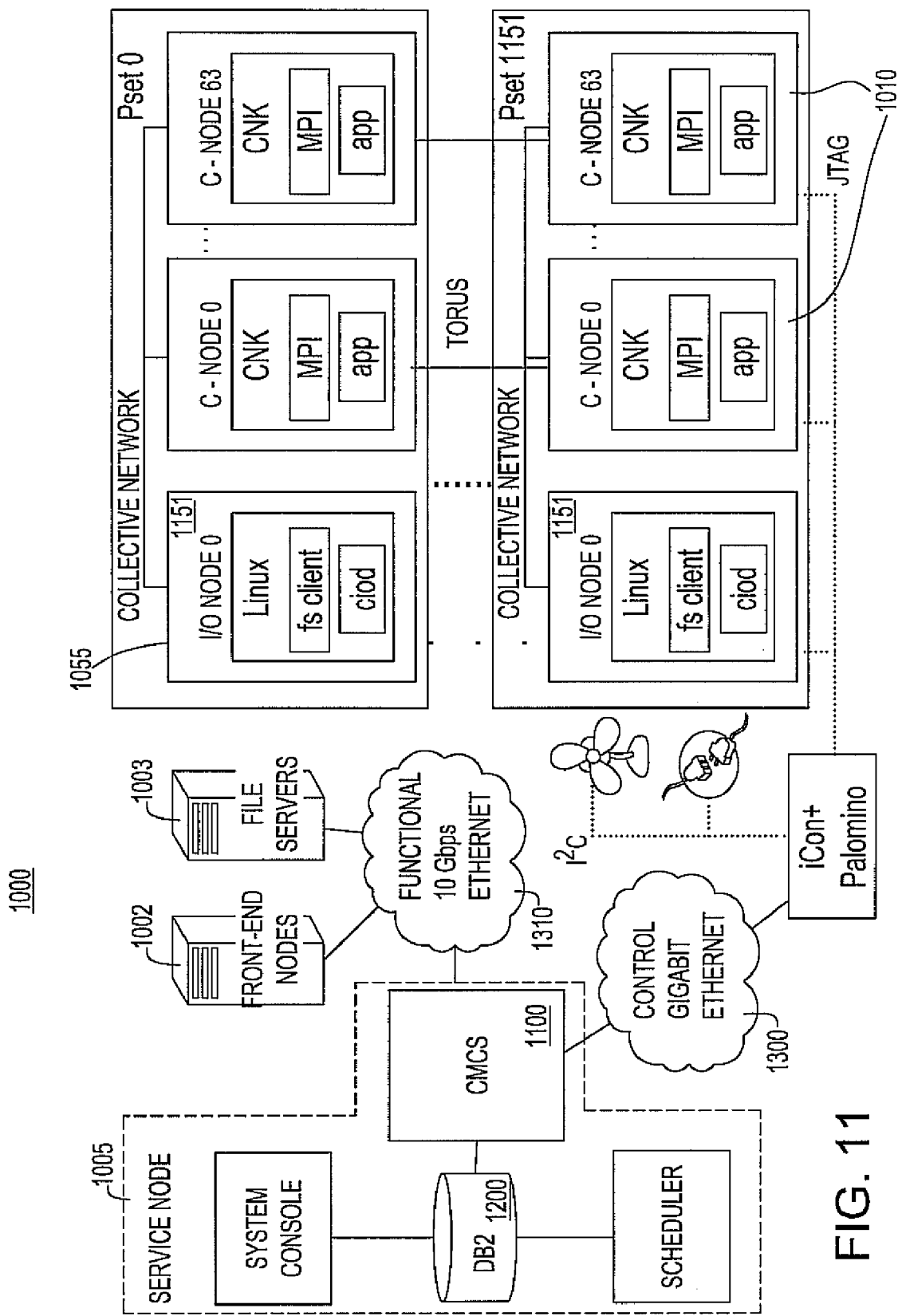
FIG. 11 depicts the high level software architecture 1000 for one embodiment of the BGP supercomputer of the invention including software for: system administration and management, partition and job management, application development and debugging tools, compute node kernel and services, I/O node kernel and services.

This BGP high level software architecture 1000 is shown in FIG. 11. As will be explained in greater detail herein, the BGP system software consists of five integrated software subsystems, that together comprise a "BGP Operating Environment". These subsystems are: System administration and management; Partition and job management; Application development and debug tools; Compute node kernel and services; and, I/O node kernel and services. As shown in FIG. 11, these software subsystems span the three major hardware subsystems in a complete BGP system: (i) the host complex (including front-end nodes FENs 1002, file servers 1003, and, the service node system SNS 1005), (ii) the I/O nodes 1055, and (iii) the compute nodes 1010. In some cases, a particular software subsystem has components in multiple hardware subsystems.

As shown in FIG. 11, types of software implemented in the supercomputer of the invention includes, but is not limited to: system administration and management, partition and job management, application development and debugging tools, compute node kernel and services, I/O node kernel and services. What follows is a more detailed breakdown of the software components.

BGP CMCS Infrastructure

Figure 12:
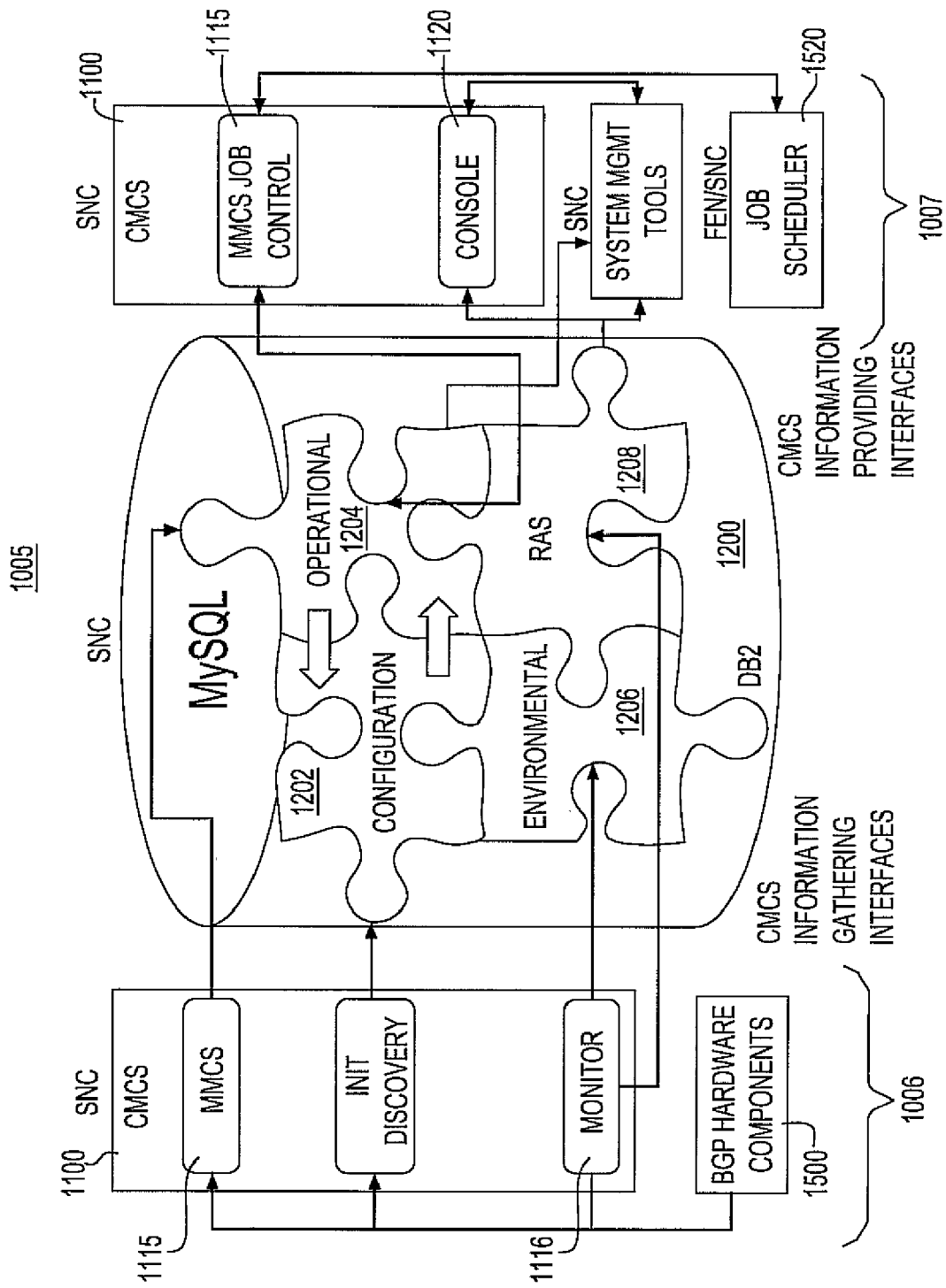
FIG. 12 depicts BGP Database Flows for the software system implemented in the BGP supercomputer of the invention including the CMCS database infrastructure providing four components: configuration, operational, environmental and RAS software.

The BG/P system services are based on the Core Monitoring and Control System (CMCS) infrastructure 1100. This infrastructure depends on multiple databases. Most system services feed data into or obtain data from system databases, including, but not limited to, a configuration database, operational database, environmental database and RAS database. These data are stored in a DB2 database 1200 running on the SNS 1005. FIG. 12 provides a more detailed description of each of these databases found in the database 1200 provided at the SNS service node 1005.

Configuration Database

The configuration database 1202 is the representation of all the hardware on the system, including unique serial numbers or other unique FRU identifiers. The configuration tables are populated by several methods. A small number of entries, for which there is no software method for obtaining the information, will be entered manually into the database during initial setup and configuration. An example of this would be I/O node IP addresses, gateways and default fileserver mount points. Other values, such as the node boards, node cards, and nodes, will be retrieved by the control system software, during initialization, and written into the database tables. Once all of these tables are fully populated, either during installation or during initialization, the values will generally not change except for the part replacement.

Operational Database

The operational database 1204 includes further information and status for things that do not correspond directly to a single piece of hardware. Even though it is still part of the configuration database, this information includes a set of tables that are more operational in nature, and therefore more dynamic. A job scheduler component 1520 that interacts with the SNS to schedule jobs and allocate partitions influences the data in these tables by creating blocks, and creating jobs through a well defined Midplane Management and Control System (MMCS) interface 1115.

Environmental Database

As shown in FIG. 12, an environmental database 1206 is provided that is used to keep current values for all of hardware components on the system. These tables will be updated at certain intervals of time, while the machine is running. Values include, but are not limited to the following: voltages, temperatures, and switch settings, etc. and are all stored in this database.

Polling software that runs on the service node 1005 will collect environmental values from the various hardware components 1500 of the supercomputer. There are different intervals for polling different hardware components. For instance fan speeds may be monitored at different intervals than node cards. This database can be configured to automatically purge data that is older than the stated retention period.

RAS Database

The RAS database 1208 collects Reliability, Availability, and Serviceability data from the BlueGene/P system. Hard errors, soft errors, machine checks, and software problems are continually logged in the RAS database. A system administrator is provided with the ability to query the RAS database 1208 to check on the health of the system and to determine if there are areas of the system that are showing a higher frequency of errors than others The compute and I/O nodes are instrumented to write RAS events into the database through a CMCS interface.

BGP Database Flows

Further in FIG. 11, there is depicted BGP Database Flows. The CMCS component provides information gathering interfaces 1006 enabling basic CMCS services to deposit data into the CMCS, e.g., DB2, database. This database describes the current configuration and state of the BGP main compute section. Other system software components such as job launch use this information to perform system services. The CMCS component provides information providing interfaces 1007 for the system as well.

The BGP database 1200 in one embodiment, resides on the SNS 1005 and is controlled directly by the CMCS 1100 operations on the SNS. The administrative service action commands maintain the Configuration database 1202 with hardware availability information as hardware is installed or replaced. Database information between the Configuration and Operational surfaces is exchanged to reflect the status of midplanes for assignment to job partitions. The CMCS 1100 automatically marks hardware in error in the configuration database whenever a fatal error occurs that requires a service action. A scheduler can reliably trust the configuration database as an accurate assessment of the hardware at any given point in time.

When requests for machine allocations for job partitions come into the MMCS component 1115 from the job scheduler across the FEN 1002 and SNS 1005, MMCS component 1115 will update the Operational database 1204 with assignment status, and send the appropriate commands to the BGP supercomputer creating the actual partition and launching the user application. Subsequent job scheduler requests to query status and control job actions flow to the MMCS interface 1115 and are updated in the Operational database. Communication between the MMCS on the SNS and I/ONK (I/O node) over the functional network (but not the management Ethernet) are performed with 256b key-based authentication in one embodiment. The MMCS system generates and maintains a key list.

During the operation of the BGP hardware, the status of components is monitored and captured in the Environmental database 1206 via the CMCS Monitor component 1116. If environmental readings exceed error thresholds, additional entries are written to the RAS database 1208. Job fatal events in the BGP I/ONs and CNs also signal RAS events. Events are monitored from a Navigator Console 1120 provided interface. All RAS and Environmental data is available to system management routines using standard DB2 tools.

BGP Software Views

User-level applications and system-level software have very different views of the BGP supercomputer. An application executes on a toroidal partition of CNs, which is carved out from the overall system. An application consists of a collection of processes, executing on that partition of CNs, and communicating through message passing. Applications never execute in the FENs, I/O Nodes or file servers. Applications may invoke services in the CNs that cause actions to be performed by these other components. A typical example is file I/O, which is described in greater detail below.

System-level software, in contrast, executes on all portions of the BGP supercomputer complex. From a system-software perspective, the BGP supercomputer complex is a cluster of I/O nodes 1055 managed from the SNS 1005 with hardware diagnostic services performed by the SNS. Application jobs are initiated by the user from the FEN 1002 and includes processes launched and controlled from the SNS, through a well-defined interface between the FENs 1002 and the SNS 1005. The SNS contacts the I/ONK CIOD to launch the user application processes on the CN. CNs are the vehicles for executing those application processes. This approach significantly affects the design of CN and I/ON software, which are also described in greater detail below.

The I/ON (I/O node) and CN (compute node) form a "core" of BGP supercomputer software, and by themselves do not form a complete computing system. The I/ON have no disk storage, just the means to access a Cluster Wide File System (CWFS) and communicate with external resources via IP communications or like communications protocol. A separate CWFS hardware subsystem is necessary. The I/ONs cannot manage the BGP compute main section by themselves. Neither can they compile nor debug BGP user applications. There is a separate cluster of FENs for resource management and application development.

System Administration and Management

The system administration strategy for BGP, in one embodiment, employs the machine as a Linux cluster with a number of nodes equal to the number of I/O nodes in the BGP system. This approach to BGP system administration permits the use of familiar Linux cluster system administration tools.

System management services include overall control and monitoring of the BGP machine. System management of the BGP supercomputer are performed from the SNS 1005, through the management Ethernet network 1300 (FIG. 11) supporting the JTAG protocols. Management through this separate network provides security and reliability that is independent of the interconnection channels use by applications (collective, torus, and I/O Ethernet).

System management services also include machine boot and machine monitoring. Machine boot involves the process of bringing the machine from a powered-down state to the point where system software is running on the CNs and I/ONs. Machine monitoring requires active polling by the SNS 1005 of the state of various components of the machine, including CNs and I/ONs, power supplies, fans, and other devices. Some system management functions may be performed without any intervention from the CNs and I/ONs. Other functions require collaboration from software components in those nodes.

Complete control and management of the BGP compute main section are provided. This provides system administrators remote login capability to monitor the status of the BGP compute main section, and control the power up/down status of system components.

Partition and Job Management

The partitioning and job management services includes the allocation of nodes to job partitions. Each job partition is dedicated to the execution of a single user job. The SNS 1005 is responsible for providing the core partition and job management services. This software is layered over APIs and utilizes MPIRUN (a shell script to run Message Passing Interface) to launch jobs within a partition. Together they provide a job management system providing the services necessary for operation of BGP in a production environment.

Application Development Tools

Application development tools for the BGP supercomputer includes debugging environments, application performance monitoring and tuning tools, and compilers. Compilers run exclusively in lie FEN 1002. The user interfaces to the debugging and performance tools also execute on the FEN, but they also require support from software services in the I/ONs and CNs where the user application is running. Example program compilers such as IBM C, C++ and Fortran and GNU compilers run on the BGP machine. In addition, the applications development tools include Performance Application Programming Interfaces (PAPI) (http://icl.cs.utk.edu/papi/) APIs and provide applications' access to the hardware performance monitors and hardware locks.

A basic debugger interface is also provided that supports a parallel debugger for enabling outside vendors to port to the computer system.

BGP Compute Node Software

Figure 13:
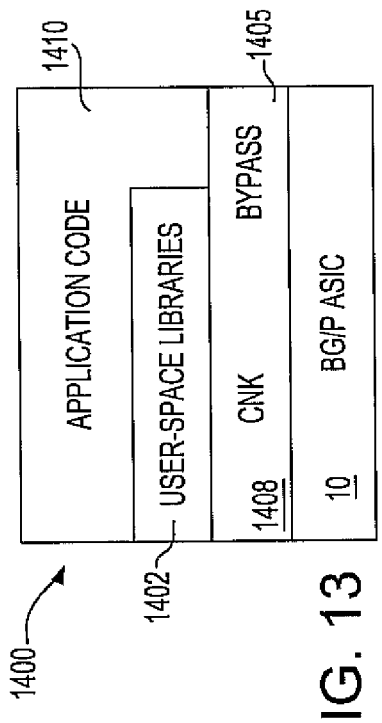
FIG. 13 Software architecture for BGP compute nodes implemented in the BGP supercomputer of the invention; and, FIG. 14 illustrates MPI for BGP are based on MPICH2 and consist of the MPI2 standard without dynamic tasking nor one-sided messaging.

FIG. 13 depicts an example software architecture 1400 for the BGP compute nodes. As shown, executing on the node ASIC 10 is the CN kernel 1402 that controls access to all hardware, and enables bypass 1405 for applications use. User space libraries 1408 and applications 1410 may directly access the torus and trees through the bypass. In one embodiment, user-based code should not directly touch hardware, but there is no such requirement. Moreover, the application code 1410 may reside in one or all cores of a node.

The role of the kernel in the CN (CNK 1402) is to create an environment for execution of user processes, which environment may have a "Linux-like" personality. The system services provided by the CN kernel 1402 are a subset of those services currently provided by the Linux kernel, and is sufficient to run Python based applications. Services delivered with the CN kernel include: 1) process and thread creation and management; 2) memory management; 3) dynamically linked libraries; 4) process debugging, and (5) RAS management.

The CN software appears to application programmers as a familiar Linux-like environment. The standard set of ran-time libraries for C, C+F, and Fortran95 are provided. To the extent possible, functions supported maintain open standard POSIX compliant interfaces. These runtime libraries are sufficient to support important scientific simulation applications including Python based applications.

The I/O path between CNK and IONK to a Parallel Virtual File System (PVFS) is as follows: Data from the compute node traverses the tree network to the I/O node, where the PVFS client forwards it over the 10 Gigabit network 1310 (FIG. 11) via the FGES to the PVFS servers running on the file servers. The PFVS file servers access a Storage Area Network (not shown) via direct attached Infiniband®.

Additional libraries are provided to support message-passing between CNs, POSIX IO, application-assisted checkpoint/restart, and high-performance mathematical computations.

MPI Library

Figure 14:
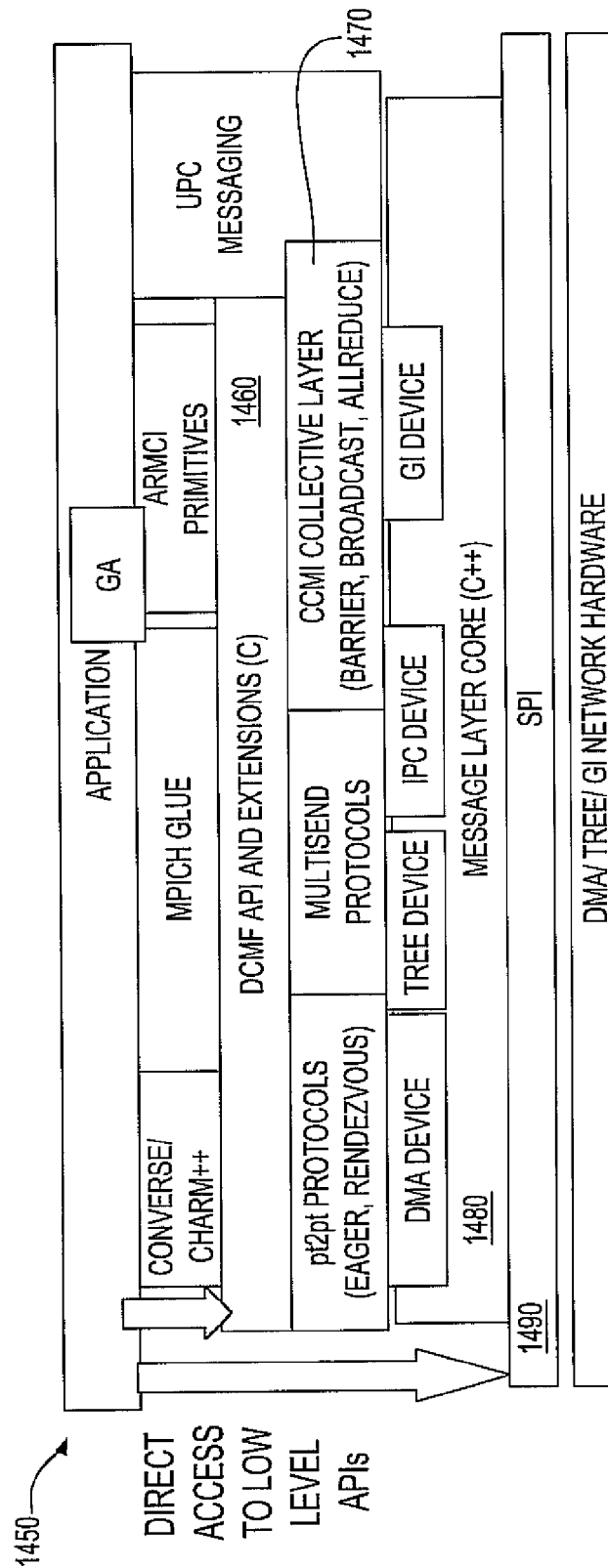

FIG. 14 illustrates the MPI software stack 1450 for a BGP supercomputer node that is based on the MPICH2 (Message Passing Interface V.2) and consists of the MPI-2.0 standard without dynamic tasking nor one-sided messaging. Note the MPICH2 standard accounts for the portability layer (Chameleon) used in the original MPICH to provide portability to the existing message-passing systems.

Application-level message passing is supported by an implementation of MPI-2 (http://www-unix.mcs.Argonne-.gov/mpi/mpi-standard/mpi-report-2.0/mpi2-report.htm) with the exception of dynamic processes. The implementation are based on MPICH2 (http://www-unix.mcs.Argonne-.gov/mpi/mpich2/). The message passing operations are optimized to use the torus, collective and barrier networks in an efficient manner.

The MPI implementation adheres to the "mpiexec" standard correctly. implementing the "-n <ranks>," "-wdir working-dir" and, "-env var-assignments" options, and also providing the ability to run multiple executable binaries on a pset basis and have them share a communicator.

MPI-I/O is enabled on top of the supplied MPI implementation. The correct and complete functioning of MPI-I/O, which is part of the MPICH2 implementation from Argonne, is not hindered by the implementation of MPI in the present invention.

In Addition to MPI, messaging software stack 1450 is designed to support other programming paradigms like UPC, Charm++ and ARMCI/Global Arrays. All the different programming paradigms are built on top of the DCMF (deep computing messaging framework) API 1460. The DCMF API builds provides point-to-point, one-sided and multisend API primitives. The collective communication functionality is supported in the CCMI (component collective messaging interface) 1470. The message layer core 1480 supports device interfaces for the torus, tree, inter-process communication (IPC) and global interrupt networks. The messaging protocols are built on top of these device interfaces and each protocol can access multiple devices. The device layer calls the SPI (systems programming interface) 1490 which provides a low level calls to program the DMA and Tree networks.

For performance reasons the application can bypass some of the layers and directly access the lower layers like DCMF and SPI.

BGP I/O Node Software

The BGP system consists of a large collection of compute nodes (CNs) and I/O nodes (I/ONs). User applications execute exclusively on CNs 1010 (FIG. 11). I/ONs 1055 serve as bridges between the CN and the outside world. They allow applications executing in the CN to access CWFS file servers and to communicate with processes in other machines. I/ONs act as protocol converters, between the proprietary protocols used for communication within the BGP supercomputing system and the industry standard protocols used for communication between systems.

The I/ON software and the SNS software communicates to exchange various data relating to machine configuration and workload. These communications utilize key based authentication mechanism with keys utilizing at least 256 b.

The I/ON kernel (I/ONK) and other software running on the I/ON provide the necessary system services to support PVFS file system access and sockets communication to applications executing in the CN. Applications perform POSIX I/O operations against the CWFS and streaming I/O with sockets as a transport layer for communications with processes residing on other machines. These services are provided transparently to user applications through the I/ONs. That is, user applications directly perform those operations through system library calls executed an the CNs and are unaware of the presence of I/ONs. I/O operations (file or sockets), performed by an application process, in a CN are shipped to its corresponding I/ON using BGP internal protocols. These operations are then executed by system software in the I/ON, which use industry standard protocols to communicate with file servers and processes in a different system.

Reliability, Availability, and Serviceability (RAS)

To optimize the BGP system for maximum uptime, the supercomputing machine includes automatic error correction, redundancy of individual components that fail most frequently, and the ability to repartition the system to isolate known faulty sectors. Regular scheduled maintenance can be used replace known failed components. Most of these components are in N+1 redundant systems as discussed below. Thus BGP should have the feature that its reliability continues to improve over time, as the weaker components are replaced.

Reliability

The reliability of the system is dependent on the intrinsic failure rates of components for "hard" and "soft" or transient failures, the number of components, and the way the system responds to these failures as they occur. Each of these scenarios are discussed below.

Failure Rates

The BGP Main System has a Mean Time Between Failure (MTBF) due to a hardware failure corresponding to Table 3 below. This MTBF factors in both the frequency of required repair actions to maintain full functionality, and the rate of uncorrectable torus, tree and barrier network errors. The BGP system design achieves compute main complex Mean Time Between Application Failure (MTBAF) due to hardware of approximately once every six (6) days running in the normal operating mode offered by system software.

TABLE 3

MTBF for BGP Main System

| System Size (racks) | Compute Nodes in System | Mean Time Between Failures (days) |
|---|---|---|
| 1 | 1,024 | 40 |
| 8 | 8,196 | 20 |
| 32 | 32,768 | 12 |
| 40 | 40,960 | 10 |
| 72 | 73,728 | 6.7 |

Failure Protection Methods

Because of the large number of individual components constituting a BGP system, great care are taken to limit the effects of failures. Most power supplies on BGP are duplicated or are high reliability. All Air Moving Devices are N+1 redundant. Two fans are required to cool the covered node cards. The third fan is for redundancy. When all three fans are operating, the plan is to reduce the fan speed to increase reliability. When one fails, the plan is the other two fans speed up until the failed fan is replaced. There is a very small probability of two fans in the same fan unit failing within the service period.

In the event of a failure, the system are repartitioned to remove the fail, assuming it is restricted to no more than 1 row (8 racks) of the machine. After system repartitioning, the application are restarted from the last checkpoint.

The BGP compute ASIC 10 incorporates error detection and correction circuitry on the components with high failure rates due to soft and hard errors. These components include the external DDR memory, the internal EDRAM L3, the internal L2, and all SRAM arrays under designer control. The internal register arrays and critical dataflow busses have parity for error detection.

Data Integrity Checks

Another important source of errors is the links connecting the nodes. These links incorporate an error detection check (CRC) on packets that covers multiple bit errors. After a packet error is detected, the link controller retries the failed packet. The Torus network has 24 bits in the CRC for data. The Tree network has 24 bits in the CRC for user data.

Torus Network Reliability

The torus network reliably delivers a single copy of every packet injected into it, or it indicates an unrecoverable error condition. Therefore, send-side software need not retain copies of injected messages, and receive-side software need not maintain sequence numbers. This level of hardware reliability is required because software techniques such as sliding window protocols do not scale well to 73,728 nodes.

Network reliability are provided by a combination of end-to-end, and link-level, error detection. In most cases, the link-level error detection features discover, and often recover from an error. The end-to-end error detection are used primarily to discover errors caused by the routers themselves and missed by the link-level protocol.

Link-Level Errors

The link-level error detection scheme uses CRC bits appended to every packet. Because of virtual cut-through routing, it is highly likely that a packet detected as corrupt has already been forwarded through multiple downstream routers, so it cannot simply be dropped and re-transmitted. Instead, the router detecting the error modifies the last byte of the packet to indicate the error condition, causing the packet to be dropped by whichever router eventually receives it. In the case where a corrupt packet is entirely stored in a virtual cut-through FIFO, it is possible to drop it immediately.

In addition to marking the corrupt packet, the router detecting the error also causes a link-level re-transmission. This recovery ensures that only one "good" copy of every packet arrives at the intended receiver. Packets that are marked as corrupt are discarded automatically by a router's Local Reception circuitry, and not inserted into a reception FIFO.

Another possible source of link-level errors is "lost" bits, which would lead to a misrouted, malformed packet. Worse yet, this could lead to a lack of synchronization between adjacent routers. Although it is possible to recover from this situation, the hardware investment would be significant, and the occurrence is expected to be quite rare. Therefore, the network and delivered software reports this condition to the RAS database and allow system software to recover.

In addition, every Torus and Tree network link in the BGP supercomputer has an additional 32b CRC that is calculated on each end of the link. These 32b CRC can be used to verify that the data was correctly transmitted across the links and check for packet 24b CRC error escapes. After a job fails, every link in the job can be checked.

The Torus and Tree network logic are checksum (not CRC) all data that is injected in the Torus and Tree network with a separate checksum for each network. These checksum values are read out by libraries from user applications on a regular basis, e.g., on every time step of the simulation, and then saved away. Then, when the application checkpoints with the supplied checkpoint library, these checksums are also written out. This is used to roll-back an application to a previous checkpoint and verify that recomputed time steps generate the same checksums. If the checksums don't match, then the first processor that has a different checksum indicates where the error is located.

Availability

Availability within the BGP system is defined and managed by delivered software on the granularity of a midplane. This means the midplane containing 512 nodes are determined as good or bad and managed on this basis. At the time of initial program and load (IPL), this determination is handled by diagnostics. At runtime, it is handled via error detection and reporting schemes. The configuration database described herein is built identifying the status of all midplanes. Bad midplanes are not available for inclusion in functional partitions.

Initial Program Load (IPL) Availability

During System IPL, each node has the option to undergo a diagnostics phase. The System Administrator has the ability to choose between IPL that includes diagnostics or not at IPL time for each set of nodes undergoing IPL. If chosen by the System Administrator, during this step in the IPL a sequence of diagnostic operations based in software and hardware are executed. The results at the end of this phase are accessible from the SNS.

The SNS is provided with the status of all midplanes available after the diagnostics step of boot is complete. It is during this gathering step of midplane status that the SNS are take all bad midplanes offline.

Runtime Availability

While BGP is operational, errors that are detected by the hardware are logged by delivered software. This error reporting are via the SNS RAS Database.

Serviceability

The BGP system is delivered with a service RAS database that logs RAS events in the SNS. The RAS events are logged in this database both, at IPL and while BGP is operational, as errors are discovered/reported. The serviceability package use this database to appropriately identify the specific Field Replaceable Units (FRU) which need to be replaced during the next service interval.

All ASICs and power supplies are have a unique serial number which allows them to be tracked and a quality history developed.

Experience has shown that the close monitoring of soft errors is a good indicator of future hard failures. Errors corrected by the hardware are recorded by delivered software in the RAS database. The supplied RAS infrastructure and tools and documentation enables the determination of failed components in the system including redundant components (e.g., power regulators on node boards, fans) and will effectively guide the repair action. Scheduled preventive maintenance actions on the BGP platform occur no more frequently than once a week to replace components the RAS infrastructure and tools indicate have failed.

Diagnostics programs are supplied to diagnose problems on the BGP platform. These programs have the ability to diagnose routine and extreme problems with the machine and exercises the delivered hardware and correctly assess the state of the hardware.

The present invention and many of the novel features described herein, may be embodied in a computer program product, which comprises all the respective features enabling the implementation of the methods as described herein. Computer program, software program, program, or software, in the present context mean any expression, in any language, code or notation, of a set of instructions intended to cause a parallel computer network or system having an information processing capability to perform a particular function either directly or after either or both of the following: (a) conversion to another language, code or notation; and/or (b) reproduction in a different material form.

The following appendices are found in the application file: Appendix A. is Ser. No. 11/768,619. Including specification, figures and examples. Appendix B is Ser. No. 11/768,682 Including specification, figures and examples. Appendix C is Ser. No. 11/768,572 Including specification, figures and examples Appendix D is Ser. No. 11/768,813 Including specification, figures and examples. Appendix E. is Ser. No. 11/768,791 Including specification, figures and examples. Appendix F. is Ser. No. 11/768,532 Including specification, figures and examples. Appendix G. is Ser. No. 11/768,857 Including specification, figures and examples. Appendix H. is Ser. No. 11/768,547 Including specification, figures and examples. Appendix I is Ser. No. 11/768,799 Including specification, figures and examples. Appendix J. is Ser. No. 11/768, 800 Including specification, figures and examples. Appendix K. is Ser. No. 11/768,805 Including specification, figures and examples. Appendix L is Ser. No. 11/768,697 Including specification, figures and examples. Appendix M is Ser. No. 11/768,812 Including specification, figures and examples. Appendix N. is Ser. No. 11/768,593 Including specification, figures and examples. Appendix O. is Ser. No. 11/768,527 Including specification, figures and examples. Appendix P is Ser. No. 11/768,559 Including specification, figures and examples. Appendix Q. is Ser. No. 11/768,810 Including specification, figures and examples. Appendix R is Ser. No. 11/768,777 Including specification, figures and examples. Appendix S is Ser. No. 11/768,669 Including specification, figures and examples. Appendix T is Ser. No. 11/768,752 Including specification, figures and examples. Appendix U is Ser. No. 11/768,552 Including specification, figures and examples.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new, and desire to secure by Letters Patent is:

1. A scalable, massively parallel computer system comprising:
   a plurality of processing nodes interconnected by independent networks, each node including one or more processing elements for performing computation or communication activity as required when performing parallel algorithm operations, each of said processing nodes including a direct memory access (DMA) element operable for providing a plurality of functions for said processing node; and,
   a first of said multiple independent networks comprising an n-dimensional torus network including communication links interconnecting said nodes in a manner optimized for providing high-speed, low latency point-to-point and multicast packet communications among said nodes or sub-sets of nodes, said processing node DMA element providing a communications message passing interface enabling communication of messages among said nodes;
   a second of said multiple independent networks including a scalable collective network comprising nodal interconnections that facilitate simultaneous global operations among nodes or sub-sets of nodes of said network; and,
   partitioning means for dynamically configuring one or more combinations of independent processing networks according to needs of one or more algorithms, each independent network including a configurable sub-set of processing nodes interconnected by divisible portions of said first and second networks,
   each of said configured independent processing networks is utilized to enable simultaneous collaborative processing for optimizing algorithm processing performance, and,
   wherein each said DMA element at said nodes comprises:
   a processor interface for interfacing with the at least one processor, a DMA controller logic device, a memory interface for interfacing with a memory structure for storing information, a DMA network interface for interfacing with the network, one or more injection and reception byte counters, and injection and reception FIFO metadata associated with a injection FIFO and reception FIFO, respectively,
   wherein said DMA element supports message-passing operation as controlled from an application via an Injection FIFO Metadata describing multiple Injection FIFOs, where each Injection FIFO may contain an arbitrary number of message descriptors to process messages with a fixed processing overhead irrespective of the number of message descriptors comprising the Injection FIFO, said (DMA) element is operable for Direct Memory Access functions for point-to-point, multicast, and all-to-all communications amongst said nodes.

2. The massively parallel computer system as claimed in claim 1, wherein an injection FIFO at each DMA element maintains memory locations of the injection FIFO metadata memory locations, including its current head and tail, and, a reception FIFO at each DMA element maintains the reception FIFO metadata memory locations, including its current head and tail, wherein the injection byte counters and reception byte counters may be shared between messages.

3. The massively parallel computer system as claimed in claim 2, wherein each of the injection and reception byte counters maintain a base memory address and a byte counter value, respectively, for a message being passed through the compute node associated with same.

4. The massively parallel computer system as claimed in claim 3, herein each of the injection and reception byte counters is shared by multiple messages by first setting a base address in the shared byte counter to a lower bound and setting its associated counter value to zero, and wherein an initial offset in a message descriptor comprising the message is equivalent to difference between the messages start address the base address offset.

5. The massively parallel computer system as claimed in claim 3, wherein a processor at a processing node increments the counter value maintained in the shared byte counter by the current message length, and the DMA engine automatically carries out the increment operation such that immediately after, the shared byte counter includes a sum of the number of bytes to be injected or received, minus the number of bytes already injected or received.

6. The massively parallel computer system as claimed in claim 3, wherein said DMA element is configured for passing at least one remote message triggered by a first single source compute node (A) sending a single message wherein each said DMA element provides for putting remote descriptors from the first single source compute node (A) into an injection FIFO at remote second compute node (B).

7. The massively parallel computer system as claimed in claim 6, wherein the first single source compute node (A) implements a $3^{rd}$ party send by sending a single remote first message including at least one remote message descriptor to a remote second compute node (B), to control the remote second compute node (B) to send a second data message, and wherein the remote second compute node (B) sends said second data message to third compute node (C).

8. The massively parallel computer system as claimed in claim 7, wherein the first compute node (A) implements at least one $3^{rd}$ party send by sending a single remote get message including at least one remote message descriptor to a remote second compute node (B), wherein upon receipt of said at least one remote message descriptor, said DMA element passing at least one data message corresponding to the at least one remote message descriptor.

9. The massively parallel computer system as claimed in claim 8, wherein remote second compute node (B) sends said multiple data messages to a third remote compute node (C).

10. The massively parallel computer system as claimed in claim 1, wherein said direct memory access element in the node includes a memory having at least an injection fifo and a receive buffer, said DMA element utilized for optimizing collective operations in said system by: said DMA element providing at least a byte counter for each submessage of a message, the byte counter including at least a base address in memory for storing associated submessage and a counter value, the direct memory access controller operable to update the counter value as a result of receiving one or more bytes of the associated submessage into the node; and, said one or more processing elements operable to monitor the counter value and, when a predetermined number of bytes of the submessage is received, the one or more processing elements further operable to process a block of data comprising the received predetermined number of bytes of the submessage.

11. The massively parallel computer system as claimed in claim 10, wherein said one or more processors are operable to resend the block of data by updating a message descriptor in the injection fifo with information about the block of data, said information about the block of data including at least a counter identifier associated with the submessage, the counter identifier including at least a base address in memory, and an offset from the base address in memory where the block of data is stored.

12. The massively parallel computer system as claimed in claim 10, wherein the message is a collective operation message, said one or more processors are operable to perform a reduction operation on the block of data and, operable to send a result of the reduction operation on the block of data.

13. The massively parallel computer system as claimed in claim 1, wherein said plurality of interconnected processing nodes operates a global message-passing application for performing communications across the network, each of the processing nodes comprising one or more individual processors with memories, wherein local instances of the global message-passing application operate at each compute node to carry out local processing operations independent of processing operations carried out at other processing nodes.

14. The massively parallel computer system as claimed in claim 13, wherein each said DMA element at an interconnected processing node interacts with the application via Injection FIFO Metadata describing an Injection FIFO containing an arbitrary number of message descriptors in order to process messages with a fixed processing overhead irrespective of the number of message descriptors comprising the Injection FIFO.

15. The massively parallel computer system as claimed in claim 14, wherein the DMA element accepts Injection FIFO Metadata for multiple Injection FIFOs.

16. The massively parallel computer system as claimed in claim 15, wherein the DMA element comprises: a producer pointer and a consumer pointer, said producer and consumer pointers pointing to all message descriptors to be provided to the circular buffers beginning at a first circular buffer position.

17. The massively parallel computer system as claimed in claim 1, wherein a third of said multiple independent networks includes a scalable global signal network comprising nodal interconnections for enabling asynchronous global operations among nodes or sub-sets of nodes of said network.

18. The massively parallel computer system as claimed in claim 17, wherein asynchronous global operations include barrier and notification operations.

19. The massively parallel computer system as claimed in claim 1, wherein each node comprises a system-on-chip Application Specific Integrated Circuit (ASIC) comprising four processing elements each capable of individually or simultaneously working on any combination of computation or communication activity, or both, as required when performing particular classes of algorithms.

20. The massively parallel computer system as claimed in claim 19, further including means for enabling overlapping of computation and communication among one or more configured independent processing networks when performing particular classes of algorithms.

21. The massively parallel computer system as claimed in claim 1, wherein each processing element includes one or more cache memories associated therewith, a processing node further comprising:
    a node coherence architecture comprising:
    a snoop filter sub-system associated with each of said processing elements, each snoop filter sub-system having a plurality of dedicated inputs for receiving coherence requests from dedicated memory writing sources at said processing node and,
    a point-to-point interconnect means comprising communication links for directly connecting a memory writing source to a corresponding dedicated input of each snoop filter sub-system associated with each processing element,
    wherein each said snoop filter sub-system further comprises:
        a snoop filter means each coupled to a corresponding one of said plurality of dedicated inputs for filtering respective received coherence requests from respective dedicated memory writing sources, each snoop filter means implementing one or more parallel operating sub-filter elements operative for determining those requests likely residing in a cache memory at said associated processing element and filtering out those coherence requests for data that are determined not cached locally at said associated processing element, whereby a number of coherence requests forwarded to a processing element is significantly reduced thereby increasing performance of said computing environment.

22. The massively parallel computing system as claimed in claim 21, wherein said node coherence architecture implements a write-invalidate cache coherence protocol, said memory writing source generating a write-invalidation coherence request signal.

23. The massively parallel computing system as claimed in claim 21, further comprising a mechanism for single stepping snoop filter operations relating to processing of respective received coherence requests from respective dedicated memory writing sources.

24. A massively parallel computing system comprising:
    a plurality of processing nodes interconnected by independent networks, each processing node comprising a system-on-chip Application Specific Integrated Circuit (ASIC) comprising four or more processing elements each capable of performing computation or message passing operations, each of said processing nodes including a direct memory access (DMA) element operable for providing a plurality of functions for said processing node, and,
    each said processing element of a processing node including a shared memory storage structure, said shared memory storage structure is programmed into a plurality of memory bank structures a processing node including a programmable means for sacrificing an amount memory to enable processing parallelism;
    one or more first logic devices associated with a respective said processor element, each one or more first logic devices for receiving physical memory address signals and programmable for generating a respective memory storage structure select signal upon receipt of pre-determined address bit values at selected physical memory address bit locations; and,
    a second logic device responsive to each said respective select signal for generating an address signal used for selecting a memory storage structure for processor access, wherein each processor device of said computing system is enabled memory storage access distributed across said one or more memory storage structures; and,
    means receiving unselected bit values of said received physical memory address signal for generating an offset bit vector signal used to enable processor element access to memory locations within a selected memory storage structure; and,
    a first independent network comprising an n-dimensional torus network including communication links interconnecting said nodes in a manner optimized for providing high-speed, low latency point-to-point and multicast packet communications among said nodes or sub-sets of nodes of said network;
    a second of said multiple independent networks includes a scalable global collective network comprising nodal interconnections that facilitate simultaneous global operations among nodes or sub-sets of nodes of said network; and,
    partitioning means for dynamically configuring one or more combinations of independent processing networks according to needs of one or more algorithms, each independent network including a configured sub-set of processing nodes interconnected by divisible portions of said first and second networks, and,
    means enabling rapid coordination of processing and message passing activity at each said processing element in each independent processing network, wherein one, or more, of the processing elements performs calculations needed by the algorithm, while the other, or more, of the processing elements performs message passing activities for communicating with other nodes of said network, as required when performing particular classes of algorithms, a processing node DMA element providing a communications message passing interface enabling communication of messages among said nodes, wherein each of said configured independent processing networks and node processing elements thereof are dynamically utilized to enable collaborative processing for optimizing algorithm processing performance.

25. The massively parallel computing system as claimed in claim 24, further implementing a message passing interface (MPI) protocol wherein a processing element performs its own MPI task independently, wherein said programmable means enables a first mode usage wherein, each processing node performs up to four MPI tasks, one task per processing element, with each processing element utilizing up to ¼ of the node's memory storage structure.

26. The massively parallel computing system as claimed in claim 24, wherein said programmable means enables a second mode usage wherein a single processing element performs a single MPI task and utilizes some or all of the node's memory storage structure.

27. The massively parallel computing system as claimed in claim 24, wherein said programmable means enables a third mode usage wherein each processing element implements an MPI task in a respective associated processing thread, with each of said four processing elements sharing all the node's memory storage structure.

28. The massively parallel computing system as claimed in claim 24, wherein said programmable means enables a fourth mode usage wherein two processing elements each implements a first MPI task in a first associated processing thread and, another two processing elements each implements a second MPI task in a second associated processing thread.

29. The massively parallel computing structure as claimed in claim 24, wherein each processing node further comprises a shared resource in a memory accessible by said processing units configured for lock exchanges to prevent bottlenecks in said processing elements.

30. The massively parallel computing structure as claimed in claim 29, wherein each processing node further comprises:
   means for receiving a physical memory address from an issuing processing element, said memory address including instruction bits specifying an atomic counter operation to be performed at a memory location in said memory storage structure; and,
   means for removing said instruction bits from said received memory address to form a further memory address used in selecting said memory address location in said memory storage structure, wherein an atomic counter operation is to be performed at said further memory address according to said instruction bits.

31. The massively parallel computing structure as claimed in claim 30, wherein said memory storage structure comprises an SRAM provided at said node.

32. The massively parallel computing structure as claimed in claim 24, further comprising: interface means for accessing high speed data from an internal or external data source, each said node implementing functionality for providing a persistent data eye for monitoring capturing of said high speed data signals and adjusting a clock strobe associated with data signal capture at said node.

33. The massively parallel computing structure as claimed in claim 24, further comprising: a performance monitoring unit (PMU) for monitoring performance of events occurring at a processing node, wherein each processing element generates signals representing occurrences of events at said processor device, said PMU comprising a plurality of performance counters each for counting said signals representing occurrences of events from one or more said plurality of processor units in said multiprocessor system.

34. The massively parallel computing structure as claimed in claim 33, further wherein said PMU further comprises a plurality of input devices for receiving said event signals from one or more processor devices of said processing elements, said plurality of input devices programmable to select event signals for receipt by one or more of said plurality of performance counters for counting, wherein said PMU is shared between multiple processing units, or within a group of processors in said multiprocessing system.

35. In a massively parallel computing structure comprising a plurality of processing nodes interconnected by multiple independent networks, each processing node comprising:
   a system-on-chip Application Specific Integrated Circuit (ASIC) comprising four or more processing elements each capable of performing computation or message passing operations;
   means enabling rapid coordination of processing and message passing activity at each said processing element, wherein one or both of the processing elements performs calculations needed by the algorithm, while the other or both processing element performs message passing activities for communicating with other interconnected nodes of a network, as required when performing particular classes of algorithms, and,
   means for supporting overlap of communication and computation with non-blocking communication primitives
   wherein each of said plurality of processing nodes includes a direct memory access (DMA) element operable for providing a communications message passing interface enabling communication of messages among said nodes, each said DMA element at said nodes comprising:
   a processor interface for interfacing with the at least one processor, a DMA controller logic device, a memory interface for interfacing with a memory structure for storing information, a DMA network interface for interfacing with the network, one or more injection and reception byte counters, and injection and reception FIFO metadata associated with a injection FIFO and reception FIFO, respectively,
   wherein said DMA element supports message-passing operation as controlled from an application via an Injection FIFO Metadata describing multiple Injection FIFOs, where each Injection FIFO may contain an arbitrary number of message descriptors to process messages with a fixed processing overhead irrespective of the number of message descriptors comprising the Injection FIFO,
      said (DMA) element is operable for Direct Memory Access functions for point-to-point, multicast, and all-to-all communications amongst said nodes.

36. The massively parallel computing structure as claimed in claim 35, wherein said supporting means supports point-to-point messaging (application programming interface) API with active messages.

37. The massively parallel computing structure as claimed in claim 35, wherein said supporting means enables non-blocking collective operations, where a collective call is initiated by a node and then progresses on the network while a processing element performs a computing operation.

38. The massively parallel computing structure as claimed in claim 35, wherein said supporting means supports synchronous and asynchronous collective operations.

39. The massively parallel computing structure as claimed in claim 38, wherein, in support of said asynchronous collective operations, said structure enabling many simultaneous collective operations messaging in flight on the network, said structure further comprising: means at each node for distinguishing among packets associated with different collective operations messages.

40. A system for providing an operating environment in a parallel computer system, comprising:
   a system administration and management subsystem including at least core monitoring and control database operable to store information associated with a plurality of nodes in a parallel computer system;
   a partition and job management subsystem operable to allocate one or more nodes in the parallel computer system to one or more job partitions to provide job management in the parallel computer system;
   an application development and debug tools subsystem including at least one ore more debugging environments, one or more application performance monitoring and tuning tools, one or more compilers and a user interface, the application development and debug tools subsystem operable to provide one or more application development tools in the parallel computer system;

a compute node kernel and services subsystem operable to provide an environment for execution of one or more user processes; and input/output kernel and services subsystem operable to communicate with one or more file servers and other computer systems, the input/output kernel and services subsystem further operable to provide input and output functionality between said one or more user processes and said one or more file servers and other computer systems, wherein the core monitoring and control database includes:

a configuration database operable to provide a representation of a plurality of hardware on the parallel computer system;

an operational database including information and status associated with one or more interactions in the plurality of hardware on the parallel computer system;

an environmental database including current values for the plurality of hardware on the parallel computer system; or a reliability, availability, and serviceability database operable to collect information associated with reliability, availability, and serviceability of the parallel computer system; or combinations thereof, wherein the system administration and management subsystem uses the configuration database, the operational database, the environmental database, or the reliability, availability, and serviceability database, or combinations thereof, in managing the parallel computer system.

41. The system of claim 40, wherein each of said job partitions is dedicated to a single user job.

42. The system of claim 40, wherein the environment for execution of one or more user processes includes process and thread creation and management, memory management, dynamically linked libraries, process debugging, or reliability, availability and serviceability management, or combinations thereof.

43. The system of claim 40, wherein the core monitoring and control database resides with a service node of the parallel computer system.

44. The system of claim 40, wherein the compute node kernel and services subsystem resides in a plurality of compute nodes in the parallel computer system, the plurality of compute nodes operable to process one or more user application jobs.

* * * * *